United States Patent
Kang et al.

(10) Patent No.: US 10,824,707 B2
(45) Date of Patent: **\*Nov. 3, 2020**

(54) METHOD AND DEVICE FOR PROVIDING SECURITY CONTENT

(71) Applicant: SAMSUNG ELECTRONICS CO., LTD., Suwon-si (KR)

(72) Inventors: Nam-wook Kang, Seoul (KR); Do-hyoung Kim, Seoul (KR); Yong-gook Park, Yongin-si (KR); Woo-hyoung Lee, Yongin-si (KR); Young-kyu Jin, Seoul (KR); Byeong-hoon Kwak, Uiwang-si (KR); Jong-youb Ryu, Suwon-si (KR); Chang-hyun Lee, Suwon-si (KR); Yong-hyun Lim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 50 days.

This patent is subject to a terminal disclaimer.

(21) Appl. No.: 16/286,221

(22) Filed: Feb. 26, 2019

(65) Prior Publication Data

US 2019/0197227 A1 Jun. 27, 2019

Related U.S. Application Data

(63) Continuation of application No. 14/882,533, filed on Oct. 14, 2015, now Pat. No. 10,229,258, which is a
(Continued)

(30) Foreign Application Priority Data

Jul. 18, 2013 (KR) .................. 10-2013-0084934

(51) Int. Cl.
  *G06F 21/32* (2013.01)
  *G06F 3/0482* (2013.01)
  *G06F 3/0488* (2013.01)

(52) U.S. Cl.
  CPC ............ *G06F 21/32* (2013.01); *G06F 3/0482* (2013.01); *G06F 3/04886* (2013.01)

(58) Field of Classification Search
  CPC .................... G06F 21/32; G06F 2203/0338
  See application file for complete search history.

(56) References Cited

U.S. PATENT DOCUMENTS 5,666,502 A    9/1997   Capps
6,008,809 A   12/1999   Brooks
(Continued)

FOREIGN PATENT DOCUMENTS

CN    101617287 A    12/2009
CN    101788880 A     7/2010
(Continued)

OTHER PUBLICATIONS

Communication dated Mar. 15, 2019 issued by the State Intellectual Property Office of P.R. China in counterpart Chinese Application No. 201410118879.X.
(Continued)

*Primary Examiner* — Justin S Lee
(74) *Attorney, Agent, or Firm* — Sughrue Mion, PLLC

(57) ABSTRACT

A method, performed by a device, of providing security content includes receiving a touch and drag input indicating that a user drags a visual representation of a first application displayed on a touch screen of the device to a fingerprint recognition area while the user touches the visual representation of the first application with a finger; performing authentication on a fingerprint of the finger detected on the touch screen using a fingerprint sensor included in the
(Continued)

fingerprint recognition area; and when the performing authentication on the fingerprint is successful, displaying the security content associated with the first application on an execution window of the first application.

20 Claims, 31 Drawing Sheets

Related U.S. Application Data continuation-in-part of application No. 14/227,522, filed on Mar. 27, 2014, now Pat. No. 9,927,953.

(60) Provisional application No. 61/805,632, filed on Mar. 27, 2013.

(56) References Cited

U.S. PATENT DOCUMENTS

| | | |
|---|---|---|
| 6,397,337 B1 | 5/2002 | Garrett et al. |
| 7,512,400 B2 | 3/2009 | Starbuck et al. |
| 8,351,897 B2 | 1/2013 | Shin et al. |
| 8,411,046 B2 | 4/2013 | Kruzeniski et al. |
| 8,443,199 B2 | 5/2013 | Kim et al. |
| 8,619,038 B2 | 12/2013 | Chaudhri et al. |
| 8,832,597 B2 | 9/2014 | Kurtenbach |
| 9,027,117 B2 | 5/2015 | Wilairat |
| 9,176,747 B2 | 11/2015 | Rolston et al. |
| 9,178,981 B2 | 11/2015 | Cho et al. |
| 9,357,055 B2 | 5/2016 | Bahn et al. |
| 9,384,014 B2 | 7/2016 | Kim et al. |
| 9,395,914 B2 | 7/2016 | Chun |
| 9,471,217 B2 | 10/2016 | Shin et al. |
| 10,033,855 B2 | 7/2018 | Chae et al. |
| 10,459,625 B2 | 10/2019 | Seo et al. |
| 2002/0115476 A1 | 8/2002 | Padawer et al. |
| 2004/0095395 A1 | 5/2004 | Kurtenbach |
| 2005/0149879 A1 | 7/2005 | Jobs et al. |
| 2005/0185828 A1* | 8/2005 | Semba ............... G06K 9/00006 |
| | | 382/124 |
| 2005/0243979 A1 | 11/2005 | Starbuck et al. |
| 2006/0167861 A1 | 7/2006 | Arrouye et al. |
| 2006/0229097 A1 | 10/2006 | Flynt et al. |
| 2006/0294084 A1 | 12/2006 | Patel et al. |
| 2007/0099642 A1 | 5/2007 | Jin et al. |
| 2007/0150842 A1 | 6/2007 | Chaudhri et al. |
| 2007/0168368 A1 | 7/2007 | Stone |
| 2007/0229549 A1 | 10/2007 | Dicke et al. |
| 2007/0245152 A1 | 10/2007 | Pizano |
| 2008/0020803 A1 | 1/2008 | Rios et al. |
| 2008/0052717 A1 | 2/2008 | Lee |
| 2008/0062141 A1 | 3/2008 | Chandhri |
| 2008/0109751 A1 | 5/2008 | Fitzmaurice et al. |
| 2008/0166993 A1 | 7/2008 | Gautier et al. |
| 2008/0168368 A1 | 7/2008 | Louch et al. |
| 2008/0320033 A1 | 12/2008 | Koistinen et al. |
| 2009/0013275 A1 | 1/2009 | May et al. |
| 2009/0013282 A1 | 1/2009 | Mercer |
| 2009/0019120 A1 | 1/2009 | Muguda |
| 2009/0083847 A1 | 3/2009 | Fadell et al. |
| 2009/0094339 A1 | 4/2009 | Allen et al. |
| 2009/0240647 A1 | 9/2009 | Green et al. |
| 2009/0241072 A1 | 9/2009 | Chaudhri et al. |
| 2010/0023892 A1 | 1/2010 | Rakesh et al. |
| 2010/0060599 A1* | 3/2010 | Kwak ............... G06F 16/287 |
| | | 345/173 |
| 2010/0070898 A1 | 3/2010 | Langlois et al. |
| 2010/0088634 A1 | 4/2010 | Tsuruta et al. |
| 2010/0146451 A1 | 6/2010 | Dong et al. |
| 2010/0211872 A1 | 8/2010 | Rolston et al. |
| 2010/0229115 A1 | 9/2010 | Augustine et al. |
| 2010/0240415 A1* | 9/2010 | Kim ............... G06F 3/03547 |
| | | 455/565 |
| 2010/0269040 A1 | 10/2010 | Lee |
| 2010/0306705 A1 | 12/2010 | Nilsson |
| 2010/0313125 A1 | 12/2010 | Fleizach et al. |
| 2010/0313156 A1 | 12/2010 | Louch et al. |
| 2010/0328032 A1* | 12/2010 | Rofougaran ............ G06F 21/36 |
| | | 340/5.82 |
| 2011/0047134 A1 | 2/2011 | Zhang et al. |
| 2011/0093812 A1 | 4/2011 | Fong |
| 2011/0126156 A1 | 5/2011 | Krishnaraj et al. |
| 2011/0154290 A1 | 6/2011 | Kelly |
| 2011/0167387 A1 | 7/2011 | Stallings et al. |
| 2011/0175930 A1 | 7/2011 | Hwang et al. |
| 2011/0202872 A1 | 8/2011 | Park |
| 2011/0242138 A1 | 10/2011 | Tribble |
| 2011/0258581 A1 | 10/2011 | Hu |
| 2011/0300831 A1 | 12/2011 | Chin |
| 2011/0307810 A1 | 12/2011 | Hilerio et al. |
| 2011/0316884 A1 | 12/2011 | Giambalvo et al. |
| 2012/0005569 A1 | 1/2012 | Roh |
| 2012/0005577 A1 | 1/2012 | Chakra et al. |
| 2012/0017177 A1 | 1/2012 | Kim |
| 2012/0023573 A1 | 1/2012 | Shi |
| 2012/0026400 A1 | 2/2012 | Kang et al. |
| 2012/0060123 A1 | 3/2012 | Smith |
| 2012/0084734 A1 | 4/2012 | Wilairat |
| 2012/0110483 A1 | 5/2012 | Arcese et al. |
| 2012/0117599 A1 | 5/2012 | Jin et al. |
| 2012/0129496 A1 | 5/2012 | Park et al. |
| 2012/0131471 A1 | 5/2012 | Terlouw et al. |
| 2012/0159395 A1 | 6/2012 | Deutsch et al. |
| 2012/0164971 A1 | 6/2012 | Choi et al. |
| 2012/0166997 A1 | 6/2012 | Cho et al. |
| 2012/0174042 A1 | 7/2012 | Chang |
| 2012/0179969 A1 | 7/2012 | Lee et al. |
| 2012/0195475 A1* | 8/2012 | Abiko ............... G06K 9/00093 |
| | | 382/115 |
| 2012/0210253 A1 | 8/2012 | Luna et al. |
| 2012/0210266 A1 | 8/2012 | Jiang et al. |
| 2012/0256863 A1 | 10/2012 | Zhang et al. |
| 2012/0272338 A1 | 10/2012 | Falkenburg et al. |
| 2012/0289287 A1 | 11/2012 | Kokubo |
| 2012/0290972 A1 | 11/2012 | Yook et al. |
| 2012/0297298 A1 | 11/2012 | Dovey et al. |
| 2012/0297304 A1 | 11/2012 | Maxwell |
| 2012/0309433 A1 | 12/2012 | Jeong et al. |
| 2012/0311499 A1 | 12/2012 | Dellinger |
| 2012/0324357 A1 | 12/2012 | Viegers et al. |
| 2013/0007665 A1 | 1/2013 | Chaudhri et al. |
| 2013/0042191 A1 | 2/2013 | Kim et al. |
| 2013/0047119 A1 | 2/2013 | Lee |
| 2013/0052993 A1 | 2/2013 | Kwon et al. |
| 2013/0053105 A1 | 2/2013 | Lee et al. |
| 2013/0054548 A1 | 2/2013 | Fosback et al. |
| 2013/0063452 A1 | 3/2013 | Ali et al. |
| 2013/0063479 A1 | 3/2013 | Butlin et al. |
| 2013/0067376 A1 | 3/2013 | Kim et al. |
| 2013/0083210 A1 | 4/2013 | Beckham et al. |
| 2013/0091468 A1 | 4/2013 | Xie |
| 2013/0132904 A1 | 5/2013 | Primiani |
| 2013/0135247 A1* | 5/2013 | Na ............... G06F 21/32 |
| | | 345/174 |
| 2013/0169568 A1 | 7/2013 | Park |
| 2013/0227450 A1 | 8/2013 | Na |
| 2013/0232256 A1 | 9/2013 | Lee et al. |
| 2013/0246932 A1* | 9/2013 | Zaveri ............... G06F 3/04815 |
| | | 715/740 |
| 2013/0254693 A1 | 9/2013 | Oh |
| 2013/0283057 A1* | 10/2013 | Hama ............... G06K 9/00885 |
| | | 713/186 |
| 2014/0075388 A1 | 3/2014 | Kuscher |
| 2014/0143856 A1 | 5/2014 | Wu |
| 2014/0283012 A1 | 9/2014 | Eggerton |
| 2014/0298268 A1 | 10/2014 | Kang |
| 2014/0359757 A1* | 12/2014 | Sezan ............... G06F 3/04886 |
| | | 726/19 |
| 2015/0040024 A1 | 2/2015 | Higashibeppu |
| 2015/0063660 A1* | 3/2015 | Boshra ............... G06K 9/00033 |
| | | 382/124 |

(56) References Cited

U.S. PATENT DOCUMENTS

| | | | | |
|---|---|---|---|---|
| 2015/0133084 | A1* | 5/2015 | Baek | H04M 1/72563 455/411 |
| 2015/0135108 | A1* | 5/2015 | Pope | G06F 3/0481 715/767 |
| 2015/0254475 | A1* | 9/2015 | Bauer | G06F 16/957 726/27 |
| 2016/0104221 | A1* | 4/2016 | Zakusilo | G06Q 30/0605 705/26.2 |
| 2016/0370866 | A1* | 12/2016 | Hwang | G06F 3/04883 |
| 2017/0090738 | A1 | 3/2017 | Kurtz et al. | |
| 2018/0321835 | A1 | 11/2018 | Shin et al. | |

FOREIGN PATENT DOCUMENTS

| | | |
|---|---|---|
| CN | 101836182 A | 9/2010 |
| CN | 101853379 A | 10/2010 |
| CN | 102053783 A | 5/2011 |
| CN | 102109945 A | 6/2011 |
| CN | 102279710 A | 12/2011 |
| CN | 102301330 A | 12/2011 |
| CN | 102402661 A | 4/2012 |
| CN | 102439861 A | 5/2012 |
| CN | 102591584 A | 7/2012 |
| CN | 102710847 A | 10/2012 |
| CN | 102939584 A | 2/2013 |
| EP | 2 112 583 A1 | 10/2009 |
| EP | 2230623 A1 | 9/2010 |
| EP | 2 533 140 A1 | 12/2012 |
| EP | 2 551 762 A1 | 1/2013 |
| FR | 2971069 A1 | 8/2012 |
| JP | 3135104 B2 | 2/2001 |
| JP | 2004-191642 A | 7/2004 |
| JP | 2012-181847 A | 9/2012 |
| KR | 10-2006-0131544 A | 12/2006 |
| KR | 10-0683483 B1 | 2/2007 |
| KR | 10-2007-0115622 A | 12/2007 |
| KR | 10-2007-0120368 A | 12/2007 |
| KR | 10-2008-0043764 A | 5/2008 |
| KR | 10-2009-0093444 A | 9/2009 |
| KR | 10-2010-0027689 A | 3/2010 |
| KR | 10-2010-0066002 A | 6/2010 |
| KR | 10-2010-0114779 A | 10/2010 |
| KR | 10-2010-0124427 A | 11/2010 |
| KR | 10-2010-0127382 A | 12/2010 |
| KR | 10-2010-0134234 A | 12/2010 |
| KR | 10-2011-0011226 A | 2/2011 |
| KR | 10-2011-0026811 A | 3/2011 |
| KR | 10-2011-0139857 A | 12/2011 |
| KR | 10-2012-0006805 A | 1/2012 |
| KR | 10-2012-0054837 A | 5/2012 |
| KR | 10-2012-0089985 A | 8/2012 |
| KR | 10-2012-0092036 A | 8/2012 |
| KR | 10-2012-0126161 A | 11/2012 |
| KR | 10-2012-0131906 A | 12/2012 |
| KR | 10-2013-0006991 A | 1/2013 |
| KR | 10-2013-0024074 A | 3/2013 |
| KR | 10-2013-0024346 A | 3/2013 |
| RU | 2347258 C2 | 2/2009 |
| RU | 2363039 C2 | 7/2009 |
| RU | 2408923 C2 | 1/2011 |
| WO | 2010110613 A1 | 9/2010 |
| WO | 2010144331 A2 | 12/2010 |
| WO | 2012032180 A1 | 3/2012 |
| WO | 2013022849 A1 | 2/2013 |
| WO | 2013173838 A2 | 11/2013 |

OTHER PUBLICATIONS

Communication dated Mar. 13, 2019 issued by the European Intellectual Property Office in counterpart European Application No. 14 161 672.2.
Stieben, "4 Creative Multitasking Apps for Android", Mar. 21, 2013, pp. 1-3, 3 pages total, XP055566035, https://www.makeuseof.com/tag/4-creative-multitasking-apps-for-android/.
Evans, "Best task switchers and multitasking apps for Android", Aug. 29, 2012, 15 pages total, XP055566247, https://www.androidauthority.com/best-task-switchers-multitasking-apps-android-110359/.
Communication dated Oct. 9, 2019 issued by the State Intellectual Property Office of P.R. China in counterpart Chinese Application No. 201410120447.2.
Communication dated Dec. 4, 2019 issued by the Korean Intellectual Property Office in counterpart Korean Application No. 10-2013-0089825.
Communication (KR OA) dated Dec. 26, 2019 by the Korean Intellectual Property Office in counterpart Korean Patent Application No. 10-2013-0092242.
Communication (KR OA) dated Jan. 28, 2020 by the Korean Intellectual Property Office in counterpart Korean Patent Application No. 10-2013-0081785.
Communication (KR OA) dated Jan. 31, 2020 by the Korean Intellectual Property Office in counterpart Korean Patent Application No. 10-2013-0084934.
Communication (IN OA) dated Jan. 27, 2020 by the Intellectual Property of India in conterpart Indian Patent Application No. 3039/MUMNP/2015.
Communication (IN OA) dated Jan. 31, 2020 by the Intellectual Property of India in conterpart Indian Patent Application No. 2999/MUMNP/2015.
Communication (IN OA) dated Feb. 17, 2020 by the Intellectual Property of India in conterpart Indian Patent Application No. 3048/MUMNP/2015.
Communication dated Jul. 3, 2019, issued by the European Patent Office in counterpart European Application No. 14161621.9.
Anonymous, How to Move/Re-arrange Icons/Apps—Apple iPhone 5, Nov. 24, 2012, XP054979475, retrieved from: URL:https://www.youtube.com/watch?v=oqY7l3VyXOw, (1 page total).
Communication dated Nov. 27, 2018, issued by the State Intellectual Property Office of P.R. China in counterpart Chinese Application No. 201410120439.8.
Communication dated Sep. 10, 2018, issued by the State Intellectual Property Office of the People's Republic of China in counterpart Chinese Patent Application No. 201410118879.X.
Communication dated Nov. 2, 2018, issued by the State Intellectual Property Office of the People's Republic of China in counterpart Chinese Patent Application No. 201410120447.2.
Communication dated Jan. 17, 2018, from the State Intellectual Property Office of People's Republic of China in counterpart Application No. 201410118879.X.
Communication dated Feb. 24, 2018, from the State Intellectual Property Office of People's Republic of China in counterpart Application No. 201410138255.4.
Communication dated Mar. 2, 2018, from the State Intellectual Property Office of People's Republic of China in counterpart Application No. 201410120447.2.
Communication dated Mar. 2, 2018, from the State Intellectual Property Office of People's Republic of China in counterpart Application No. 201410120439.8.
Communication dated Sep. 25, 2014, issued by the European Patent Office in counterpart European Application No. 14161980.9.
Communication dated Oct. 9, 2014, issued by the European Patent Office in counterpart European Application No. 14161998.1.
Communication dated Oct. 10, 2014, issued by the European Patent Office in counterpart European Application No. 14161616.9.
Communication dated Nov. 5, 2014, issued by the European Patent Office in counterpart European Application No. 14161672.2.
Communication dated Nov. 6, 2014, issued by the European Patent Office in counterpart European Application No. 14161739.9.
"Private Desktop, Product Information", Tropical Software website, Jul. 1, 2012, 2 pages total, XP055142907.
"Private Desktop, Screen Shots", Tropical Software website, Jul. 1, 2012, 5 pages total, XP 055142903.
J R Raphael, "Android Power Tip : Put Your Dialer on Your Home Screen (or Lock Screen)", Jan. 15, 2013, 6 pages total, XP 55143362.

(56) References Cited

OTHER PUBLICATIONS

Communication dated Aug. 28, 2014 issued by the European Patent Office in counterpart European Patent Application No. 14161672.2.
Communication dated Jun. 26, 2014 issued by the International Searching Authority in counterpart International Patent Application No. PCT/KR2014/002472.
Alexandra Chang; "Up Close with iOS 5: New Gestures"; Macworld; Oct. 14, 2011; 4 pages; XP055135715.
"Overview of webOS—User Interface"; HP webOS Developer Center; Jan. 13, 2012; 4 pages; XP055135739.
"HP/Palm WebOS—Multi-tasking Made Easy, Featuring the Palm Pre Plus"; Mar. 19, 2010; 1 page; XP054975489.
Communication dated Jul. 3, 2014 issued by the International Searching Authority in counterpart International Patent Application No. PCT/KR2014/002481.
Communication dated Jul. 2, 2014 issued by the International Searching Authority in counterpart International Patent Application No. PCT/KR2014/002464.
Communication dated Jul. 2, 2014 issued by the International Searching Authority in counterpart International Patent Application No. PCT/KR2014/002444.
Communication dated Jul. 2, 2014 issued by the International Searching Authority in counterpart International Patent Application No. PCT/KR2014/002443.
Communication dated Aug. 26, 2014 issued by the European Patent Office in counterpart European Patent Application No. 14161621.9.
Communication dated Jul. 3, 2014 issued by the International Searching Authority in counterpart International Patent Application No. PCT/KR2014/002489.
Communication dated Jul. 2, 2014 issued by the International Searching Authority in counterpart International Patent Application No. PCT/KR2014/002462.
Communication dated Feb. 8, 2017, issued by the Federal Service on Intellectual Property in counterpart Russian Patent Application No. 2015145969.
Communication dated Feb. 21, 2017 issued by European Patent Office in counterpart European Application No. 14161998.1.
Communication issued by the European Patent Office dated Oct. 24, 2017 in counterpart European Patent Application No. 14161998.1.
Communication issued by the State Intellectual Property Office of P.R. China dated Nov. 14, 2017 in counterpart Chinese Patent Application No. 201410120449.1.
Communication issued by the State Intellectual Property Office of P.R. China dated Jan. 4, 2018 in counterpart Chinese Patent Application No. 201410119872.X.
Communication dated Oct. 6, 2016, issued by the Russian Patent Office in counterpart Russian Application No. 2015145945.
Communication dated Oct. 6, 2016, issued by the European Patent Office in counterpart European Application No. 14161980.9.
Gina Trapani, "Seven Easy Ways to Integrate Your Google Apps", Sep. 9, 2009, XP055305805, (6 pages total).
Communication dated May 23, 2017, issued by the Russian Patent Office in counterpart Russian Application No. 2015145945/08.
Communication dated Aug. 17, 2020, from the State Intellectual Property Office of the P.R. of China in Application No. 201410118879.X.
Communication dated Jun. 28, 2020, from the State Intellectual Property Office of the P.R. of China in Application No. 201410120447.2.
Communication dated Jun. 22, 2020, issued by the Korean Intellectual Property Office in Korean Application No. 10-2013-0089825.

* cited by examiner

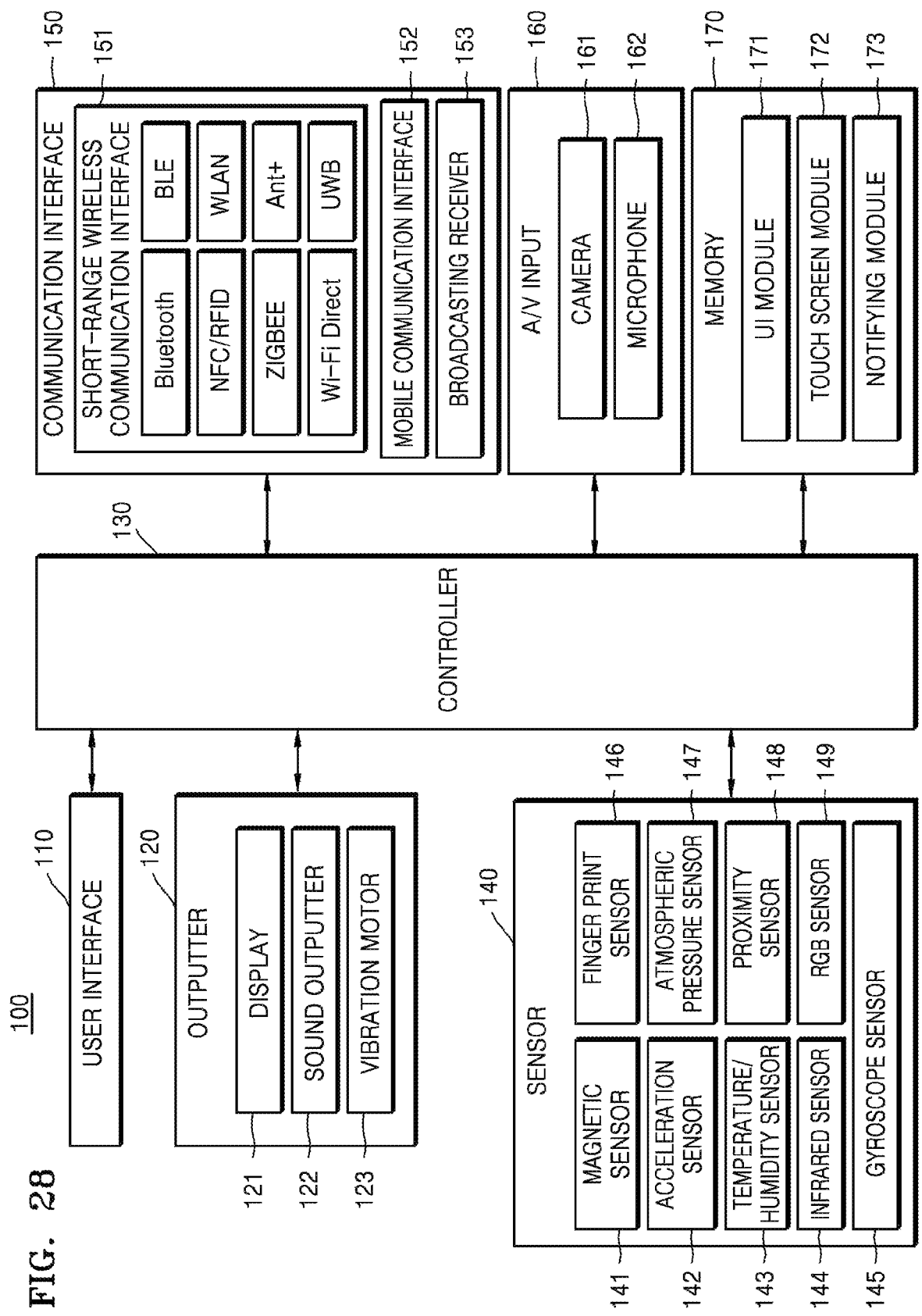

METHOD AND DEVICE FOR PROVIDING SECURITY CONTENT

CROSS-REFERENCE TO RELATED APPLICATIONS

This application is a Continuation of U.S. application Ser. No. 14/882,533, filed Oct. 14, 2015, which is a Continuation-in-Part of U.S. application Ser. No. 14/227,522, filed on Mar. 27, 2014, now U.S. Pat. No. 9,927,953, in the U.S. Patent and Trademark Office (USPTO), which claims priority from U.S. Provisional Application No. 61/805,632, filed on Mar. 27, 2013, in the USPTO, and also claims priority from Korean Patent Application No. 10-2013-0084934, filed on Jul. 18, 2013, in the Korean Intellectual Property Office (KIPO), the disclosures of which are incorporated herein in their entirety by reference.

BACKGROUND

1. Field

Methods and apparatuses consistent with exemplary embodiment relate to methods and apparatuses for securely providing security content by performing fingerprint authentication when executing an application.

2. Description of the Related Art

Mobile terminals may be configured to perform a variety of diverse functions. Examples of such diverse functions may include data and voice communications, capturing a photo or a moving image (e.g., video) using a camera, storing voice data, reproducing a music file through a speaker system, displaying an image or video, etc.

Some mobile terminals include additional functionality for executing games, and other mobile terminals include additional functionality for being implemented as multimedia devices. Moreover, with accelerated research and development in technologies related to mobile terminals such as smart phones, diverse applications for such mobile terminals are also being developed.

Meanwhile, as functions of smart phones have increased, private content received or stored in smart phones requires security safeguards on the device to increase. Thus, there is a need to develop a system to allow a user to easily and quickly access diverse specific applications while maintaining security of private content included in applications executing in the smart phone or other types of devices.

SUMMARY

Provided are method and device for securely providing security content associated with an application through an execution window of the application by performing fingerprint authentication when executing the application.

Additional aspects will be set forth in part in the description which follows and, in part, will be apparent from the description, or may be learned by practice of presented exemplary embodiments.

According to an aspect of an exemplary embodiment, a method, performed by a device, of providing security content includes receiving a touch and drag input indicating that a user drags a visual representation of a first application displayed on a touch screen of the device to a fingerprint recognition area while the user touches the visual representation of the first application with a finger; performing authentication on a fingerprint of the finger detected on the touch screen using a fingerprint sensor included in the fingerprint recognition area; and when the performing authentication on the fingerprint is successful, displaying the security content associated with the first application on an execution window of the first application.

The receiving of the touch and drag input may include: when the fingerprint recognition area is a home button area of the device, receiving the touch and drag input dragging the visual representation of the first application to the home button area while the user touches the first application.

The receiving of the touch and drag input may include: displaying visual representation of a plurality of applications on the touch screen; receiving an input indicating a user touching the visual representation of a first application, wherein the first application is among the plurality of applications; and when the first application includes the security content, displaying the fingerprint recognition area on the touch screen.

The displaying of the fingerprint recognition area may include displaying the fingerprint recognition area within a predetermined distance from a display position of the visual representation of the first application.

The performing authentication on the fingerprint of the finger may include: determining whether the first application includes the security content; and activating the fingerprint sensor included in the fingerprint recognition area based on a result of the determining.

The performing authentication on the fingerprint may include: performing authentication on the fingerprint based on a comparison of fingerprint information of the fingerprint detected by the fingerprint sensor and previously stored fingerprint information of a user.

The providing of the security content may include: when the performing authentication on the fingerprint is successful, executing the first application in an authentication mode and displaying the security content associated with the first application on the execution window of the first application; and when the performing authentication on the fingerprint is not successful, executing the first application in a normal mode and displaying normal content associated with the first application on the execution window of the first application.

The displaying of the security content may include displaying a page showing that a user is completely logged in to the first application. The displaying of the normal content may include displaying a page requesting the user to log in to the first application.

The method may further include: when the performing authentication on the fingerprint is successful, providing the first application with information associated with authentication on the fingerprint.

The method may further include: displaying a list of security content; receiving a touch and drag input of dragging identification information of first content displayed in the list of security content to the fingerprint recognition area while the user touches the identification information with the finger; performing authentication on the fingerprint of the finger detected using the fingerprint sensor included in the predefined fingerprint recognition area; and when the authentication on the fingerprint is successful, displaying the first content on the touch screen.

The method may further include receiving a touch input corresponding to a user touching the visual representation of the first application; displaying a plurality of functions provided by the first application within a predetermined distance on the display screen from a location where the touch input is received; receiving a touch and drag input of dragging a visual representation of a first function displayed among the plurality of functions to the fingerprint recognition area while the user touches the visual representation of first function with the finger; and when the performing authentication on the fingerprint is successful using the fingerprint sensor of the fingerprint recognition area, providing the first function on the execution window of the first application.

According to an aspect of another exemplary embodiment, a device includes a touch screen configured to display a visual representation of a first application and receive a touch and drag input indicating that a user drags the visual representation of the first application to a fingerprint recognition area while the user touches the visual representation of the first application with a finger; and a controller configured to perform authentication on a fingerprint of the finger detected on the touch screen during the touch and drag, using a fingerprint sensor of the fingerprint recognition area, and when authentication on the fingerprint is successful, display security content associated with the first application on an execution window of the first application.

The fingerprint recognition area may include a previously determined hardware button area.

The controller may be further configured to display visual representations of a plurality of applications on the touch screen, receive an input signal corresponding to a user touching the visual representation of first application among the visual representations of the plurality of applications, and when the first application includes the security content, display the fingerprint recognition area on the touch screen.

The controller may be further configured to provide visual representation of the fingerprint recognition area within a predetermined distance from a display position of the visual representation of the first application.

The controller may be further configured to activate the fingerprint sensor of the fingerprint recognition area based on a result of determining whether the first application includes the security content.

The controller may be further configured to perform authentication on the fingerprint based on a comparison of information regarding the fingerprint detected by the fingerprint sensor and previously stored fingerprint information of a user.

When authentication on the fingerprint is successful, the controller may be further configured to execute the first application in an authentication mode to display the security content associated with the first application on the execution window of the first application, and when authentication on the fingerprint is not successful, execute the first application in a normal mode to display normal content associated with the first application on the execution window of the first application.

When authentication on the fingerprint is successful, the controller may be further configured to provide the first application with information associated with authentication on the fingerprint.

A non-transitory computer-readable storage medium may store a computer program for executing the method, performed by the device.

The fingerprint recognition area may be designated by a user to a selected area of the touch screen.

The fingerprint recognition area may be designated by a user to be visually discernible on the selected area of the touch screen.

The fingerprint recognition area may be designated by a user to be visually indiscernible on the touch screen.

Whether any of the plurality of applications includes the security content may be designated by the user.

The controller may be further configured to receive user designation for selecting the fingerprint recognition area on the touch screen.

The controller may be further configured to make the fingerprint recognition area visually discernible according to a user setting.

The controller may be further configured to make the fingerprint recognition area visually indiscernible according to a user setting.

The controller may be further configured to designate whether any of the plurality of applications includes the security content according to a user setting.

According to an aspect of another exemplary embodiment, a method, performed by a device, of providing security content, includes receiving a first touch input indicating that a user touches a fingerprint recognition area of the device with a first finger; receiving a second touch input from a touch screen of the device indicating that a user touches a visual representation of the first application with a second finger; performing authentication on a fingerprint of the first finger detected on the fingerprint recognition area using a fingerprint sensor included in the fingerprint recognition area; and when the performing authentication on the first fingerprint is successful, displaying the security content associated with the first application on an execution window of the first application.

The touch screen of the device may display a list of security content and receive a touch and drag input of dragging identification information of first content displayed in the list of security content to the fingerprint recognition area while touching the identification information with the finger. The controller may perform authentication on the fingerprint of the finger detected using the fingerprint sensor included in the predefined fingerprint recognition area and when the authentication on the fingerprint is successful, display the first content on the touch screen.

The touch screen of the device may display a plurality of functions provided by the first application within a predetermined distance from a location where a touch input touching the first application is received; receive a touch and drag input of dragging a first function displayed among the plurality of functions to the predefined fingerprint recognition area while touching the first function with the finger. When the authentication on the fingerprint is successful using the fingerprint sensor of the fingerprint recognition area, the controller may provide the first function on the execution window of the first application.

BRIEF DESCRIPTION OF THE DRAWINGS

The above and/or other aspects will become apparent and more readily appreciated from the following description of exemplary embodiments, taken in conjunction with the accompanying drawings in which:

FIGS. 27 and 28 are block diagrams of a device according to an exemplary embodiment.

DETAILED DESCRIPTION

Figure 1:
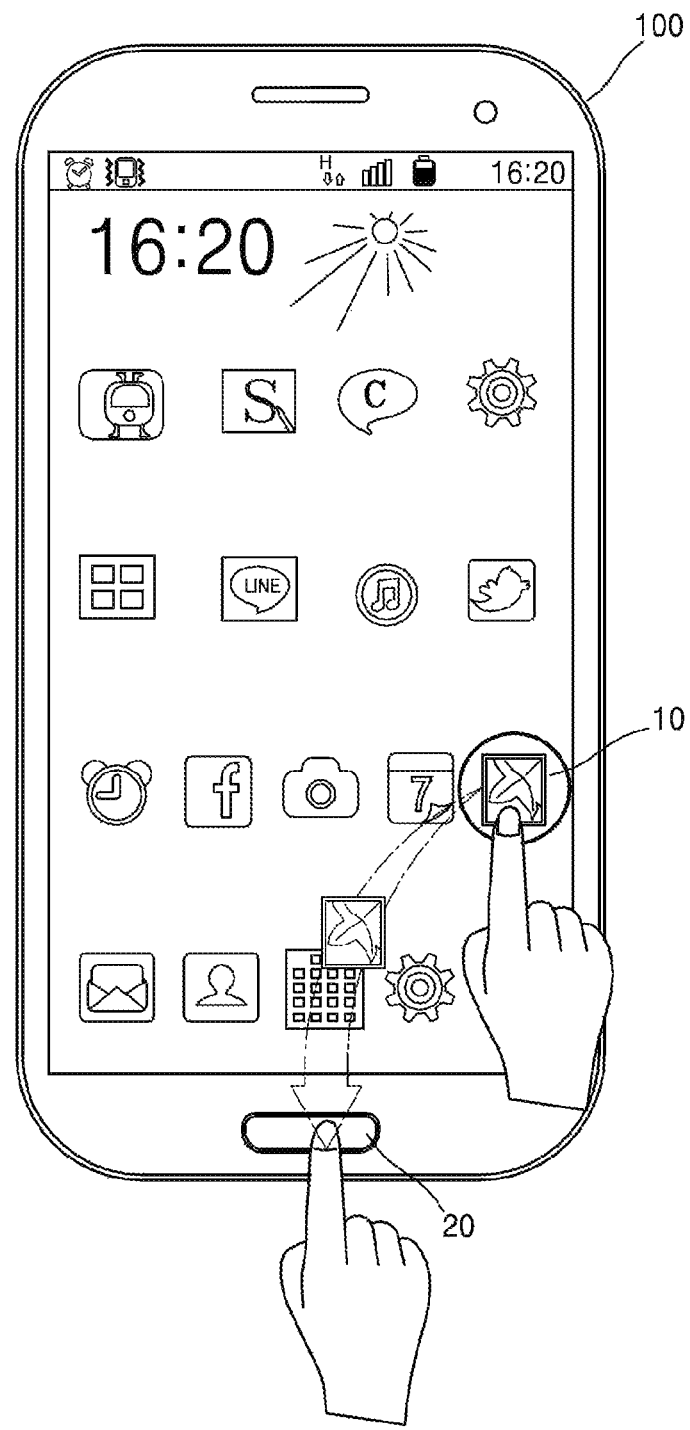
FIG. 1 is a diagram for explaining a device according to an exemplary embodiment.

Reference will now be made in detail to exemplary embodiments, examples of which are illustrated in the accompanying drawings, wherein like reference numerals refer to like elements throughout. In this regard, present exemplary embodiments may have different forms and should not be construed as being limited to the descriptions set forth herein. Accordingly, exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

All terms including descriptive or technical terms which are used herein should be construed as having meanings that are well understood by one of ordinary skill in the art. However, the terms may have different meanings according to an intention or context as understood by of one of ordinary skill in the art, precedential cases, or applicability in new technologies. Also, some terms may be arbitrarily selected by the applicant. If such is the case, the meaning of the terms will be described in detail in the detailed description of exemplary embodiments. Thus, the terms used herein should be defined based on the meaning of the terms together with the description throughout the specification.

Also, when a part "includes" or "comprises" an element, unless there is a particular description contrary thereto, the part may further include other elements, not excluding the other elements. In the following description, terms such as "unit" and "module" indicate a unit for processing at least one function or operation, wherein the unit and the block may be embodied as hardware or software or may be embodied by combining hardware and software, such as in one or more processors.

Throughout the specification, the term "application" is a computer program set devised to perform a specific task. The application described in the specification may vary. For example, the application may include a call application, a message application, a social networking service (SNS) application, a game application, a moving image reproduction application, a map application, a memo application, a broadcasting application, an exercise support application, a payment application, a photo editing application, etc. but is not limited thereto.

One or more exemplary embodiments will now be described more fully with reference to the accompanying drawings. However, the one or more exemplary embodiments may be embodied in many different forms, and should not be construed as being limited to exemplary embodiments set forth herein. Rather, these exemplary embodiments are provided so that this disclosure will be thorough and complete, and will fully convey the concepts of this disclosure to those of ordinary skill in the art. In the following description, well-known functions or constructions are not described in detail since they would obscure one or more exemplary embodiments with unnecessary detail, and like reference numerals in the drawings denote like or similar elements throughout the specification.

Throughout the specification, the term "lock-screen" indicates a software screen for unlocking a device. When the device receives an appropriate user input for unlocking the device displaying the lock-screen, the device is unlocked.

FIG. 1 is a diagram for explaining a device 100 according to an exemplary embodiment.

The device 100 according to an exemplary embodiment may be an apparatus that executes an application according to a user input. The device 100 according to an exemplary embodiment may display visual representation of the application on a touch screen.

According to an exemplary embodiment, various sensors may be provided in or near the touch screen to detect a user touch input on the touch screen. For example, a tactile sensor may be provided to detect the user touch input. The tactile sensor detects a contact of a specific object at least as sensitively as a person can detect similar contact. The tactile sensor may detect various types of information such as the roughness of a contact surface, the hardness of the contact object, the temperature of a contact point, or the like.

Another example of a sensor to detect the touch input on the touch screen is a proximity sensor. The proximity sensor is a sensor for detecting an object which is approaching a predetermined detection surface or a neighboring object by using the strength of an electromagnetic field or an infrared light. Examples of the proximity sensor include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, and an infrared proximity sensor.

Throughout the specification, the "touch input" or "user touch input" is a user gesture on the touch screen performed to control the device 100, etc. For example, touches described in the specification may include a tap/tapping, a touch & hold/touching and holding, a double-tap/double tapping, a drag/dragging, panning, a flick/flicking, a drag-and-drop/dragging and dropping, a pinch/pinching, a swipe/swiping, etc.

"Tapping" is a user's motion of touching a screen by using a finger or a touch tool such as an electronic pen and then instantly lifting the finger or touch tool from the screen without moving the finger or touch tool across the face of the touch screen. For example, a time difference between a touch-in time when the finger or the touch tool touches on the screen and a touch-out time when the finger or the touch tool is lifted from the screen is shorter than or equal to 1 second.

"Touching & holding" is a user's motion of touching a screen by using a finger or a touch tool such as an electronic pen and then maintaining the above touching motion for a critical time (e.g., 2 seconds) or longer, after touching the screen. For example, a time difference between a touch-in time and a touch-out time is greater than or equal to the critical time, such as, 2 seconds. When a touch input lasts more than the critical time, a feedback signal may be provided in a visual, acoustic, or tactile manner, in order to inform the user whether the touch input is tapping or touching & holding. The length of the critical time may vary according to exemplary embodiments.

"Double tapping" is a user's motion of touching the screen twice by using the finger or touch tool (such as a stylus pen). For example, double tapping is a user's motion of tapping the screen twice with a predetermined time in between the taps.

"Dragging" is a user's motion of touching the screen by using the finger or touch tool and moving the finger or touch tool across the face of the touch screen to another position on the screen while maintaining contact with the screen. The dragging motion may enable the moving or panning motion of an object.

"Panning" is a user's motion of performing a dragging motion without selecting an object. Since no object is selected in the panning motion, no object is moved in a page but the page itself is moved on the screen or a group of objects may be moved within a page.

"Flicking" is a user's motion of performing a dragging or panning motion at a critical speed or more, for example, 100 pixels/s, by using the finger or touch tool. The dragging (panning) motion or the flicking motion may be distinguished based on whether the moving speed of the finger or touch tool is over the critical speed, for example, 100 pixels/s, or not.

"Dragging & Dropping" is a user's motion of dragging an object to a predetermined position on the screen by using the finger or touch tool and then dropping the object at that position.

"Pinching" is a user's motion of moving two fingers touching the screen. The pinching motion is a gesture to magnify (open pinch) or contract (close pinch) an object or a page depending on the direction of movement of the two fingers. A magnification value or a contraction value is determined according to the distance between the two fingers.

"Swiping" is a user's motion of touching an object on the screen by using the finger or touch tool and simultaneously moving the object horizontally or vertically by a predetermined distance. A swiping motion in a diagonal direction may not be recognized as a swiping event.

The device 100 according to an exemplary embodiment may be implemented in various forms. For example, the device 100 described in the specification may include a cellular phone, a smart phone, a laptop computer, a tablet personal computer (PC), an e-book terminal, a digital broadcasting terminal, a personal digital assistant (PDA), a portable multimedia player (PMP), a navigation device, an MP3 player, etc. but the device 100 is not limited thereto.

Meanwhile, according to an exemplary embodiment, the device 100 may display an object for identifying the application on the touch screen as a visual representation of the application. For example, the device 100 may display an icon, a symbol, text, a window, etc. corresponding to the application on the touch screen as the object for identifying the application but is not limited thereto. A case where the object for identifying the application is the icon 10 will now be described as an example for convenience of description below. An exemplary embodiment shows a touch and drag as indicated by the dash-dot arrow.

According to an exemplary embodiment, the device 100 may display the object for identifying the application as a visual representation on a home screen or a lock screen but is not limited thereto.

According to an exemplary embodiment, the device 100 may include a fingerprint sensor for recognizing a fingerprint of a finger. A fingerprint refers to a pattern of raised lines on the fingers of a human hand. Raised lines are referred to as ridges, and sunken parts between two ridges are referred to as valleys. That is, a fingerprint may be defined by ridges and valleys present on a fingertip.

Fingerprint recognition is a process of comparing previously stored fingerprints against candidate fingerprints placed on the touch screen for authentication purposes, for example, comparing ridges of previously stored fingerprints against those of candidate fingerprints. Bio information necessary for fingerprint recognition is referred to as a feature of a fingerprint, wherein the feature present in a fingerprint is referred to as "minutia (minutiae)". Minutiae can be divided into ridge endings and ridge bifurcations. A ridge ending refers to a point where a ridge ends. A ridge bifurcation refers to a point where a single ridge divides into two ridges. A single fingerprint includes one or more ridge endings and bifurcations. According to an exemplary embodiment, the device 100 may perform fingerprint recognition using an algorithm that extracts, stores, and compares locations and attributes of minutiae formed of ridge bifurcations and endings.

According to an exemplary embodiment, the device 100 may include one fingerprint sensor or a plurality of fingerprint sensors. In this regard, a fingerprint sensor may be located inside or near the touch screen and may be located near a specific hardware button (for example, a home button, a power button, a volume control button, a backside button, etc.) An exemplary embodiment illustrates the fingerprint sensor for fingerprint recognition over home button 20. The fingerprint sensor may also be located in a cover or a case for protecting the device 100 but is not limited thereto.

According to an exemplary embodiment, the device 100 may control a state of the fingerprint sensor. For example, the device 100 may set the fingerprint sensor to an inactive state and, when a specific event occurs, set the fingerprint sensor to an active state. In this regard, the specific event may be an event associated with fingerprint recognition.

Meanwhile, according to an exemplary embodiment, the fingerprint sensor may include an optical type fingerprint sensor, a capacitive type fingerprint sensor, an ultrasound type fingerprint sensor, a thermal recognition type fingerprint sensor, a non-contact type fingerprint sensor, etc. but is not limited thereto. The optical type fingerprint sensor may obtain a fingerprint image using a light source and a camera. The capacitive type fingerprint sensor may obtain the fingerprint image by sensing a difference in an amount of electricity between ridges and valleys.

The device 100 may provide a swipe type fingerprint recognition function of recognizing a fingerprint by swiping a finger from up to down and an area type fingerprint recognition function of recognizing the fingerprint by touching a predetermined area with the finger but is not limited thereto.

According to an exemplary embodiment, the device 100 may store fingerprint information that is previously registered by a user for fingerprint recognition in a storage medium. In this regard, the device 100 may encrypt and store the previously registered fingerprint information.

A method of securely providing security content by performing fingerprint recognition when the device 100 executes an application according to an exemplary embodiment will be described in detail with reference to FIG. 2 below.

In operation S210, the device 100 may receive a touch and drag input where a user drags visual representation of a first application displayed on a touch screen to a fingerprint recognition area while touching the visual representation of the first application with a finger.

According to an exemplary embodiment, touching an application may mean touching at least one of an image, an icon, a symbol, and text visually representing the application. According to an exemplary embodiment, the device 100 may receive a touch and drag input that touches and drags a first icon of the first application among icons respectively corresponding to a plurality of applications.

According to an exemplary embodiment, the fingerprint recognition area may be an area in which a fingerprint sensor is located and may provide a fingerprint recognition function. The fingerprint recognition area may be predefined. For example, the fingerprint recognition area may be an area defined by the device 100 or may be an area defined by a user.

According to an exemplary embodiment, a location of the fingerprint recognition area may be fixed or may be changed according to a location of an application. For example, the fingerprint recognition area may be fixed to an upper end portion of the touch screen. The fingerprint recognition area may be displayed around the icon of a selected application.

According to an exemplary embodiment, the device 100 may display the fingerprint recognition area to be differentiated from a surrounding area thereof. For example, the device 100 may display or highlight a boundary of the fingerprint recognition area, display the fingerprint recognition area such that the color thereof differs from a color of a background screen, or display the fingerprint recognition area to flash at a predetermined cycle, but is not limited thereto.

Meanwhile, according to an exemplary embodiment, the device 100 may display the fingerprint recognition area to be differentiated from a surrounding area thereof when a specific event occurs. For example, when the user touches an icon of one of the plurality of applications, the device 100 may highlight the fingerprint recognition area. If the user starts dragging the first application icon after touching the first application, the device 100 may highlight the fingerprint recognition area but is not limited thereto.

According to an exemplary embodiment, the fingerprint recognition area may be located in a bezel or may be located in a lateral side or a back side of the device 100. According to an exemplary embodiment, the fingerprint recognition area may be located on a specific hardware button. For example, when the predefined fingerprint recognition area is a home button area, the device 100 may receive a touch and drag input that drags the first application to the home button area while touching the icon for the first application.

In operation S220, the device 100 may perform authentication on a fingerprint of the finger using the fingerprint sensor of the fingerprint recognition area.

According to an exemplary embodiment, the device 100 may perform authentication on the fingerprint of the finger through fingerprint recognition algorithm that uses minutiae. The fingerprint recognition algorithm that uses minutiae may include a minutiae extraction process of extracting minutiae from a fingerprint image obtained by the fingerprint sensor and a minutiae matching process of comparing the extracted minutiae and predefined minutiae and determining a similarity between two fingerprints. Minutiae mean a part where a change in a flow of a ridge occurs, like an ending (where the flow of the ridge ends) and a bifurcation (where a single ridge divides into two ridges).

The minutiae extraction process is a process of configuring a minutiae data file that is to be used in the minutiae matching process and may include, for example, preprocessing, minutiae, and post processing operations. The preprocessing operation may include image improvement, binarization, and thinning operations. If the preprocessing operation ends, the minutiae operation may be performed. The post processing operation corrects a ridge part that causes false minutiae, removes the false minutiae, adds omitted minutiae, and extracts final minutiae.

The minutiae matching process may be performed using the minutiae data file obtained as a result of the extraction process. The minutiae matching process may include alignment, matching, and scoring operations. For example, the device 100 may compare minutiae data obtained as the result of the extraction process with minutiae data of a fingerprint previously registered in a database. In this regard, the minutiae data obtained as the result of the extraction process and the minutiae data of the previously registered fingerprint are identical to each other, the device 100 may authenticate the user.

Meanwhile, according to an exemplary embodiment, when a fingerprint recognition type is a swipe type, the device 100 may perform authentication on the fingerprint of the finger if receiving a gesture of swiping the predefined fingerprint recognition area with the finger.

When the fingerprint recognition type is an area type, the device 100 may perform authentication on the fingerprint of the finger according to an input of touching and holding the predefined fingerprint recognition area.

According to an exemplary embodiment, information regarding the previously registered fingerprint may be stored in a memory or an external storage medium (for example, a cloud server, a SD card, an external wearable device, etc.). The device 100 may retrieve the information regarding the previously registered fingerprint from the memory or the external storage medium to authenticate the fingerprint recognition. The information regarding the previously registered fingerprint may include a fingerprint image, minutiae data of the fingerprint, user identification information corresponding to the fingerprint, etc.

In operation S230, the device 100 may determine whether authentication on the fingerprint of the finger succeeds.

For example, when a similarity between a first fingerprint image (or first minutiae data of a first fingerprint) obtained by the fingerprint sensor and a previously registered second fingerprint image (or second minutiae data of a second fingerprint) exceeds a threshold value (for example, 98%), the device 100 may determine that authentication on the fingerprint of the finger has succeeded.

To the contrary, when the similarity between the first fingerprint image (or the first minutiae data of the first fingerprint) obtained by the fingerprint sensor and the previously registered second fingerprint image (or the second minutiae data of the second fingerprint) does not exceed the threshold value (for example, 98%), the device 100 may determine that authentication on the fingerprint of the finger has failed.

According to an exemplary embodiment, when there are a plurality of previously registered fingerprints, the device 100 may compare the first fingerprint image obtained by the fingerprint sensor with a plurality of previously registered second fingerprint images. When a similarity between at least one of the plurality of previously registered second fingerprint images and the first fingerprint image exceeds the threshold value (for example, 98%), the device 100 may determine that authentication on the fingerprint of the finger succeeds.

In operation S240, when authentication on the fingerprint of the finger succeeds, the device 100 may provide an execution window of the first application with security content associated with the first application.

In the present specification, the security content may mean content that only a specific device or user is allowed to access. For example, the security content may be personal finance related information, log-in information, personal profile information, personal email information, diary information, etc. but is not limited thereto.

The security content may include moving image content (for example, TV program videos, video on demand (VOD), user created content (UCC), music video, Youtube videos, etc.), still image content (for example, photos, pictures, etc.), text content (for example, e-books including poetry, novels, etc., letters, working files, web pages, etc.), music content (for example, music, musical programs, radio broadcasting, etc.), but is not limited thereto.

According to an exemplary embodiment, the security content may be content encrypted using a specific encryption key. In this regard, the security content may be decrypted when authentication on the fingerprint of the user succeeds.

According to an exemplary embodiment, the device 100 may execute the first application when authentication on the fingerprint of the finger succeeds. The device 100 may provide the execution window of the first application with the security content. In the present specification, providing the security content may mean that the user may access the security content without an additional authentication procedure or login procedure.

Meanwhile, according to an exemplary embodiment, the device 100 may not execute the first application when authentication on the fingerprint of the finger fails. When authentication on the fingerprint of the finger fails, the device 100 may display only normal content on the execution window of the first application and may not display the security content.

A method of securely providing security content by performing fingerprint recognition when the device 100 executes an application according to an exemplary embodiment will be described in more detail with reference to FIG. 3 below.

Figure 3:
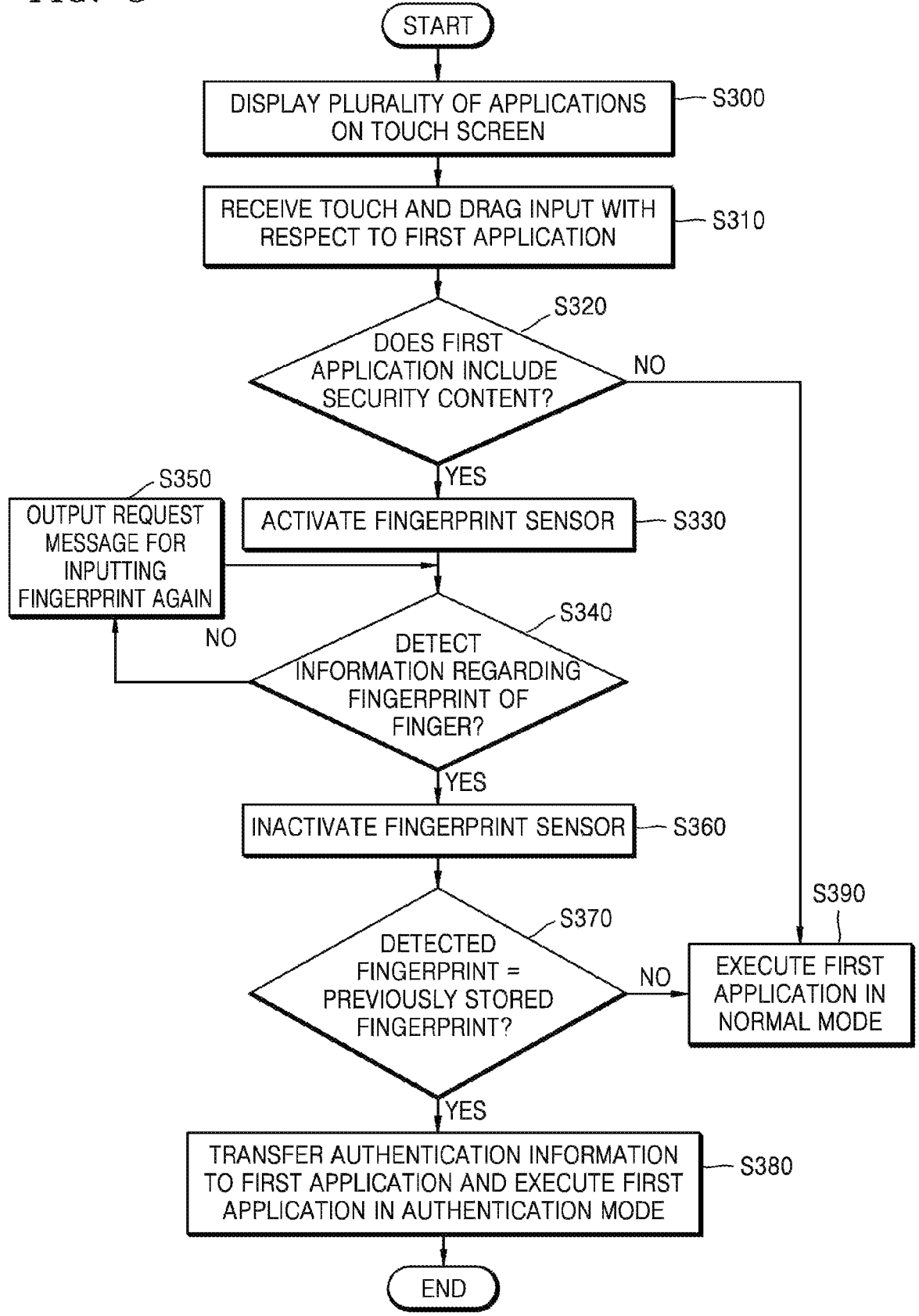
FIG. 3 is a flowchart of a method of determining an execution mode of an application based on an authentication result according to an exemplary embodiment.

FIG. 3 is a flowchart of a method of determining an execution mode of an application based on an authentication result according to an exemplary embodiment.

In operation S300, the device 100 may display icons for a plurality of applications on a touch screen. For example, the device 100 may display icons respectively indicating the plurality of applications on the touch screen.

According to an exemplary embodiment, the device 100 may display a plurality of application icons on a lock screen or may display the plurality of application icons on an unlock screen.

In operation S310, the device 100 may receive a touch and drag input with respect to a first application. For example, the device 100 may receive the touch and drag input that drags a first icon indicating the first application to a fingerprint recognition area while touching the first icon. Operation S310 may correspond to operation S210 of FIG. 2, and thus a detailed description thereof is omitted.

In operation S320, the device 100 may determine whether the first application includes security content.

According to an exemplary embodiment, the device 100 may determine whether authentication is necessary when executing the first application. For example, the device 100 may determine whether personal content that only a specific user is allowed to access is included in an execution window of the first application.

According to an exemplary embodiment, when the first application does not include the security content, the device 100 may execute the first application in a normal mode. Executing the first application in the normal mode may mean that only content accessible or viewable by anyone is displayed on the execution window of the first application when executing the first application.

In operation S330, the device 100 may activate a fingerprint sensor of the fingerprint recognition area when the first application includes the security content. For example, when the first application includes the security content, it is necessary to authenticate whether a user desiring to execute the first application is a previously registered user that is able to access the security content. The device 100 may activate the fingerprint sensor to authenticate the user in this situation.

In operation S340, the device 100 may detect information regarding a fingerprint of a finger using the activated fingerprint sensor. For example, the fingerprint sensor of the device 100 may obtain a fingerprint image of the finger of the user that touches the fingerprint recognition area. The fingerprint sensor of the device 100 may extract locations or attributes of minutiae configured as ridge bifurcations, ridge endings, cores (e.g., cores of fingerprint patterns), delta (where ridges meet and form a triangle), etc., and generate minutiae data.

In operation S350, the device 100 may output a request message for inputting the fingerprint again when not detecting the information regarding the fingerprint of the finger using the fingerprint sensor. For example, the device 100 may output a message to input the fingerprint again when not generating the minutiae data from the fingerprint image obtained by the fingerprint sensor.

After the device 100 outputs the request message, when the user touches or swipes the fingerprint recognition area with the finger again, the device 100 may detect the information regarding the fingerprint of the finger again.

In operation S360, the device 100 may inactivate the fingerprint sensor of the fingerprint recognition area when detecting the information regarding the fingerprint of the finger. According to an exemplary embodiment, the device 100 may selectively activate the fingerprint sensor only when fingerprint recognition is necessary, thereby reducing power consumption caused by the fingerprint sensor.

In operation S370, the device 100 may determine whether a detected fingerprint and a previously stored fingerprint are identical to each other.

According to an exemplary embodiment, the device 100 may read previously stored fingerprint information from a memory so as to perform fingerprint recognition. The memory may be located inside or outside the device 100.

For example, the device 100 may determine whether a similarity between a first fingerprint image obtained by the fingerprint sensor and a previously registered second fingerprint image for fingerprint recognition exceeds a threshold value (for example, 95%). Alternatively, the device 100 may compare first minutiae data of a first fingerprint detected by the fingerprint sensor with second minutiae data of a second fingerprint previously stored in the memory. In this regard, the device 100 may determine whether a similarity between the first minutiae data and the second minutiae data exceeds the threshold value (for example, 95%).

According to an exemplary embodiment, when the similarity between the first fingerprint image (or the first minutiae data of the first fingerprint) obtained by the fingerprint sensor and the previously registered second fingerprint image (or the second minutiae data of the second fingerprint) for fingerprint recognition exceeds the threshold value (for example, 95%), the device 100 may determine that authentication on the fingerprint of the finger succeeds.

To the contrary, when the similarity between the first fingerprint image (or the first minutiae data of the first fingerprint) obtained by the fingerprint sensor and the previously registered second fingerprint image (or the second minutiae data of the second fingerprint) for fingerprint recognition does not exceed the threshold value (for example, 95%), the device 100 may determine that authentication on the fingerprint of the finger fails.

In operation S380, the device 100 may transfer information relating to authentication (hereinafter referred to as authentication information) to the first application when the detected fingerprint and the previously stored fingerprint are identical to each other. In this regard, the authentication information may include at least one of the fingerprint image obtained by the fingerprint sensor, the minutiae data of the fingerprint, and information (for example, an authentication success message) regarding a result of performing authentication but is not limited thereto.

For example, the device 100 may transfer the fingerprint image obtained by the fingerprint sensor or the minutiae data of the fingerprint to the first application. Alternatively, the device 100 may transfer the authentication success message to the first application.

In this case, the first application may transmit the authentication information to a server associated with the first application. When receiving the fingerprint image or the minutiae data of the fingerprint from the first application, the server may perform authentication based on the fingerprint image or the minutiae data of the fingerprint. For example, when the fingerprint image or the minutiae data of the fingerprint received from the first application is identical to a fingerprint image previously registered in the server or minutiae data of the previously registered fingerprint image, the server may determine that authentication succeeds. To the contrary, when the fingerprint image or the minutiae data of the fingerprint received from the first application is not identical to the fingerprint image previously registered in the server or minutiae data of the previously registered fingerprint image, the server may determine that authentication fails. Meanwhile, the server may receive the information (for example, the authentication success message) regarding the result of performing authentication from the device 100 using the fingerprint sensor.

When the server may determine that authentication succeeds, the server may select security content corresponding to identification information of the device 100 or identification information of the user and may transmit the selected security content to the first application installed in the device 100.

According to an exemplary embodiment, when authentication on the fingerprint of the finger succeeds, the device 100 may execute the first application in an authentication mode. For example, the device 100 may display security content associated with the first application on the execution window of the first application. The security content may be content that is encrypted and is previously stored in the device 100 or may be content received from the server associated with the first application.

For example, when authentication on the fingerprint of the finger succeeds, the device 100 may receive a personal page in a log-in status from the server and may display the personal page in the log-in status on the execution window of the first application.

In operation S390, when authentication on the fingerprint of the finger fails, the device 100 may execute the first application in a normal mode and may display normal content associated with the first application on the execution window of the first application. For example, when authentication on the fingerprint of the finger fails, the device 100 may display a normal page including a log-in information input window on the execution window of the first application.

Although operations S300 through S390 are illustrated in FIG. 3, some of operations S300 through S390 may be omitted, and the sequence thereof may be changed.

An operation in which the device 100 performs fingerprint authentication when a fingerprint recognition area is a home button area will be described with reference to FIG. 4 below.

Figure 4:
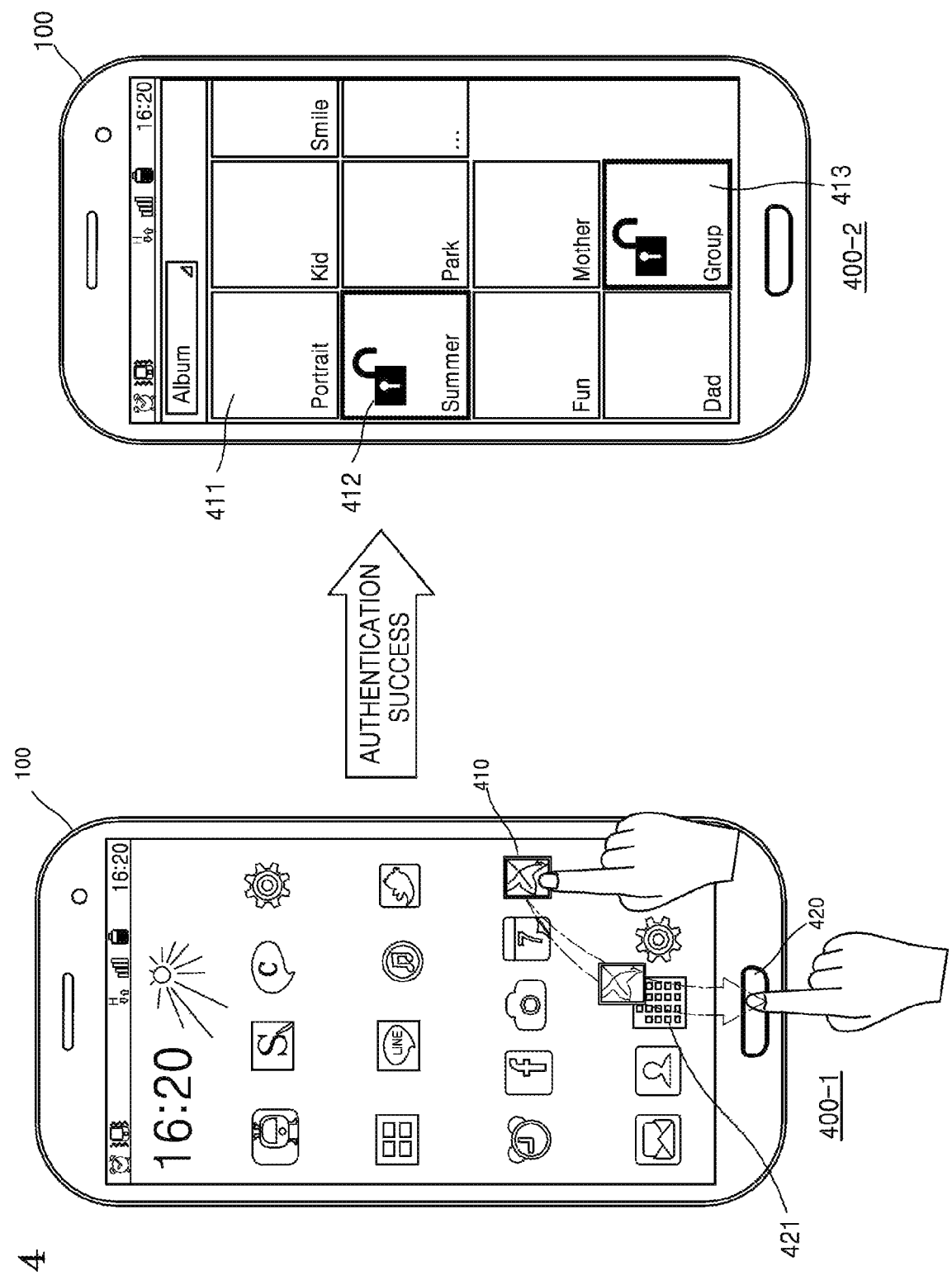
FIG. 4 is a diagram for describing an operation in which a device performs authentication on a fingerprint of a finger using a fingerprint sensor included in a home button.

FIG. 4 is a diagram for describing an operation in which the device 100 performs authentication on a fingerprint of a finger using a fingerprint sensor included in a home button.

Referring to 400-1 shown in FIG. 4, the device 100 may receive a signal indicating a user's touch of a first icon 410 of a photo management application with a finger on a touch screen and may receive a touch and drag input that drags the first icon 410 of the photo management application to a home button area 420 from a first user.

In this regard, a preparation area 421 for executing an application and preparing fingerprint recognition may be present on an upper end of the home button area 420. A case where the preparation area 421 is a rectangle is illustrated in 400-1 as an example but the exemplary embodiment is not limited thereto. The preparation area 421 may be a square or an oval and may have various other shapes.

The preparation area 421 may have the same size as that of an icon of the application. The preparation area 421 may be an area greater than two times that of the icon of the application but is not limited thereto.

According to an exemplary embodiment, if the first icon 410 starts being dragged, the device 100 may display the preparation area 421 to be differentiated from a surrounding area thereof. For example, the device 100 may highlight a boundary of the preparation area 421 or may change a color of the preparation area 421 to a color discriminated from a color of background. In this case, the first user may drag the first icon 410 to the home button area 420 via the preparation area 421.

According to an exemplary embodiment, when the first user's finger drags the first icon 410 and passes by the preparation area 421, the device 100 may prepare to execute the photo management application. The device 100 may activate a fingerprint sensor of the home button area 420 so as to perform fingerprint authentication.

The device 100 may obtain a fingerprint of the first user's finger that touches the home button area 420 using the activated fingerprint sensor. For example, when the first user drags the first icon 410 with the finger and swipes the home button area 420, the device 100 may capture a fingerprint image of the finger that swipes and may extract minutiae data of the captured fingerprint image.

The device 100 may perform authentication on the first user using the extracted minutiae data of the fingerprint image. For example, when minutiae data of a fingerprint image previously registered by the first user and the minutiae data of the fingerprint image obtained by the using the fingerprint sensor are identical to each other, the device 100 may determine that authentication succeeds.

Referring to 400-2 shown in FIG. 4, when authentication succeeds, the device 100 may execute the photo management application in an authentication mode. For example, the device 100 may provide not only normal folders (for example, a portrait folder 411) but also security folders (for example, a summer folder 412 and a group folder 413) on an execution window of the photo management application. In this regard, the summer folder 412 and the group folder 413 may be folders that only the first user is allowed to access.

Figure 5:
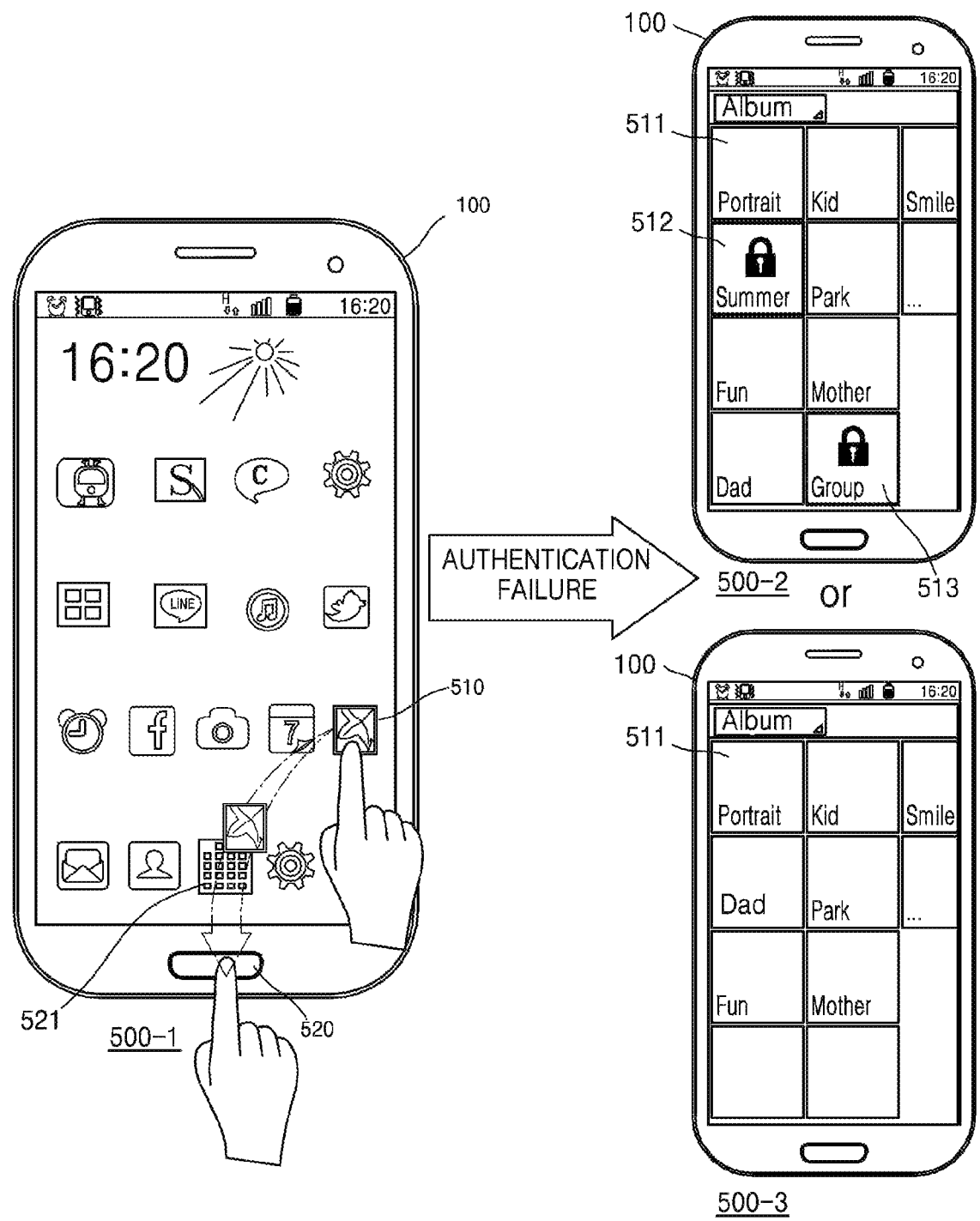
FIG. 5 is a diagram of an execution window of an application displayed when authentication on a fingerprint fails.

FIG. 5 is a diagram of an execution window of an application displayed when authentication on a fingerprint fails.

Referring to 500-1 shown in FIG. 5, the device 100 may receive a signal indicating user's touch of a first icon 510 of a photo management application with a finger on a touch screen and may receive a touch and drag input that drags the first icon 510 of the photo management application to a home button area 520 from a first user.

When the first user's finger drags the first icon 510 and passes by the preparation area 521, the device 100 may prepare to execute the photo management application. The device 100 may activate a fingerprint sensor of the home button area 520 so as to perform fingerprint authentication.

The device 100 may obtain a fingerprint of the first user's finger that touches the home button area 520 using the activated fingerprint sensor. For example, when the first user drags the first icon 510 with the finger and swipes the home button area 520, the device 100 may capture a fingerprint image of the finger and may extract minutiae data of the captured fingerprint image.

The device 100 may perform authentication on the first user using the extracted minutiae data of the fingerprint image. For example, when minutiae data of a fingerprint image previously registered by the first user and the minutiae data of the fingerprint image obtained by the using the fingerprint sensor are not identical to each other, the device 100 may determine that authentication fails.

Referring to 500-2 shown in FIG. 5, when authentication fails, the device 100 may execute the photo management application in a normal mode. For example, the device 100 may provide normal folders (for example, a portrait folder 511, a kid folder, a park folder, etc.) on an execution window of the photo management application. The device 100 may provide security folders (for example, a summer folder 512 and a group folder 513) in a lock state. The device 100 may display content stored in the security folders 512 and 513 only when additional authentication is completely performed. For example, the first user needs to proceed with a fingerprint recognition procedure again in order to check the content included in the summer folder 512.

Referring to 500-3 shown in FIG. 5, when authentication fails, the device 100 may execute the photo management application in the normal mode and may provide only the normal folders (for example, the portrait folder 511, the kid folder, the park folder, etc.) on the execution window of the photo management application. In this case, the device 100 may not display the security folders (for example, the summer folder 512 and the group folder 513) on the execution window of the photo management application.

Cases where the fingerprint recognition area is the home button areas 420 and 520, respectively, in FIGS. 4 and 5 are described above. A case where the fingerprint recognition area is located on a touch screen will now be described with reference to FIG. 6 below.

Figure 6:
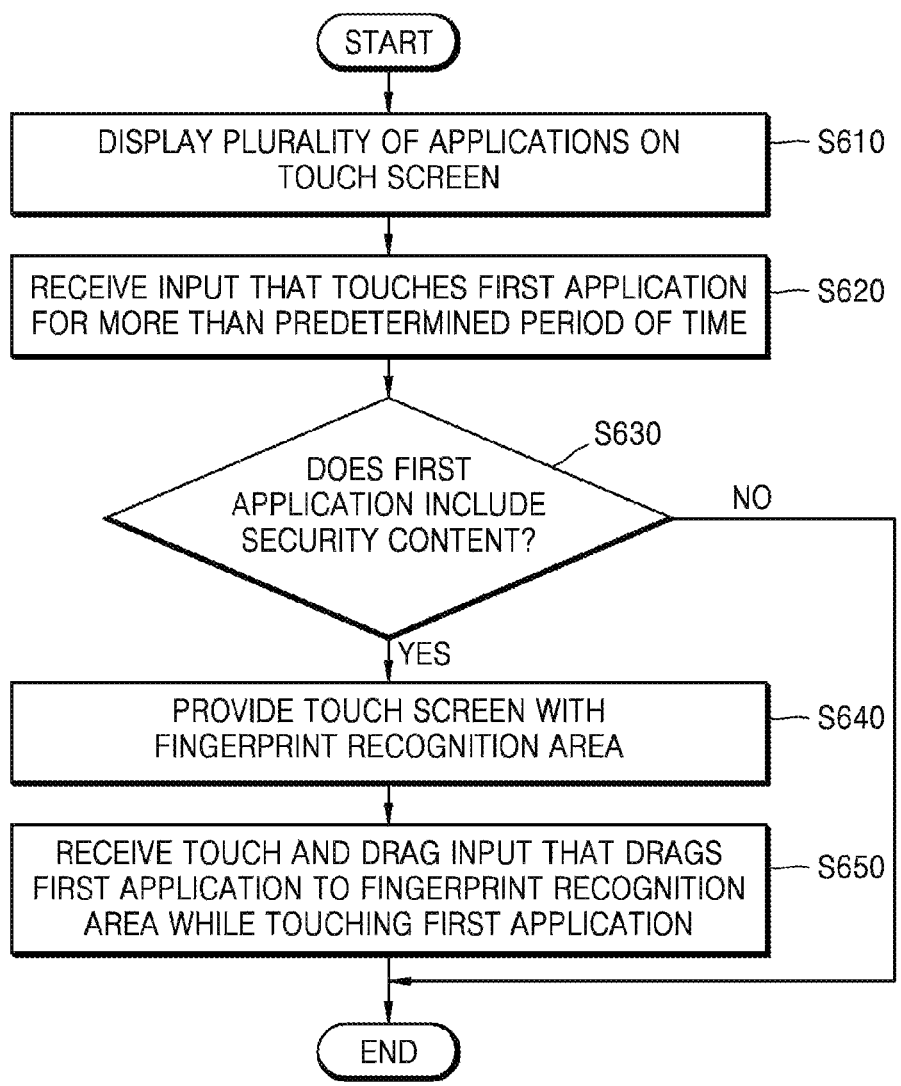
FIG. 6 is a flowchart of a method in which a device provides a fingerprint recognition area on a touch screen according to an exemplary embodiment.

FIG. 6 is a flowchart of a method in which the device 100 provides a fingerprint recognition area on a touch screen according to an exemplary embodiment.

In operation S610, the device 100 may display a plurality of applications on the touch screen. For example, the device 100 may display icons indicating the respective applications on the touch screen.

In operation S620, the device 100 may receive an input indicating that a user touches the icon of a first application among the plurality of applications. For example, the device 100 may receive the input that touches a first icon corresponding to the first application with a finger. As an exemplary embodiment, the touch may be ascertained to exceed a predetermined period of time.

In operation S630, the device 100 may determine whether the touched first application includes security content.

According to an exemplary embodiment, the device 100 may determine whether authentication is necessary when executing the first application. For example, the device 100 may determine whether personal content (for example, information for automatically logging into a website, email information, profile information, an encrypted document with a security key, etc.) that only a specific user is allowed to access is included in an execution window of the first application.

According to an exemplary embodiment, when the first application does not include the security content, the device 100 may execute the first application in a normal mode. When the first application does not include the security content, since authentication on a user is unnecessary, the device 100 may not provide the touch screen with a fingerprint recognition area.

In operation S640, when the first application includes the security content, the device 100 may provide the touch screen with the fingerprint recognition area.

For example, the device 100 may activate at least one fingerprint sensor inside the touch screen and may mark an area including the at least one activated fingerprint sensor as the fingerprint recognition area.

According to an exemplary embodiment, the device 100 may mark the fingerprint recognition area within a predetermined distance from the icon display area for the first application. For example, the device 100 may mark the fingerprint recognition area around (for example, a left side, a right side, an upper end, or a lower end of) the first application. In this regard, the fingerprint recognition area may be marked by being overlapped with the first application or separately from the first application.

According to an exemplary embodiment, the fingerprint recognition area may be located in an area on which the first application is marked. A case where the fingerprint recognition area is present in the area on which the first application is marked will be described in detail with reference to FIG. 25 later.

According to an exemplary embodiment, the device 100 may provide the fingerprint recognition area with a specific area of the touch screen. For example, the device 100 may provide the fingerprint recognition area with an upper end of the touch screen but is not limited thereto.

In operation S650, the device 100 may receive a touch and drag input that drags the icon for first application to the fingerprint recognition area while touching the first application icon. For example, when the first application includes the security content, the user who touches the first application icon may drag the first application icon to the fingerprint recognition area while touching the first application icon in order to check an access authorization for the security content.

According to an exemplary embodiment, if the first application icon starts being dragged, the device 100 may display the fingerprint recognition area to be differentiated from a surrounding area thereof. For example, the device 100 may highlight a boundary of the fingerprint recognition area or display the fingerprint recognition area such that the color thereof differs from a color of a background screen. Alternatively, the device 100 may display the fingerprint recognition area such that the boundary thereof flashes at a predetermined cycle.

According to an exemplary embodiment, when the finger that touches the first application icon is dragged to the fingerprint recognition area, the device 100 may perform authentication on a fingerprint of the finger using a fingerprint sensor of the fingerprint recognition area. When authentication on the fingerprint of the finger succeeds, the device 100 may display the execution window of the first application including the security content on the touch screen.

Figure 7A:
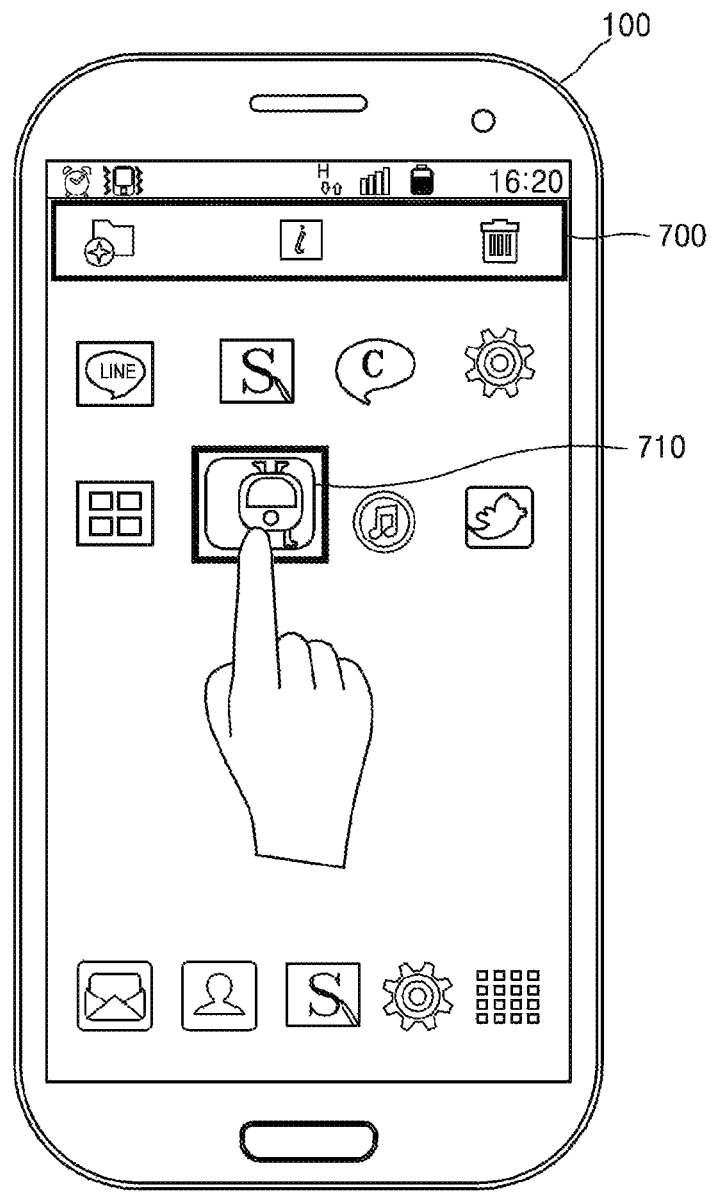
FIGS. 7A and 7B are diagrams for describing an operation in which a device provides a fingerprint recognition area according to a type of content including an application selected by a user.
Figure 7B:
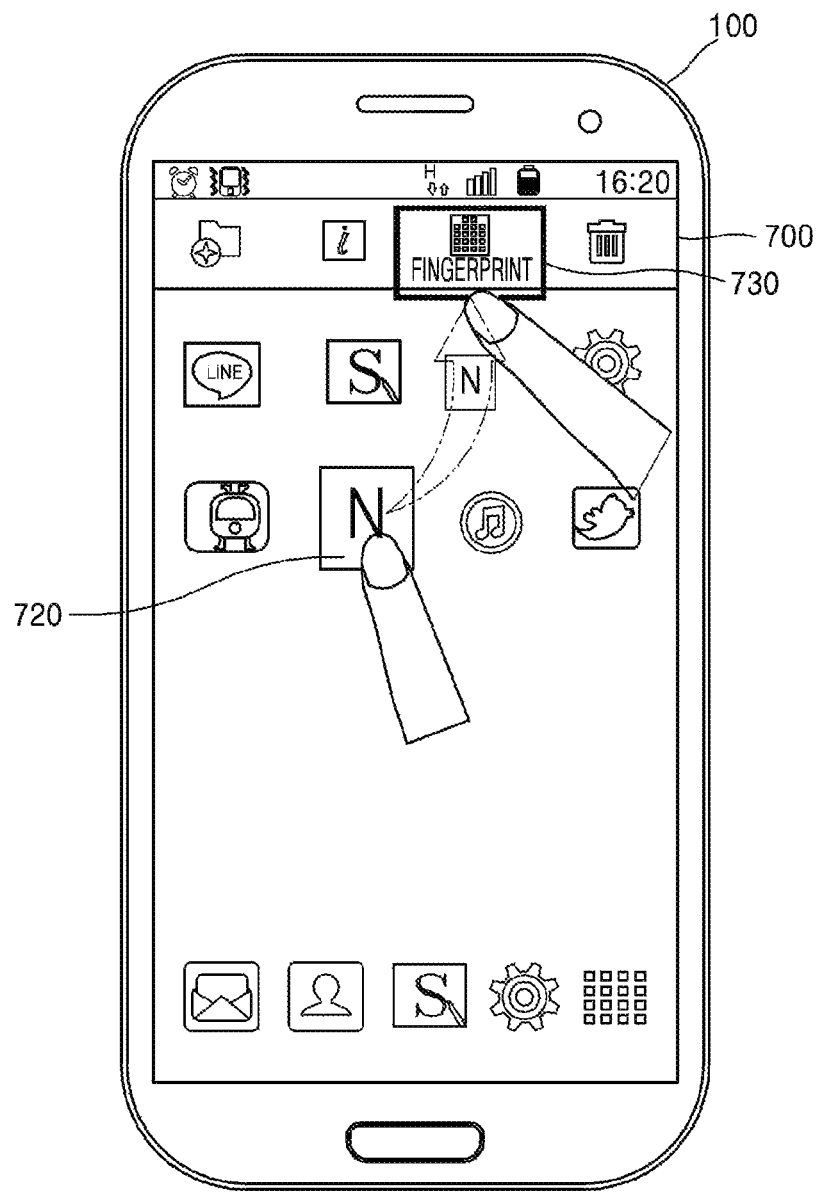

FIGS. 7A and 7B are diagrams for describing an operation in which the device 100 provides a fingerprint recognition area according to a type of content including an application selected by a user.

A case where a subway application 710 includes only normal content such as subway line information and does not include security content will now be described as an example with reference to FIG. 7A. A case where a search application 720 includes only the security content will now be described as an example with reference to FIG. 7B.

Referring to FIG. 7A, the device 100 may receive an input that selects one of a plurality of applications displayed on a touch screen. For example, the device 100 may receive the input that indicates a user touches the icon for the subway application 710 for more than a predetermined period of time (for example, 2 seconds).

The subway application 710 does not include the security content, and thus the device 100 may not provide the fingerprint recognition area on the touch screen. For example, the device 100 may display a folder addition item, an application information item, and a deletion item on a control window 700 and may not display the fingerprint recognition area in response to the input that touches the icon for subway application 710 for more than the predetermined period of time.

Referring to FIG. 7B, the device 100 may receive an input that indicates a user touches the icon for search application 720 among the plurality of application icons for more than the predetermined period of time (for example, 2 seconds).

The search application 720 includes the security content such as email information, and thus the device 100 may provide the fingerprint recognition area on the touch screen. For example, the device 100 may display a fingerprint recognition item 730 on the control window 700, in addition to the folder addition item, the application information item, and the deletion item, in response to the input indicating that a user touches the icon for search application 720 for more than the predetermined period of time.

In this case, the device 100 may receive an input that drags the icon for search application 720 to the fingerprint recognition item 730 displayed on the touch screen while touching the icon for search application 720 with a finger. When the finger is located in the fingerprint recognition item 730, the device 100 may obtain a fingerprint of the finger using a fingerprint sensor. The device 100 may perform authentication by comparing the obtained fingerprint with a previously registered fingerprint.

When authentication succeeds, the device 100 may display the security content on an execution window of the search application 720. When authentication fails, the device 100 may not display the security content on the execution window of the search application 720. An exemplary embodiment that different information is displayed on the execution window of the search application 720 according to whether authentication succeeds or fails will now be described with reference to FIG. 8 below.

Figure 8:
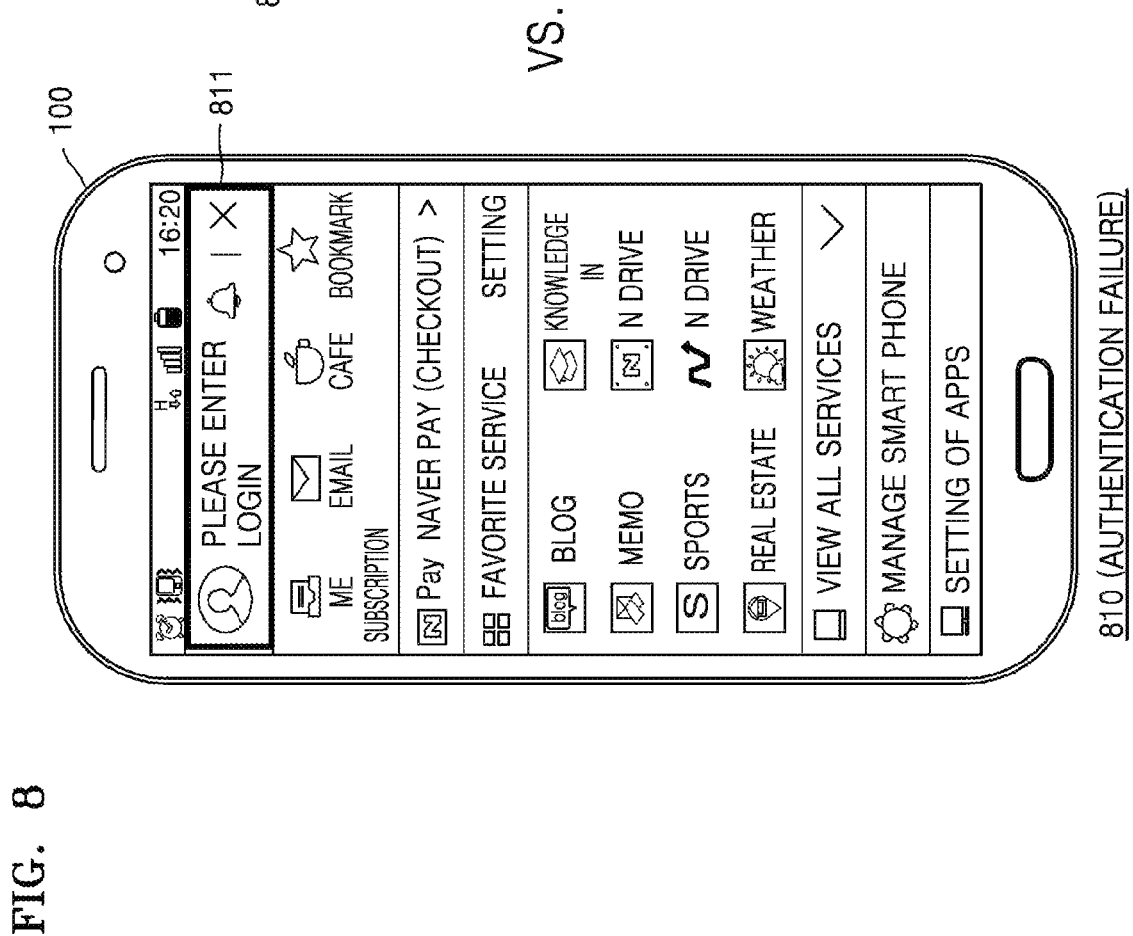
FIG. 8 is a diagram for describing an operation in which a device displays security content or normal content on an execution window of a search application according to an authentication result.

FIG. 8 is a diagram for describing an operation in which the device 100 displays security content or normal content on an execution window of the search application 720 according to an authentication result.

Referring to a screen 810 of FIG. 8, when authentication on a fingerprint of a finger obtained according to an input indicating that a user drags the icon for search application 720 to a fingerprint recognition area using the finger fails, the device 100 may display the normal content on the execution window of the search application 720. For example, when the fingerprint obtained through the fingerprint recognition area and a previously registered fingerprint are not identical to each other, the device 100 may display the normal content including a login information input window 811.

Referring to a screen 820 of FIG. 8, meanwhile, when authentication on the fingerprint of the finger obtained according to the input indicating that a user drags the icon for search application 720 to the fingerprint recognition area using the finger succeeds, the device 100 may display the security content on the execution window of the search application 720. For example, when the fingerprint obtained through the fingerprint recognition area and the previously registered fingerprint are identical to each other, the device 100 may display a personal page in a login status. In this regard, the personal page in the login status may include user profile information 821, email information 822, bookmark information, etc. The search application 720 of the device 100 may provide a blog service, an email service, etc. through the personal page in the login status.

Figure 9:
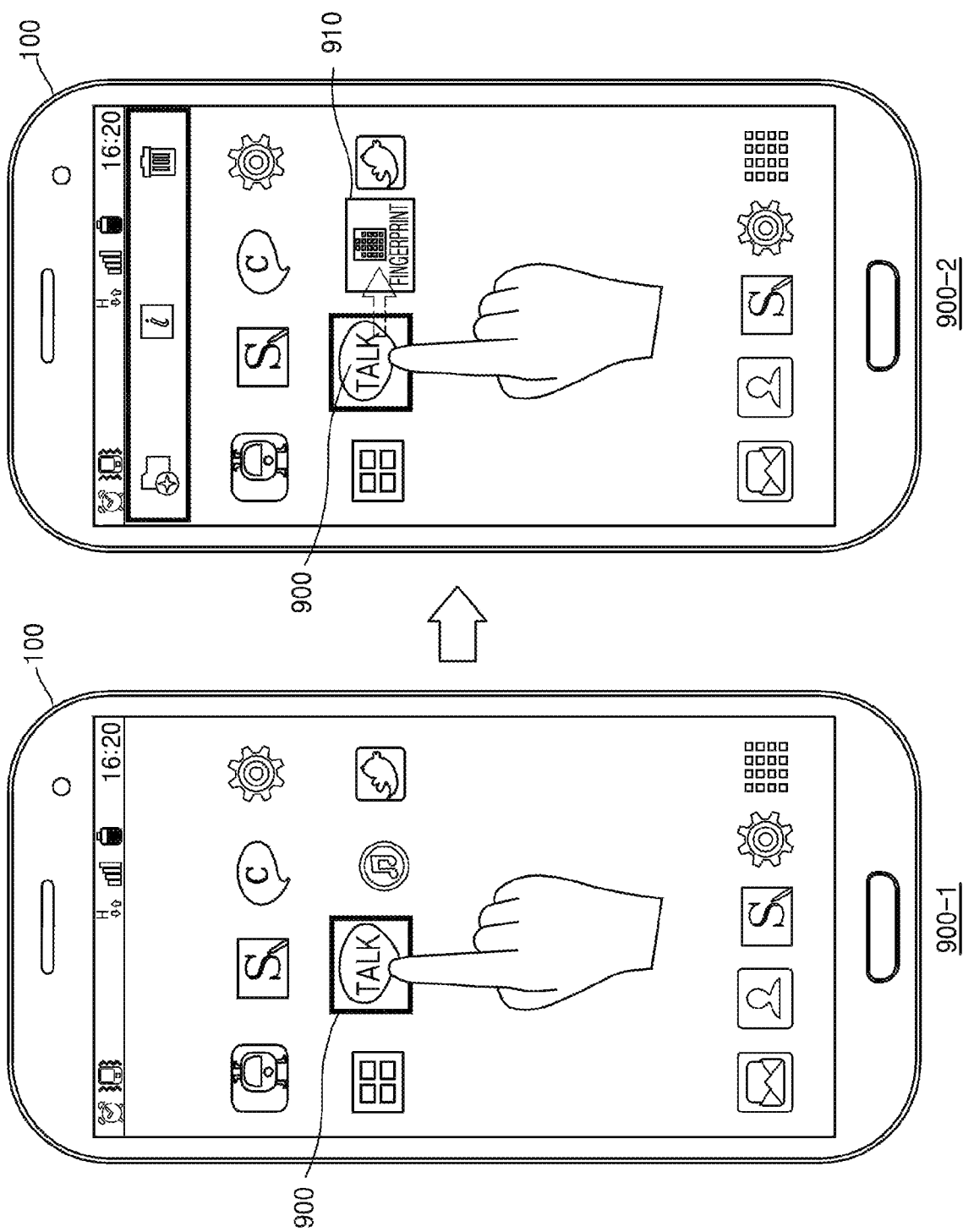
FIG. 9 is a diagram for describing an operation in which a device provides a fingerprint recognition area within a predetermined distance from an original display position of the visual representation of an application selected by a user.

FIG. 9 is a diagram for describing an operation in which the device 100 provides a fingerprint recognition area 910 within a predetermined distance from an application selected by a user.

Referring to 900-1 shown in FIG. 9, the device 100 may receive an input indicating that a user touches a chatting application 900. When a touch on the icon for chatting application 900 is sensed, the device 100 may determine whether the chatting application 900 is an application requiring authentication. For example, since the chatting application 900 includes content from a private conversation, the device 100 may determine that the chatting application 900 is the application requiring authentication.

Referring to 900-2 shown in FIG. 9, the device 100 may provide a right side of the chatting application 900 with the fingerprint recognition area 910 so as to proceed with an authentication procedure. In this regard, the device 100 may activate a fingerprint sensor corresponding to the fingerprint recognition area 910.

If the fingerprint recognition area 910 appears on the right side of the chatting application 900 while a user touches the icon for chatting application 900, the user may drag the icon for chatting application 900 to the fingerprint recognition area 910 of the right side. In this regard, the device 100 may perform authentication on a fingerprint of the user using the fingerprint sensor of the fingerprint recognition area 910. An exemplary embodiment that different information is displayed on an execution window of the chatting application 900 according to an authentication result will now be described with reference to FIG. 10 below.

Figure 10:
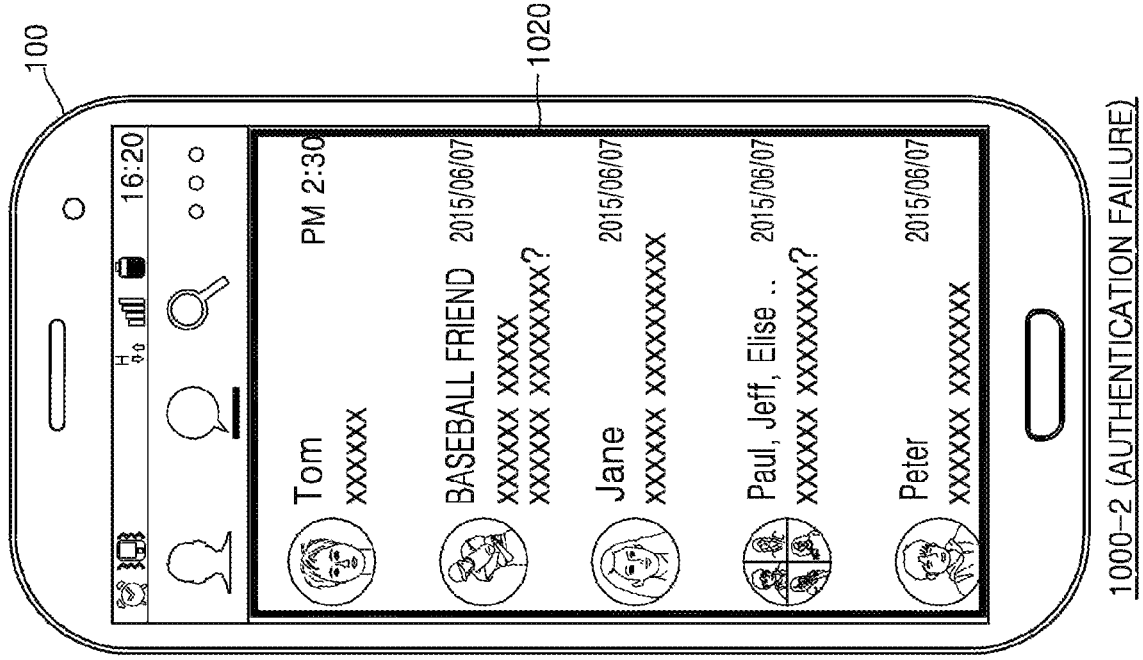
FIG. 10 is a diagram for describing an operation in which a device displays security content or normal content on an execution window of a chatting application according to an authentication result.
Figure 10:
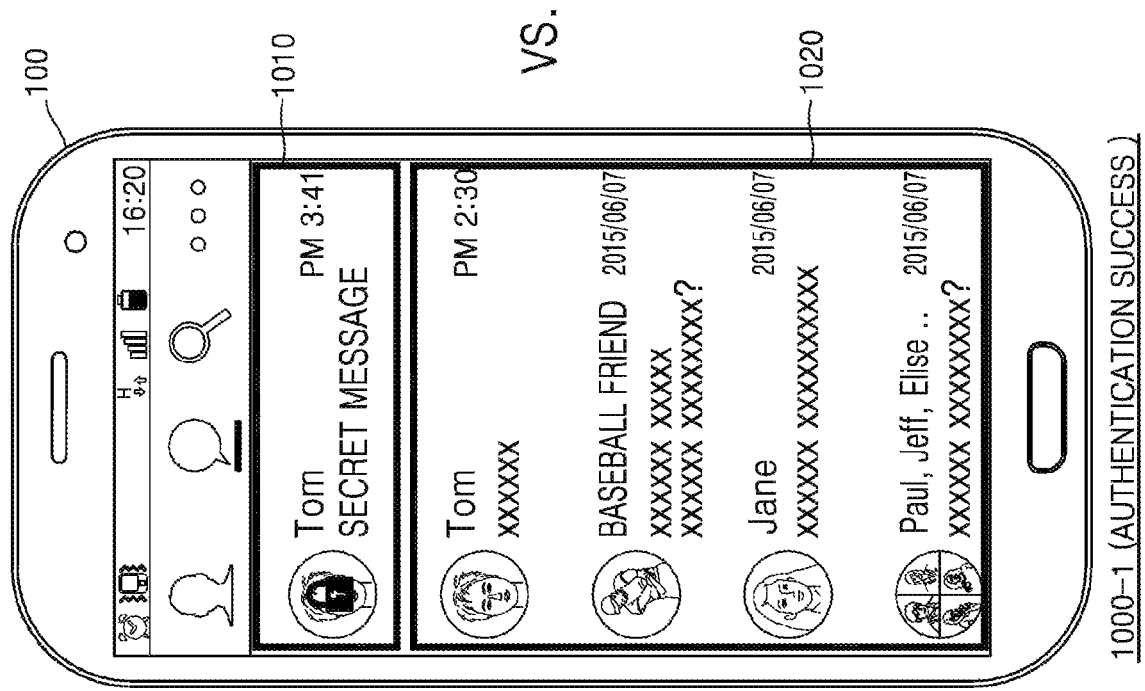

FIG. 10 is a diagram for describing an operation in which the device 100 displays security content or normal content on an execution window of the chatting application 900 according to an authentication result.

Referring to 1000-1 shown in FIG. 10, when a fingerprint of a user obtained through the fingerprint recognition area 910 is identical to a previously registered fingerprint, the device 100 may execute the chatting application 900 in an authentication mode. For example, the device 100 may display not only normal conversation content 1020 but also secret conversation content 1010 on the execution window of the chatting application 900.

Referring to 1000-2 shown in FIG. 10, when the fingerprint of the user obtained through the fingerprint recognition area 910 is not identical to the previously registered fingerprint, the device 100 may execute the chatting application 900 in a normal mode. For example, the device 100 may display only the normal conversation content 1020 on the execution window of the chatting application 900 and may not display the secret conversation content 1010 thereon.

Meanwhile, when the fingerprint of the user obtained through the fingerprint recognition area 910 is not identical to the previously registered fingerprint, the device 100 may not execute the chatting application 900.

Figure 11:
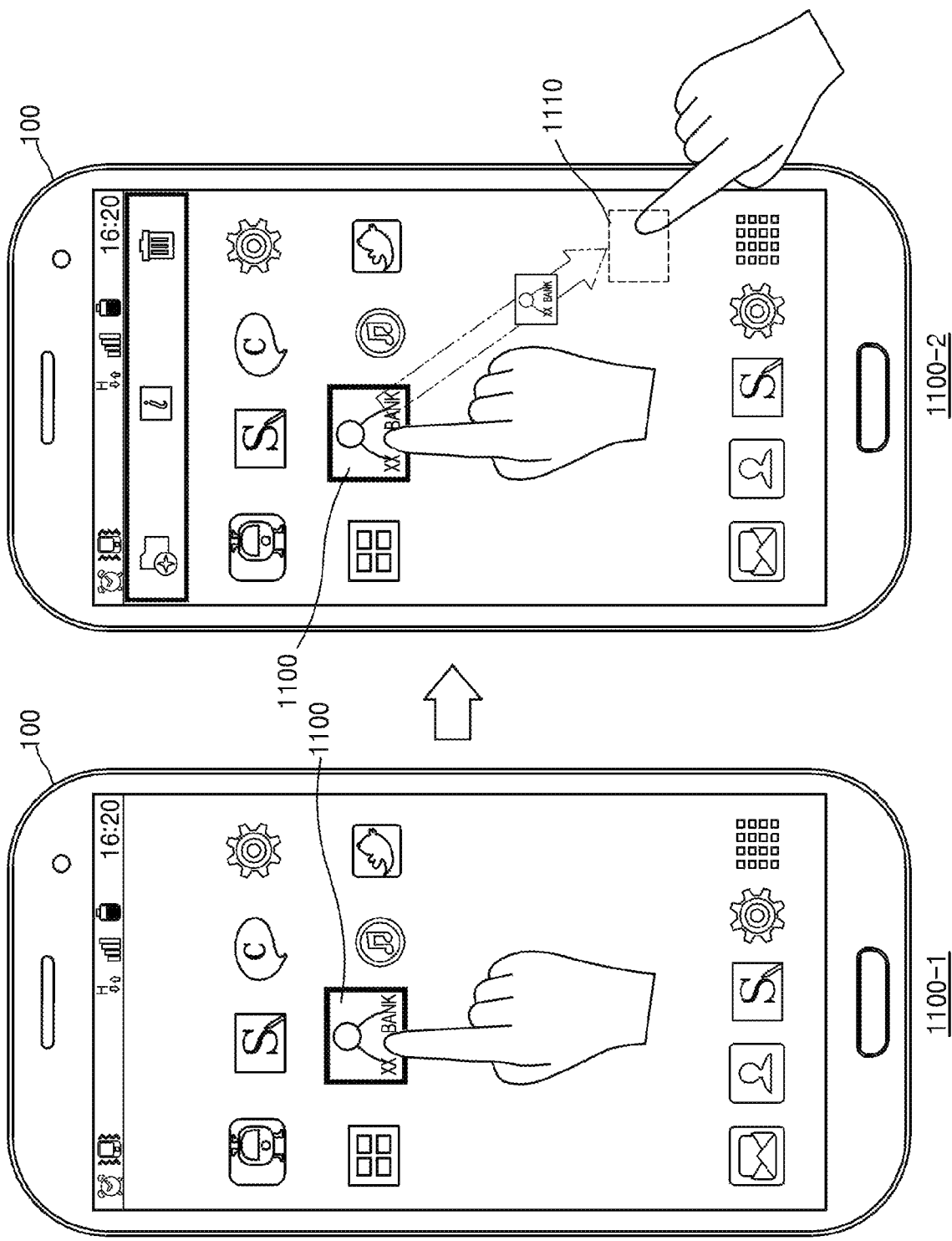
FIG. 11 is a diagram for describing an operation in which a device provides fingerprint recognition area that is not visually discernible on the touch screen.

FIG. 11 is a diagram for describing an operation in which the device 100 provides an invisible fingerprint recognition area 1110, or where the fingerprint recognition area is not visually discernible on the touch screen.

Referring to 1100-1 shown in FIG. 11, the device 100 may receive an input indicating that a user touches the icon for a finance application 1100. When a touch on the icon for finance application 1100 is sensed, the device 100 may determine whether the finance application 1100 is an application requiring authentication. For example, since the finance application 1100 includes user account information, financial transaction information, etc., the device 100 may determine that the finance application 1100 is an application requiring authentication.

Referring to 1100-2 shown in FIG. 11, the device 100 may activate a fingerprint sensor of the fingerprint recognition area 1110 located in a specific area so as to proceed with an authentication procedure. In this regard, the fingerprint recognition area 1110 may not be displayed on a touch screen. However, since a location of the fingerprint recognition area 1110 may be set by a user, the user of the device 100 will know the location of the fingerprint recognition area 1110 even if the fingerprint recognition area 1110 is not displayed.

The user may touch and drag the icon for finance application 1100 to the fingerprint recognition area 1110 that is invisible but is present in a previously defined location. In this regard, the device 100 may perform authentication on a fingerprint of the user using the fingerprint sensor of the fingerprint recognition area 1110. An exemplary embodiment in which different information is displayed on an execution window of the finance application 1100 according to an authentication result will be described with reference to FIG. 12 below.

Figure 12:
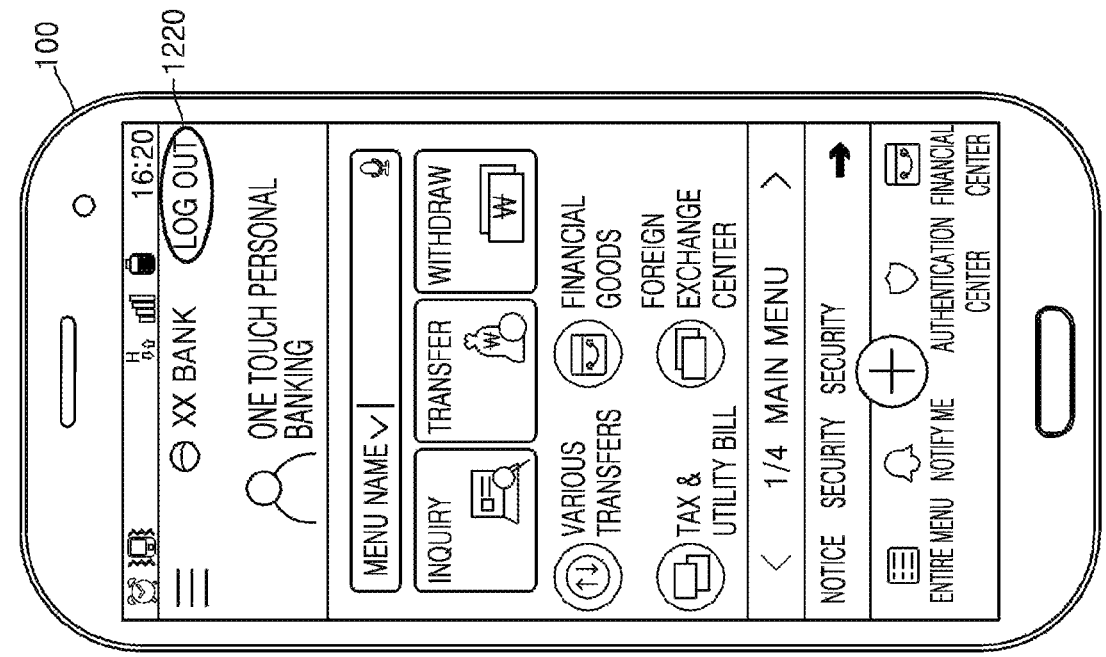
FIG. 12 is a diagram for describing an operation in which a device displays security content or normal content on an execution window of a finance application according to an authentication result.
Figure 12:
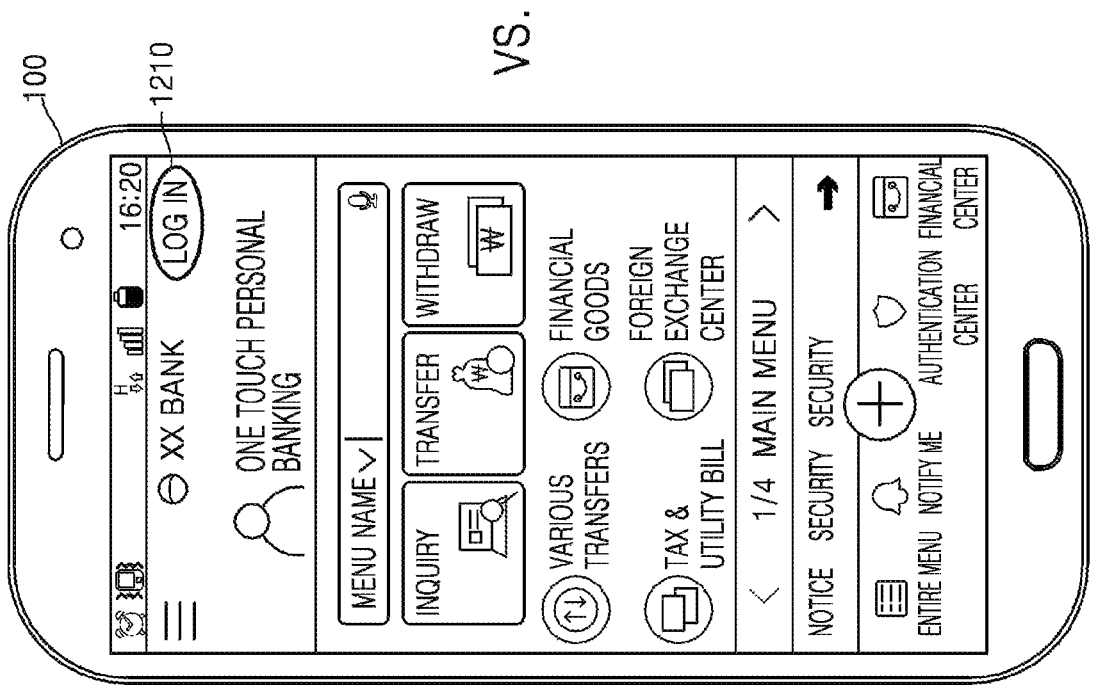

FIG. 12 is a diagram for describing an operation in which the device 100 displays security content or normal content on an execution window of the finance application 1100 according to an authentication result.

Referring to 1200-1 shown in FIG. 12, when a fingerprint of a user obtained through the fingerprint recognition area 1110 is not identical to a previously registered fingerprint, the device 100 may determine that authentication fails. In this regard, the device 100 may execute the finance application 1100 in a normal mode. For example, the device 100 may display a normal page including a login information input window 1210 on an execution window of the finance application 1100. That is, the device 100 may display a normal page when the user is not logged in.

Referring to 1200-2 shown in FIG. 12, when the fingerprint of the user obtained through the fingerprint recognition area 1110 is identical to the previously registered fingerprint, the device 100 may execute the finance application 1100 in an authentication mode. For example, the device 100 may transmit a message indicating that authentication has succeeded to the finance application 1100. In this regard, the finance application 1100 may transmit an authentication success message to a finance server and request for the finance server to approve a login. The finance server may approve the login based on the authentication success message. Thus, the device 100 may display a finance message 1220 on the execution window of the finance application 1100 while the user is completely logged in. The device 100 may provide the user with a personalized financial service through the finance message 1220 while the user is completely logged in.

When the user touches an icon for an application of which security is important such as the finance application 1100, the device 100 may not display a fingerprint recognition area, thereby further reinforcing security of the security content associated with the finance application 1100.

Figure 13:
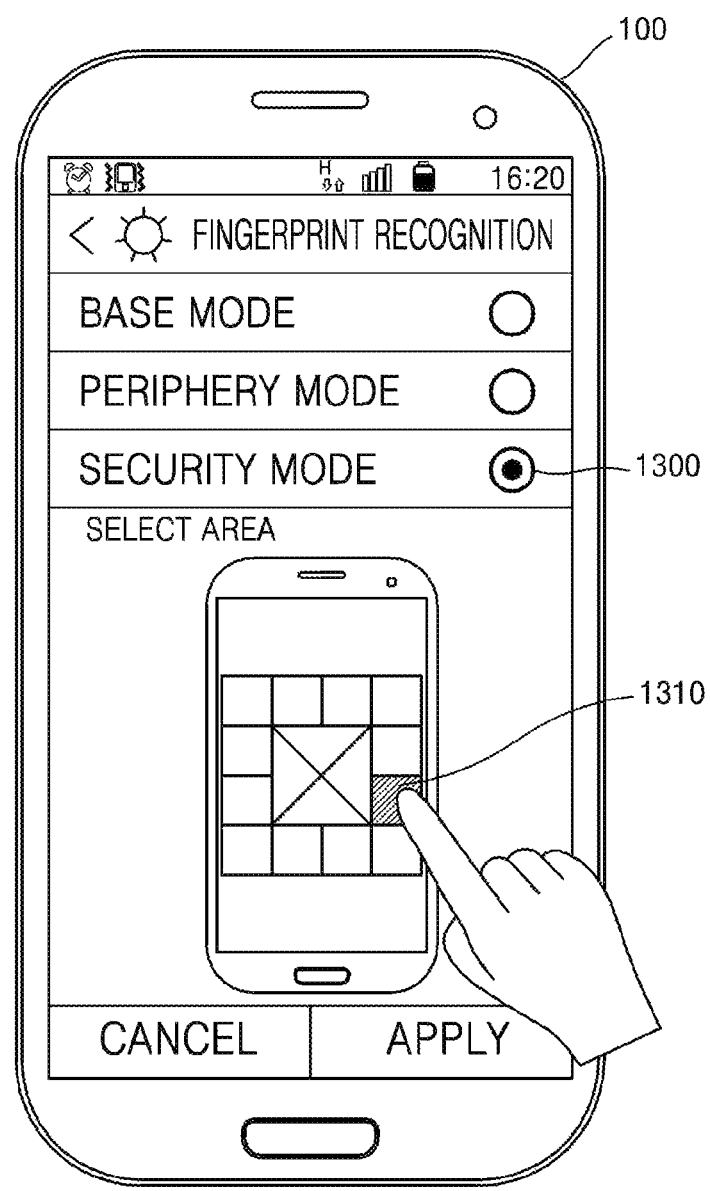
FIG. 13 is a diagram for describing an operation in which a device provides a graphical user interface (GUI) for designating a location of a fingerprint recognition area.

FIG. 13 is a diagram for describing an operation in which the device 100 provides a graphical user interface (GUI) for designating a location of a fingerprint recognition area.

Referring to FIG. 13, the device 100 may provide the GUI for selecting a providing mode of the fingerprint recognition area or designating the location of the fingerprint recognition area. The providing mode of the fingerprint recognition area may be one of a base mode, a periphery mode, and a security mode 1300 but is not limited thereto.

The base mode may mean a mode in which the fingerprint recognition area is displayed at a location (for example, an upper end of a touch screen) previously determined by a system. The periphery mode may mean a mode in which the fingerprint recognition area appears in a periphery (for example, a right side) of an application icon corresponding to the application selected by a user. The security mode 1300 may mean a mode in which an invisible fingerprint recognition area is provided in a specific area designated by the user.

Meanwhile, the user may designate a location of the fingerprint recognition area that is to be provided in the security mode 1300. The fingerprint recognition area is invisible in the security mode 1300, and thus the user may select the location that may be memorized as the fingerprint recognition area. For example, the device 100 may receive an input that selects a first area 1310 of a right lower end as the fingerprint recognition area from the user. Thereafter, when the user touches a specific application on the touch screen, the device 100 may activate a fingerprint sensor corresponding to the first area 1310.

Figure 14:
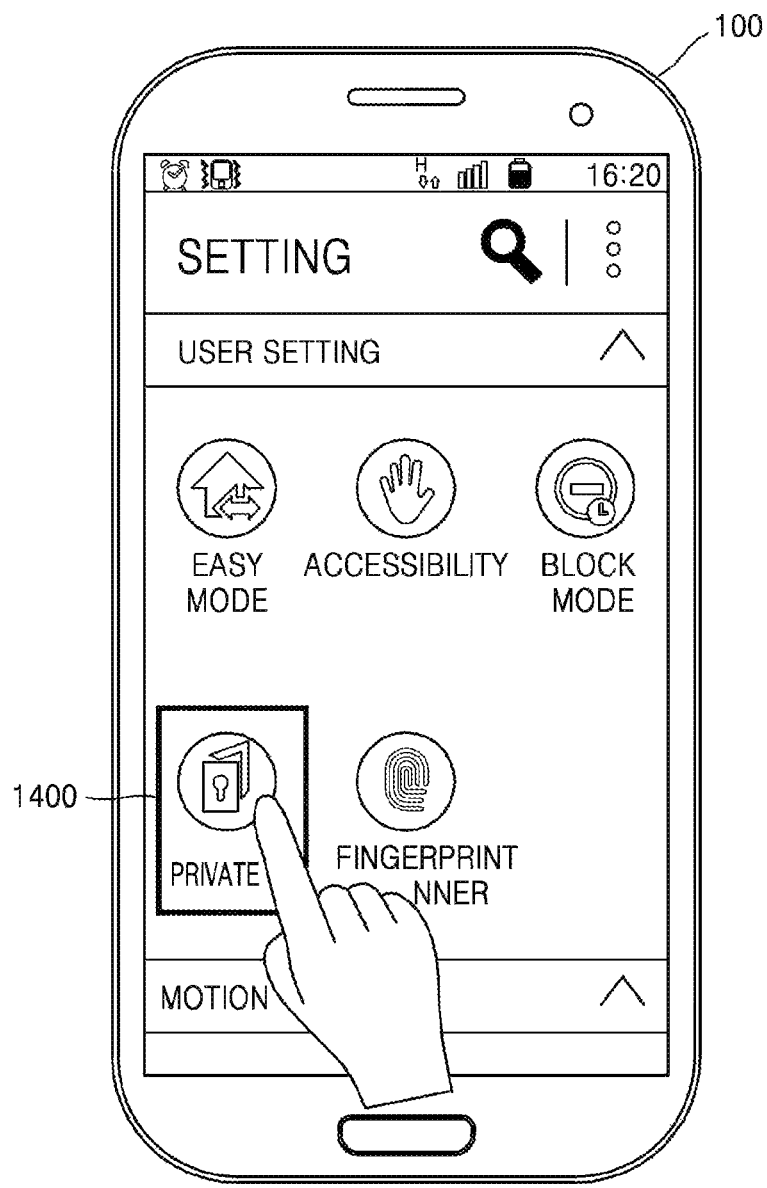
FIGS. 14, 15, and 16 are diagrams for describing operations in which a device provides a GUI for designating an application or content that requires authentication.
Figure 15:
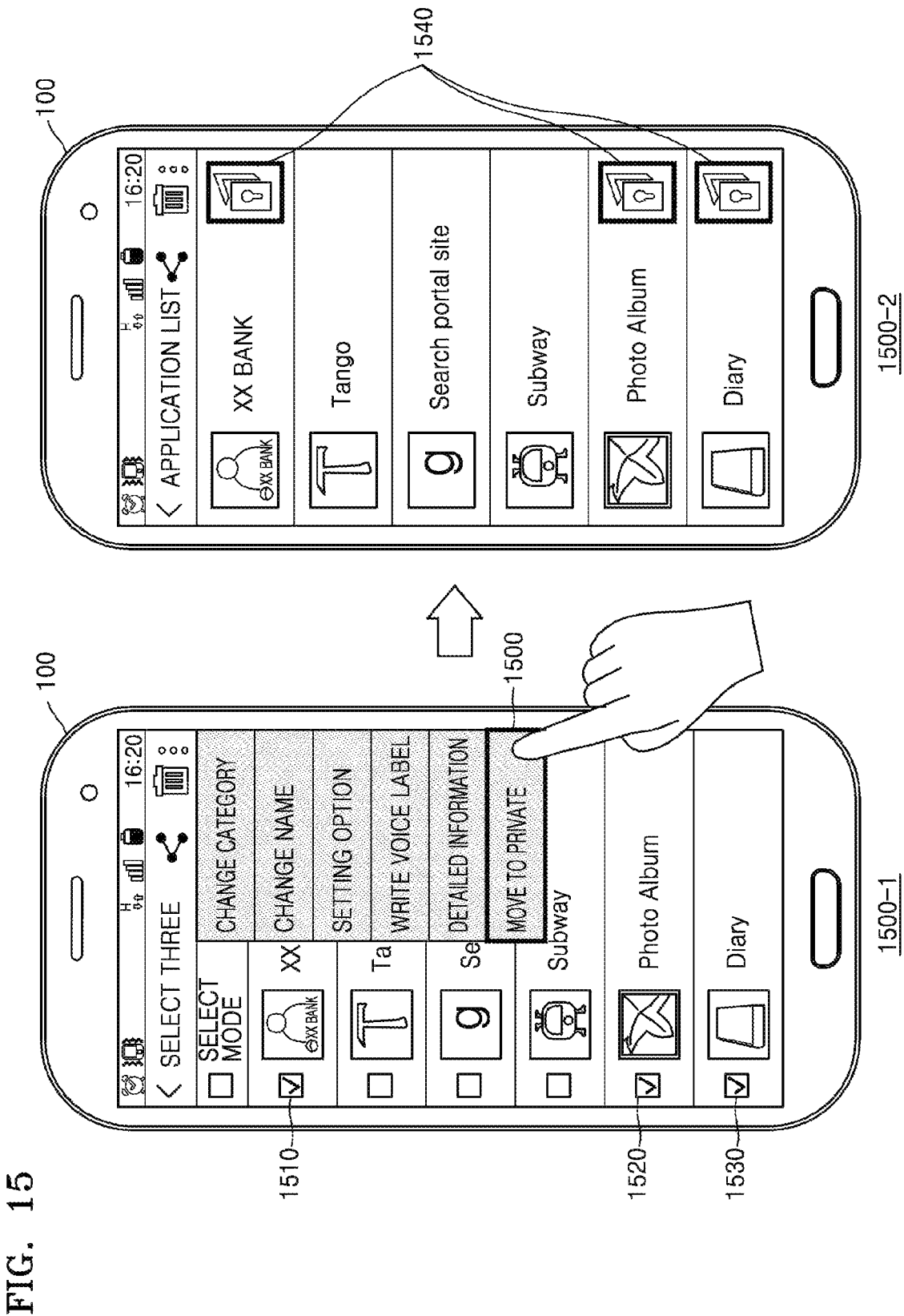
Figure 16:
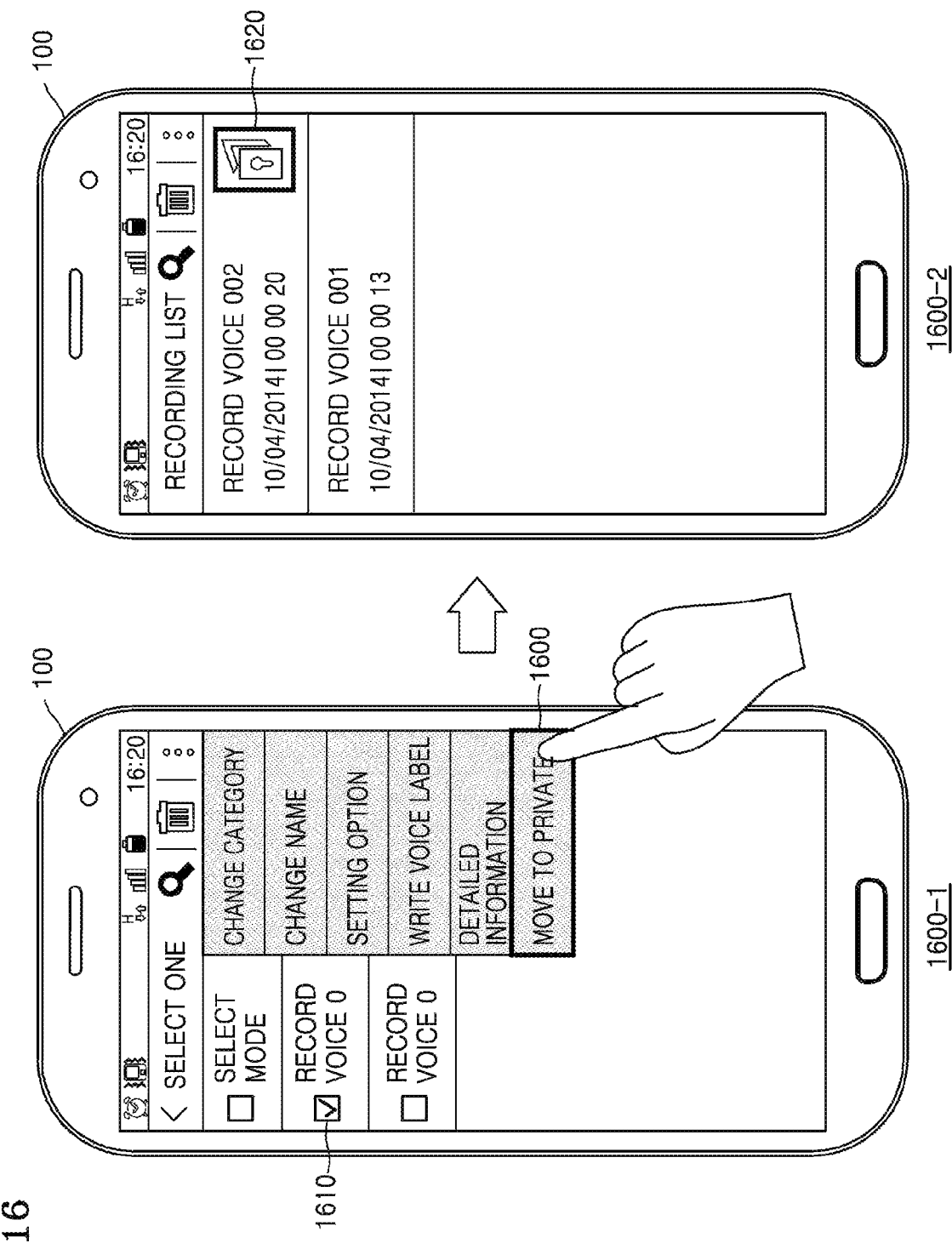

FIGS. 14 through 16 include diagrams 1500-1 through 1600-2 for describing operations in which the device 100 provides a GUI for designating an application or content that requires authentication.

Referring to FIG. 14, the device 100 may provide an icon for a private item 1400 in an environment setting in order for a user to designate the application or the content that requires authentication. For example, when the user selects the private item 1400 in the environment setting, the device 100 may provide a settings window for setting pieces of content or a plurality of applications as security content or a security application that requires authentication.

Referring to 1500-1 shown in FIG. 15, the device 100 may display a list of applications installed in the device 100 on a setting window. The device 100 may receive an input that selects a bank application 1510, a photo album application 1520, and a diary application 1530 from the list of the applications. In this case, the device 100 may receive the input that selects "move to private" 1500 from the setting window. In this case, the device 100 may set the bank application 1510, the photo album application 1520, and the diary application 1530 as security applications that require authentication.

Referring to 1500-2 shown in FIG. 15, the device 100 may display icons 1540 indicating the security applications next to the bank application 1510, the photo album application 1520, and the diary application 1530 among the list of the applications.

According to an exemplary embodiment, only when a user succeeds in authenticating a fingerprint, the device 100 may execute the bank application 1510, the photo album application 1520, and the diary application 1530 in an authentication mode.

Referring to 1600-1 shown in FIG. 16, the device 100 may display a list of applications installed in the device 100 on a setting window. In this regard, the device 100 may receive an input that selects a voice recording 002 file 1610 from the list of the contents and touches "move to private" 1600. In this case, the device 100 may set the voice recording 002 file 1610 as security content that requires authentication. For example, the device 100 may encrypt the voice recording 002 file 1610 using a fingerprint of a user.

Referring to 1600-2 shown in FIG. 16, the device 100 may display an icon 1620 indicating the security content next to the voice recording 002 file 1610 among the list of the contents. According to an exemplary embodiment, only when the user succeeds in authenticating the fingerprint, the device 100 may decrypt the voice recording 002 file 1610 and provide the user with the decrypted voice recording 002 file 1610.

A method in which the device 100 provides security content selected by a user when succeeding in authenticating a fingerprint will now be described with reference to FIG. 17 below.

Figure 17:
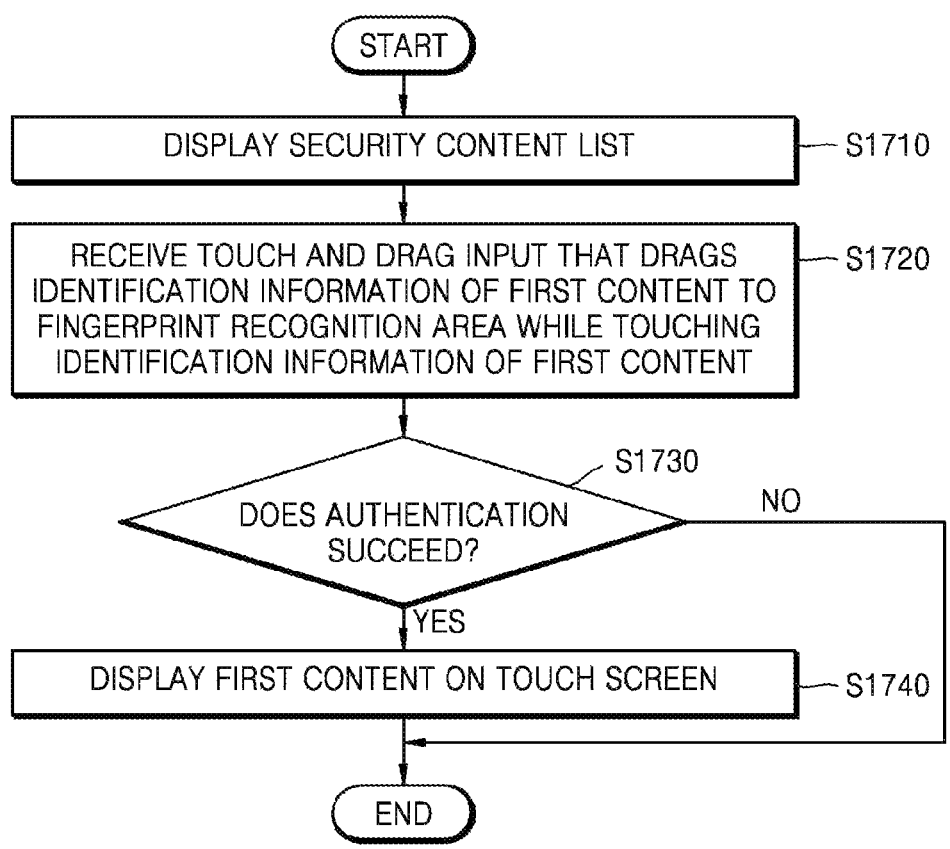
FIG. 17 is a flowchart of a method in which a device displays security content on a touch screen according to an exemplary embodiment.

FIG. 17 is a flowchart of a method in which the device 100 displays security content on a touch screen according to an exemplary embodiment.

In operation S1710, the device 100 may display a security content list on the touch screen.

According to an exemplary embodiment, the security content list may include identification information of content that only a specific user is allowed to access. For example, the security content list may include a first thumbnail image indicating first photo content, a second thumbnail image indicating second photo content, a third icon indicating a third document, a fourth icon indicating a fourth document, etc.

According to an exemplary embodiment, the security content list may include only security content and may include normal content and the security content.

Meanwhile, according to an exemplary embodiment, the device 100 may display the security content list on a lock screen or on an unlock screen.

In operation S1720, the device 100 may receive a touch and drag input that drags identification information of the first content among the security content list to a fingerprint recognition area while touching the identification information of the first content. For example, when the first content is the security content, a user may drag an identification image of the first content with a finger to the fingerprint recognition area while touching the identification image of the first content in order to check whether access authorization for the first content is required.

In operation S1730, the device 100 may perform authentication on a fingerprint of the finger using a fingerprint sensor of the fingerprint recognition area.

When the first content is the security content, the device 100 may activate the fingerprint sensor of the fingerprint recognition area. The device 100 may determine whether a similarity between a first fingerprint image obtained by the fingerprint sensor and a previously registered second fingerprint image for fingerprint authentication exceeds a threshold value (for example, 98%). Alternatively, the device 100 may compare first minutiae data of a first fingerprint detected by the fingerprint sensor with second minutiae data of a second fingerprint previously stored in a memory. In this regard, the device 100 may determine whether a similarity between the first minutiae data and the second minutiae data exceeds the threshold value (for example, 98%).

When the similarity between the first fingerprint image (or the first minutiae data of the first fingerprint) obtained by the fingerprint sensor and the previously registered second fingerprint image (or the second minutiae data of the second fingerprint) exceeds the threshold value (for example, 98%), the device 100 may determine that authentication on the fingerprint of the finger succeeds.

To the contrary, when the similarity between the first fingerprint image (or the first minutiae data of the first fingerprint) obtained by the fingerprint sensor and the previously registered second fingerprint image (or the second minutiae data of the second fingerprint) does not exceed the threshold value (for example, 98%), the device 100 may determine that authentication on the fingerprint of the finger fails.

According to an exemplary embodiment, when there are a plurality of previously registered fingerprints, the device 100 may compare the first fingerprint image obtained by the fingerprint sensor with a plurality of previously registered second fingerprint images. When a similarity between at least one of the plurality of previously registered second fingerprint images and the first fingerprint image exceeds the threshold value (for example, 98%), the device 100 may determine that authentication on the fingerprint of the finger succeeds.

In operation S1740, when authentication on the fingerprint of the finger succeeds, the device 100 may display the first content on the touch screen. For example, when the first content is encrypted, the device 100 may decrypt and display the encrypted first content on the touch screen. An operation in which the device 100 displays security content according to a fingerprint authentication result will now be described with reference to FIGS. 18A and 18B below.

Figure 18A:
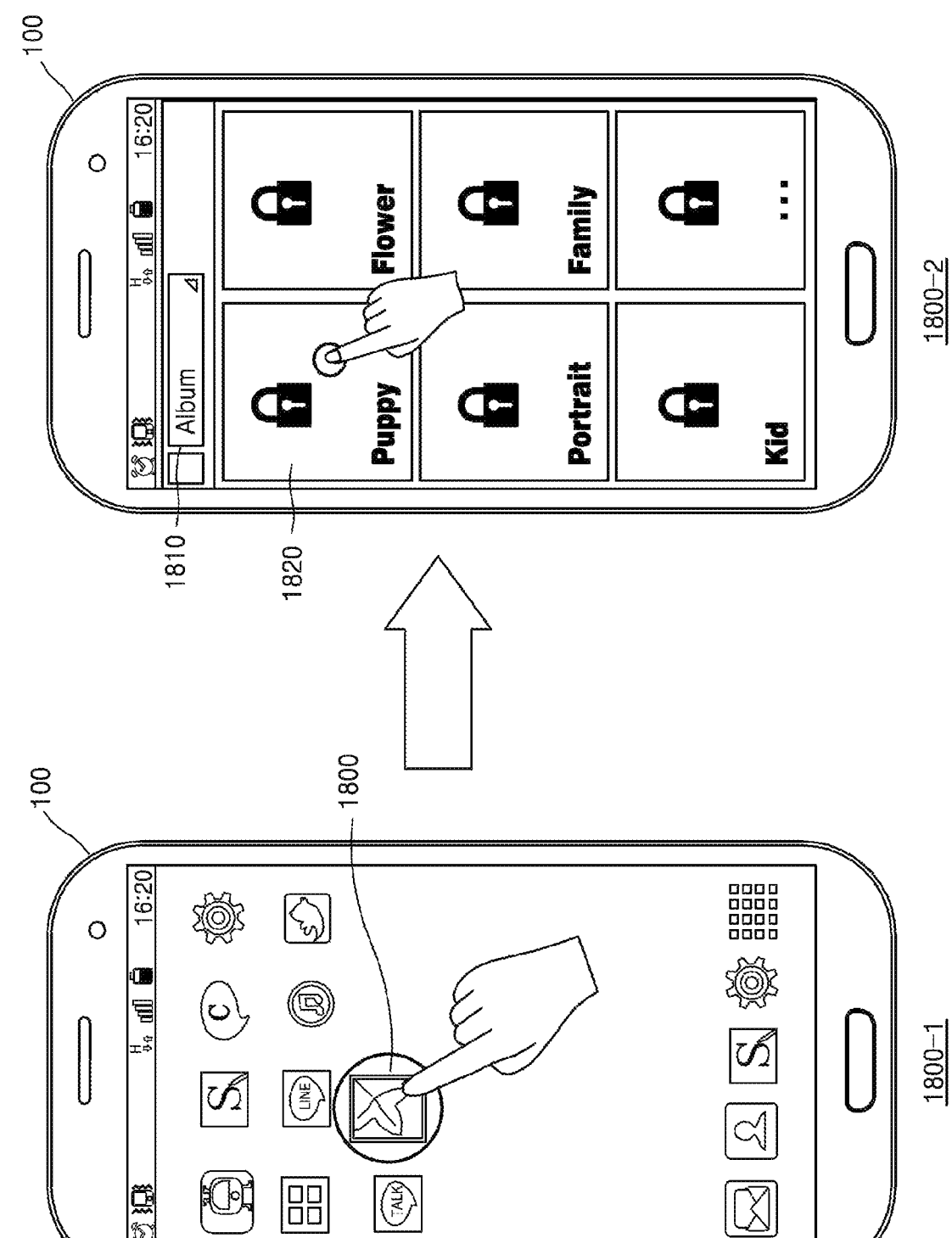
FIGS. 18A and 18B are diagrams for describing operations in which a device decrypts encrypted content according to an authentication result.
Figure 18B:
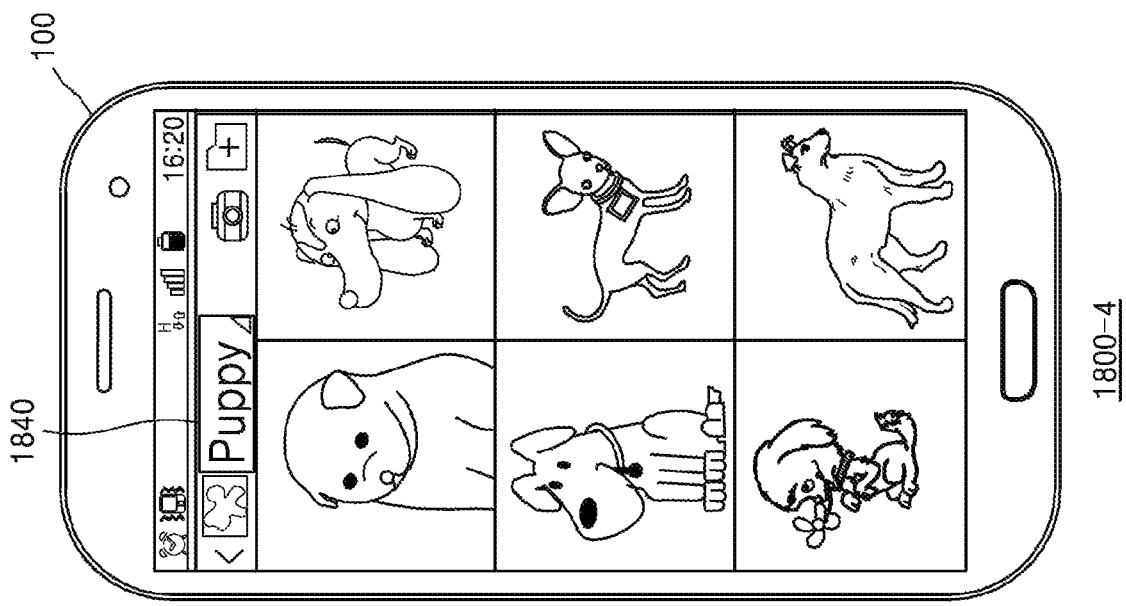
Figure 18B:
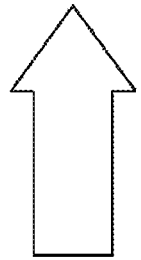
Figure 18B:
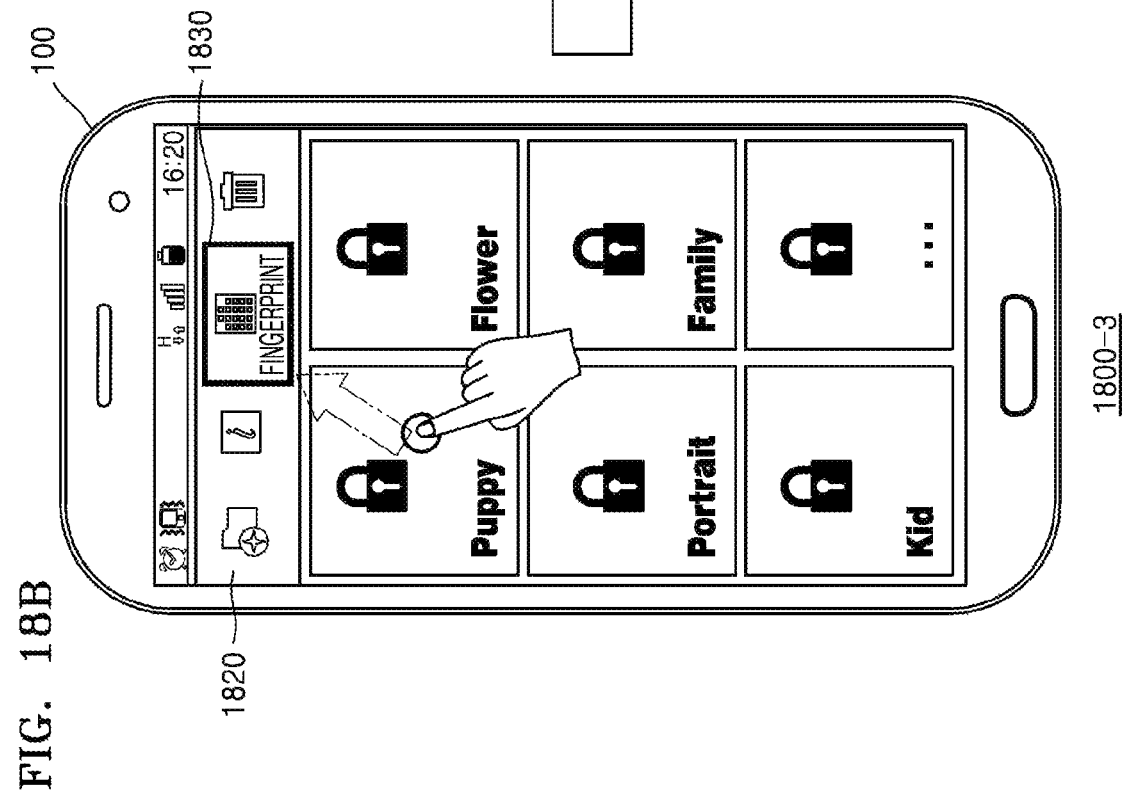

FIGS. 18A and 18B are diagrams for describing operations in which the device 100 decrypts encrypted content according to an authentication result.

Referring to 1800-1 shown in FIG. 18A, the device 100 may receive an input indicating that a user touches a photo management application 1800 on a touch screen. For example, the device 100 may receive the input that taps the photo management application 1800.

Referring to 1800-2 shown in FIG. 18A, the device 100 may execute the photo management application 1800 and display an execution window of the photo management application 1800. For example, the device 100 may display an album list 1810 on the execution window of the photo management application 1800. In this regard, albums included in the album list 1810 may be encrypted.

The device 100 may receive an input indicating that a user touches an icon for a puppy album 1820 displayed in the album list 1810 with a finger for more than a predetermined period of time (for example, more than 2 seconds). In this regard, the puppy album 1820 is encrypted security content, and thus the device 100 may activate a fingerprint sensor to perform fingerprint authentication.

Referring to 1800-3 shown in FIG. 18B, the device 100 may display a fingerprint recognition item 1830 on an upper end of the touch screen in response to an input indicating that a user touches the icon for puppy album 1820 with the finger for more than the predetermined period of time (for example, more than 2 seconds).

In this case, the device 100 may receive an input indicating that a user drags the icon for puppy album 1820 to the fingerprint recognition item 1830 displayed on the touch screen while touching the icon for puppy album 1820 with the finger. When the finger is located in the fingerprint recognition item 1830, the device 100 may obtain a fingerprint of the finger using the fingerprint sensor. The device 100 may compare the obtained fingerprint with a previously registered fingerprint, thereby performing authentication. In this regard, when the obtained fingerprint and the previously registered fingerprint are identical to each other, the device 100 may determine that authentication succeeds.

Referring to 1800-4 shown in FIG. 18B, when authentication succeeds, the device 100 may decrypt the encrypted puppy album 1820. For example, the device 100 may open the puppy album 1820 and display photos 1840 linked to the opened puppy album 1820.

Figure 19:
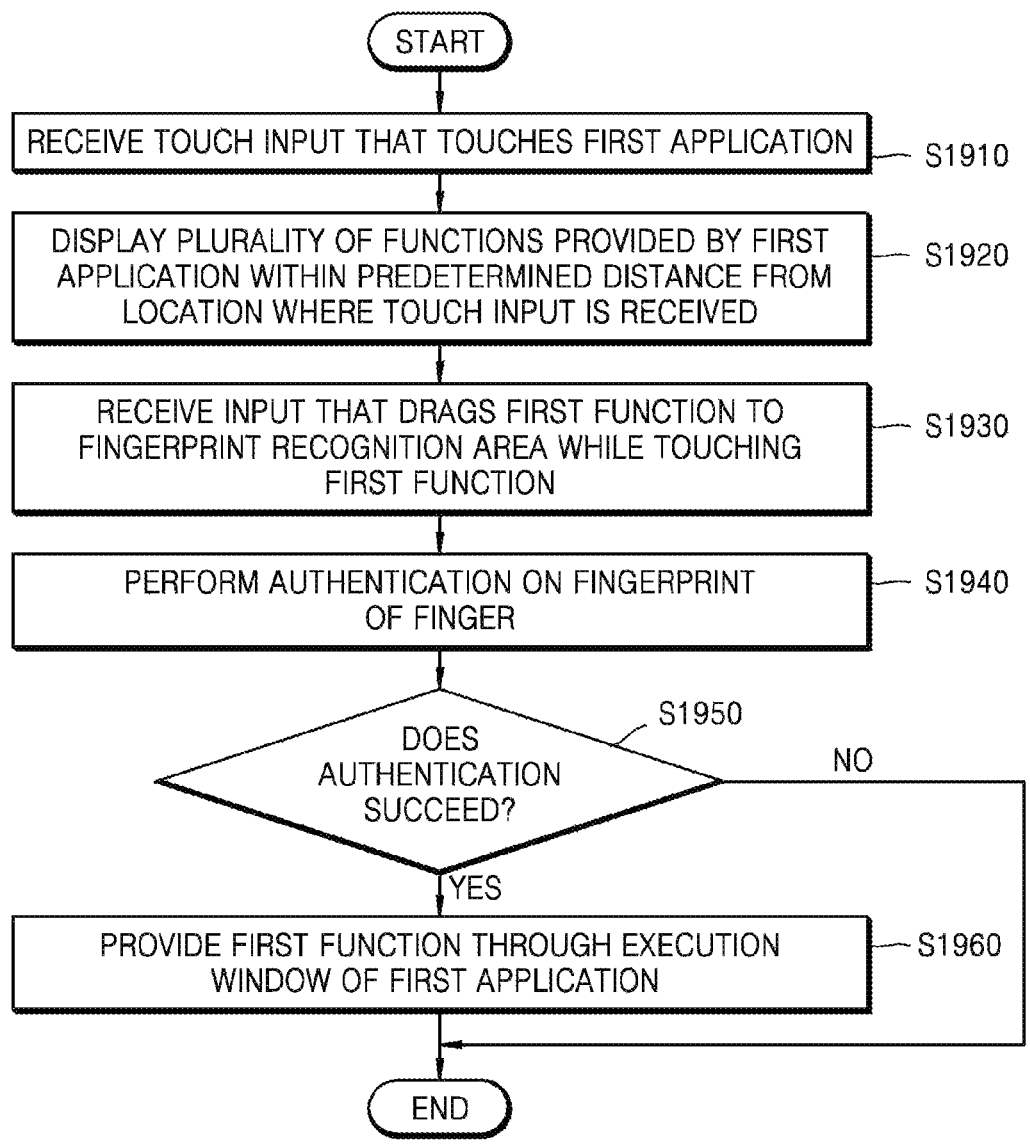
FIG. 19 is a flowchart of a method in which a device provides a specific function provided by an application according to an exemplary embodiment.

FIG. 19 is a flowchart of a method in which the device 100 provides a specific function provided by an application according to an exemplary embodiment.

In operation S1910, the device 100 may receive a touch input indicating that a user touches an icon for a first application. For example, the device 100 may receive an input indicating that a user touches a first icon corresponding to the first application with a finger for more than a predetermined period of time (for example, more than 2 seconds).

According to an exemplary embodiment, the touch input that touches the first application may be received on a lock screen.

In operation S1920, the device 100 may display a plurality of icons for functions provided by the first application within a predetermined distance from a location where the touch input is received. For example, the device 100 may display an icon (for example, an image or text) indicating each of the plurality of functions provided by the first application.

According to an exemplary embodiment, the device 100 may display the plurality of functions provided by the first application around the icon for the first application. The device 100 may display the plurality of functions in a plurality of previously set directions with respect to a display area of the first application. For example, when the plurality of previously set directions are east, west, south, and north, the device 100 may display the plurality of functions in four respective directions of east, west, south, and north with respect to the display area of the first application. When the plurality of previously set directions are east, southeast, south, southwest, west, northwest, north, and northeast, the device 100 may display the plurality of functions in eight directions with respect to the display area of the first application. The plurality of previously set directions may be changed by a user, the device 100, or an external server.

According to an exemplary embodiment, the icon (for example, an image or text) indicating each of the plurality of functions provided by the first application may be displayed on the lock screen.

In operation S1930, the device 100 may receive an input indicating that a user drags an icon for a first function among the plurality of functions to a fingerprint recognition area while touching the icon for the first function.

For example, the device 100 may receive the input that drags a finger that touches the first application to a location where the first function among the plurality of functions is displayed. In this case, the device 100 may determine that the user selects the first function from the plurality of functions. The device 100 may receive the input that drags the finger that touches the first function to the fingerprint recognition area.

In operation S1940, the device 100 may perform authentication on a fingerprint of the finger using a fingerprint sensor of the fingerprint recognition area.

For example, when the first function is a function requiring authentication, the device 100 may activate the fingerprint sensor of the fingerprint recognition area. The device 100 may determine whether a similarity between a first fingerprint image obtained by the fingerprint sensor and a previously registered second fingerprint image for fingerprint authentication exceeds a threshold value (for example, 98%). Alternatively, the device 100 may compare first minutiae data of a first fingerprint detected by the fingerprint sensor with second minutiae data of a second fingerprint previously stored in a memory. In this regard, the device 100 may determine whether a similarity between the first minutiae data and the second minutiae data exceeds the threshold value (for example, 98%).

In operation S1950, the device 100 may determine whether authentication on the fingerprint of the finger succeeds.

For example, when the similarity between the first fingerprint image (or the first minutiae data of the first fingerprint) obtained by the fingerprint sensor and the previously registered second fingerprint image (or the second minutiae data of the second fingerprint) exceeds the threshold value (for example, 98%), the device 100 may determine that authentication on the fingerprint of the finger succeeds.

To the contrary, when the similarity between the first fingerprint image (or the first minutiae data of the first fingerprint) obtained by the fingerprint sensor and the previously registered second fingerprint image (or the second minutiae data of the second fingerprint) does not exceed the threshold value (for example, 98%), the device 100 may determine that authentication on the fingerprint of the finger fails.

According to an exemplary embodiment, when there are a plurality of previously registered fingerprints, the device 100 may compare the first fingerprint image obtained by the fingerprint sensor with a plurality of previously registered second fingerprint images. When a similarity between at least one of the plurality of previously registered second fingerprint images and the first fingerprint image exceeds the threshold value (for example, 98%), the device 100 may determine that authentication succeeds.

In operation S1960, when authentication succeeds, the device 100 may provide the first function through an execution window of the first application.

For example, the device 100 may unlock the lock screen and execute the first application. The device 100 may transfer an authentication success message to the first application. In this regard, the first application may execute the first function in response to the authentication success message. An operation in which the device 100 provides a specific function when authentication on the fingerprint of the finger succeeds will now be described with reference to FIG. 20 below.

Figure 20:
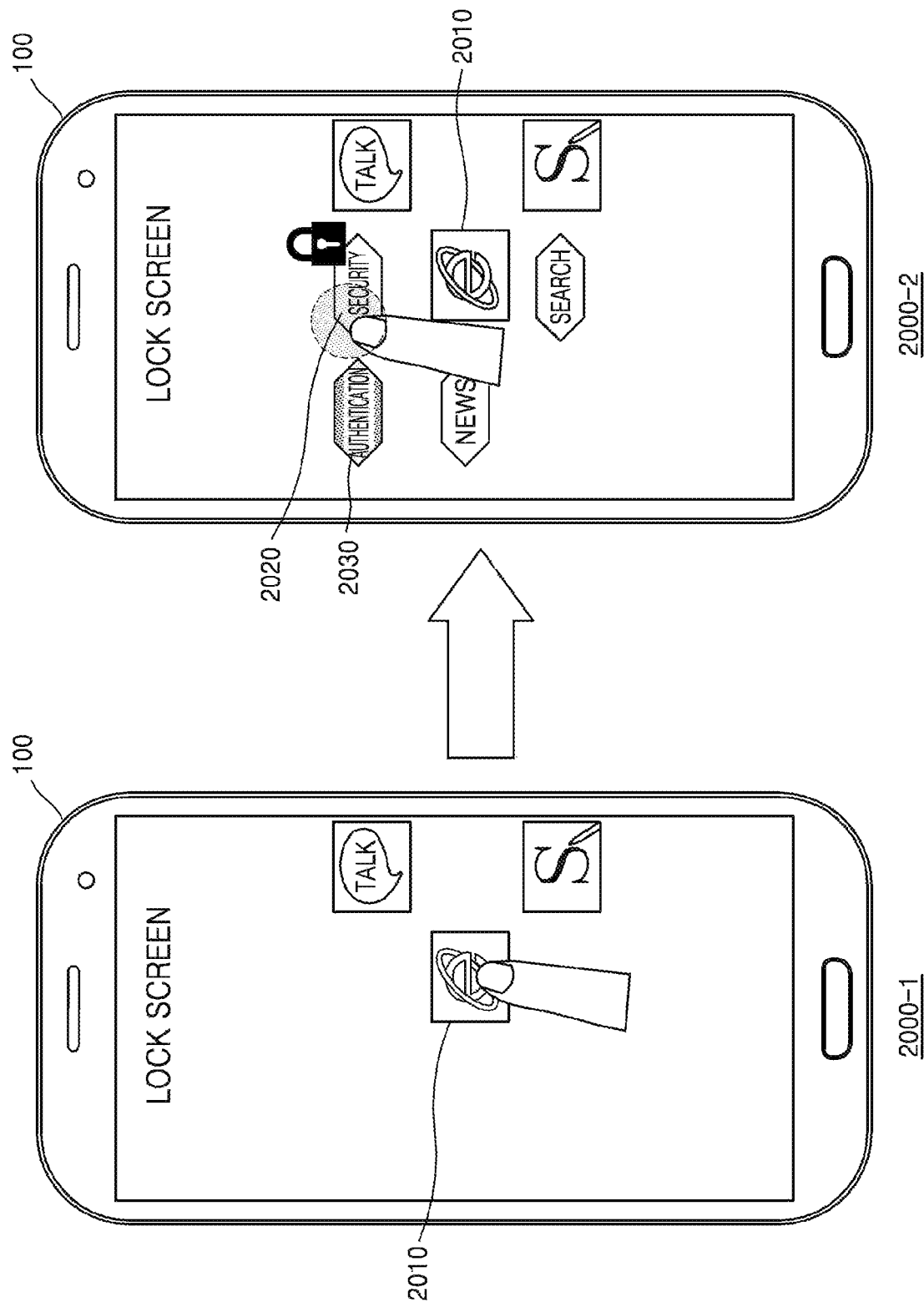
FIG. 20 is a diagram for describing an operation in which a device displays a plurality of functions around an application.

FIG. 20 is a diagram for describing an operation in which the device 100 displays a plurality of functions around an application.

Referring to 2000-1 shown in FIG. 20, the device 100 may display icons for a plurality of applications on a lock screen. The device 100 may receive an input indicating that a user touches the icon for a web browser 2010 among the plurality of applications.

Referring to 2000-2 shown in FIG. 20, the device 100 may display functions provided by the web browser 2010 around the icon for web browser 2010 according to the input that touches the web browser 2010. For example, the device 100 may display a search item indicating a search function, a news item indicating a news providing function, and a security item 2020 indicating a security transaction item around the web browser 2010. In this regard, a security transaction function indicated by the security item 2020 may be a function requiring authentication.

The device 100 may receive an input indicating that a user touches the security item 2020. For example, a user may drag a finger that touches the icon for the web browser 2010 to an area where the security item 2020 is displayed and touch the security item 2020.

The security transaction function indicated by the security item 2020 is the function requiring authentication, and thus the device 100 may provide one side of the security item 2020 with a fingerprint recognition area 2030. For example, the device 100 may provide a left side of the security item 2020 with the fingerprint recognition area 2030. In this regard, a fingerprint sensor of the fingerprint recognition area 2030 may be activated.

If the fingerprint recognition area 2030 appears on the left side of the security item 2020 while touching the security item 2020, the user may drag the security item 2020 to the fingerprint recognition area 2030. In this regard, the device 100 may perform authentication on a fingerprint of the user using the fingerprint sensor of the fingerprint recognition area 2030.

When authentication succeeds, the device 100 may convert the lock screen into an unlock screen and execute the web browser 2010. The device 100 may provide the user with the security transaction function through an execution window of the web browser 2010.

A case where a user selects an application and then the device 100 performs fingerprint recognition is described as an example with reference to FIGS. 1 through 20 but exemplary embodiments are not limited thereto. For example, the user may select the application after the device 100 performs fingerprint authentication. An example in which the device 100 receives a fingerprint recognition request before receiving a user input that selects an application will now be described with reference to FIG. 21 below.

Figure 21:
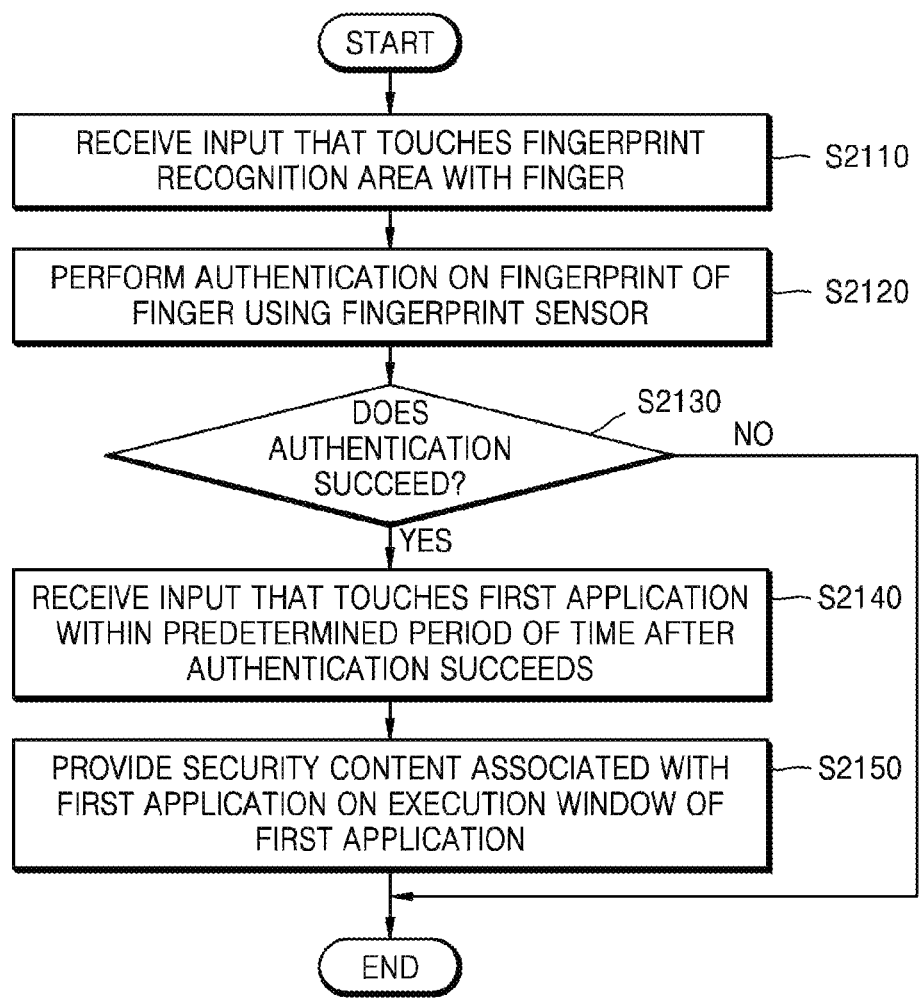
FIG. 21 is a flowchart of a method in which a device provides security content on an execution window of an application selected within a predetermined period of time after authentication on a fingerprint succeeds according to an exemplary embodiment.

FIG. 21 is a flowchart of a method in which the device 100 provides security content on an execution window of an application selected within a predetermined period of time after authentication on a fingerprint succeeds according to an exemplary embodiment.

In operation S2110, the device 100 may receive an input indicating that a user touches a fingerprint recognition area with a finger. For example, the device 100 may sense the input that touches a home button area including a fingerprint sensor with an index finger for more than a predetermined period of time (for example, more than 2 seconds).

In operation S2120, the device 100 may perform authentication on a fingerprint of the finger using the fingerprint sensor of the fingerprint recognition area.

For example, when a first function is a function requiring authentication, the device 100 may activate the fingerprint sensor of the fingerprint recognition area. The device 100 may determine whether a similarity between a first fingerprint image obtained by the fingerprint sensor and a previously registered second fingerprint image for fingerprint authentication exceeds a threshold value (for example, 98%). Alternatively, the device 100 may compare first minutiae data of a first fingerprint detected by the fingerprint sensor with second minutiae data of a second fingerprint previously stored in a memory. In this regard, the device 100 may determine whether a similarity between the first minutiae data and the second minutiae data exceeds the threshold value (for example, 98%).

In operation S2130, the device 100 may determine whether authentication on the fingerprint of the finger succeeds.

For example, when the similarity between the first fingerprint image (or the first minutiae data of the first fingerprint) obtained by the fingerprint sensor and the previously registered second fingerprint image (or the second minutiae data of the second fingerprint) exceeds the threshold value (for example, 98%), the device 100 may determine that authentication on the fingerprint of the finger succeeds.

To the contrary, when the similarity between the first fingerprint image (or the first minutiae data of the first fingerprint) obtained by the fingerprint sensor and the previously registered second fingerprint image (or the second minutiae data of the second fingerprint) does not exceed the threshold value (for example, 98%), the device 100 may determine that authentication on the fingerprint of the finger fails.

According to an exemplary embodiment, when there are a plurality of previously registered fingerprints, the device 100 may compare the first fingerprint image obtained by the fingerprint sensor with a plurality of previously registered second fingerprint images. When a similarity between at least one of the plurality of previously registered second fingerprint images and the first fingerprint image exceeds the threshold value (for example, 98%), the device 100 may determine that authentication succeeds.

According to an exemplary embodiment, when authentication succeeds, the device 100 may output an authentication success message. For example, the device 100 may display a message "Fingerprint authentication successful. Please select an application" on a touch screen or may output the message as an audio message.

In operation S2140, the device 100 may receive an input indicating that a user touches a first application within a predetermined period of time after authentication succeeds. For example, the device 100 may receive the input indicating that a user touches a first icon corresponding to the first application among a plurality of applications displayed on the touch screen.

In operation S2150, the device 100 may provide security content associated with the first application on an execution screen of the first application. For example, since fingerprint authentication succeeds, the device 100 may transfer the authentication success message to the first application and execute the first application in an authentication mode.

Figure 2:
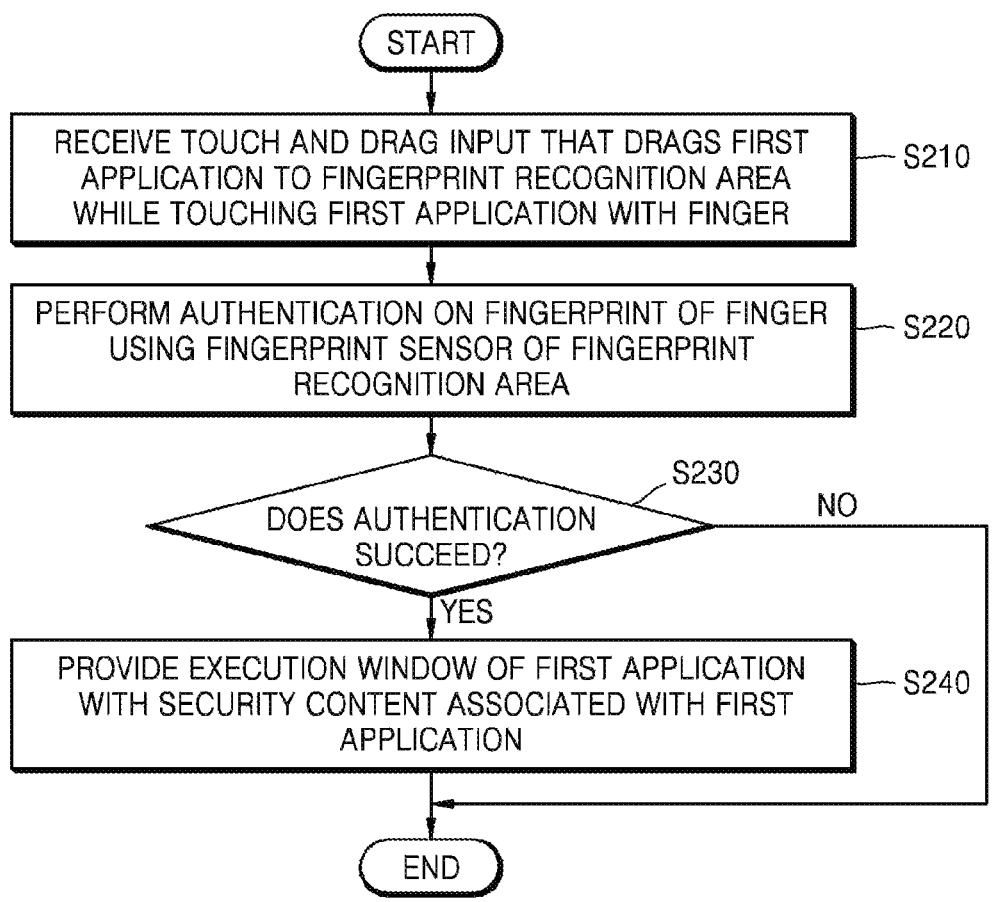
FIG. 2 is a flowchart of a method in which a device provides security content according to an exemplary embodiment.

Operation S2150 corresponds to operation S240 of FIG. 2, and thus a detailed description thereof is omitted.

Figure 22A:
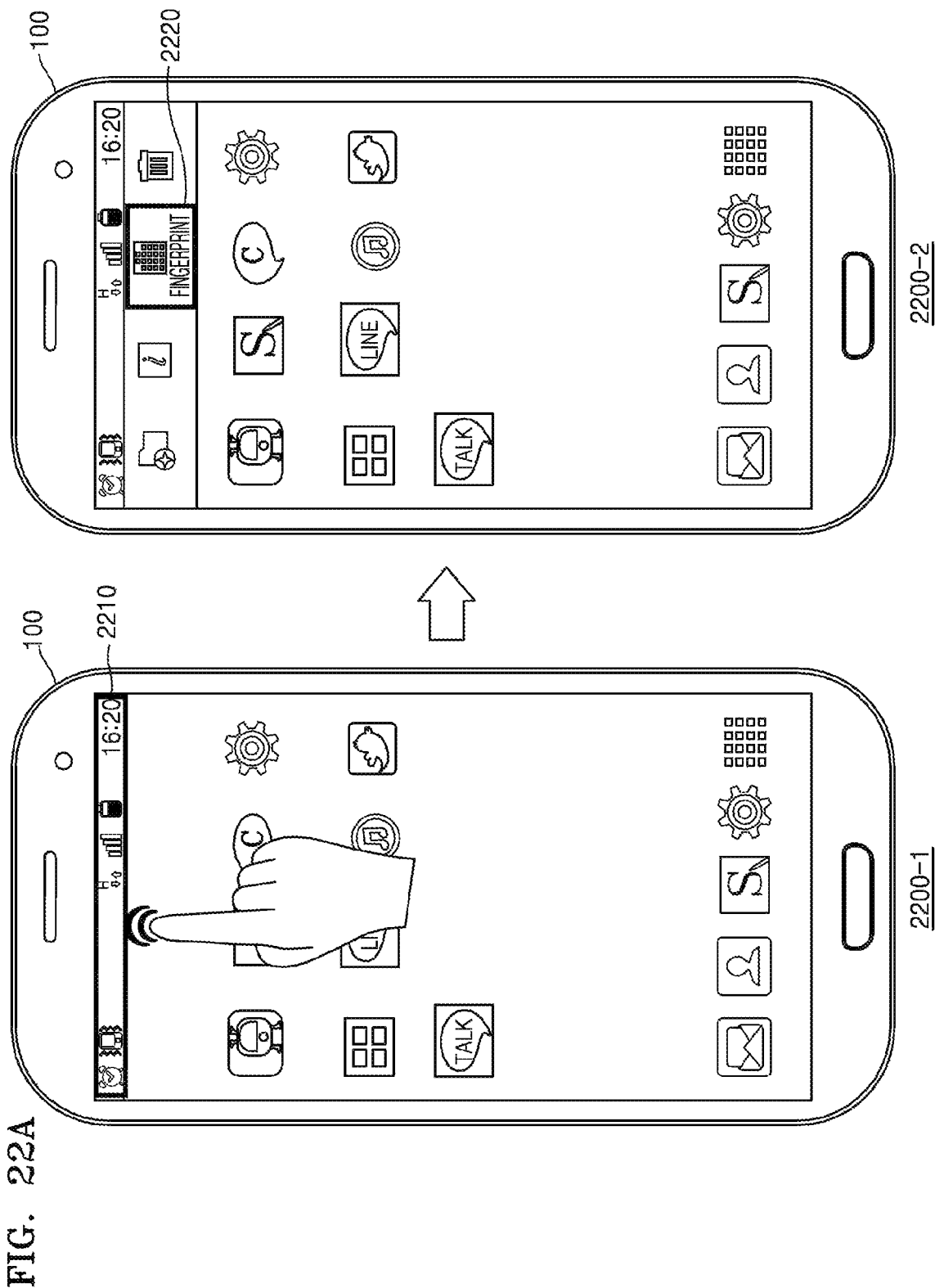
FIG. 22A is a diagram for describing an operation in which a device provides a fingerprint recognition area.
Figure 22B:
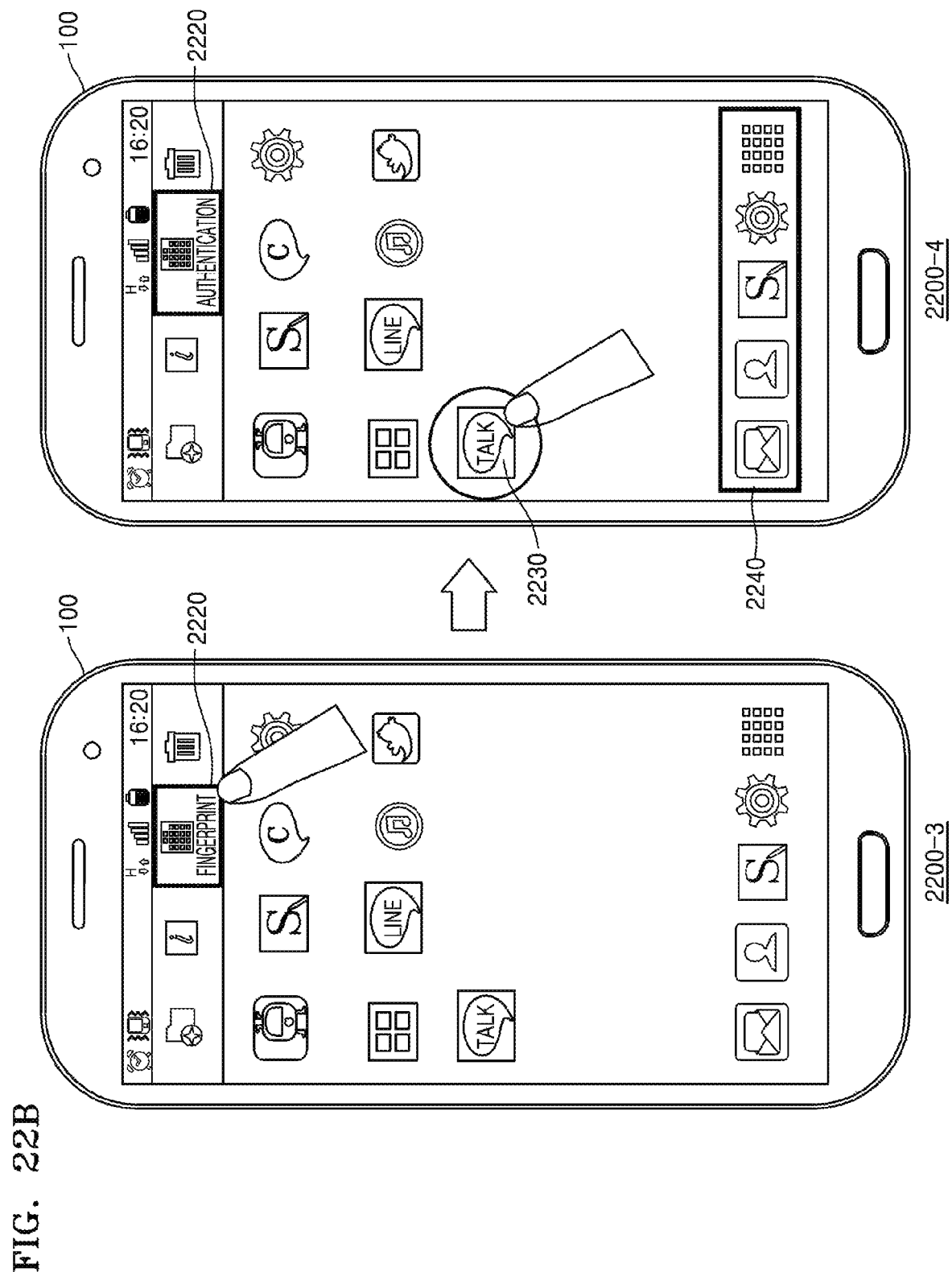
FIG. 22B is a diagram for describing an operation in which a device receives an input that touches the visual representation of an application within a predetermined period of time after authentication succeeds.

FIG. 22A is a diagram for describing an operation in which the device 100 provides a fingerprint recognition area. FIG. 22B is a diagram for describing an operation in which the device 100 receives an input indicating that a user touches an icon for an application within a predetermined period of time after authentication succeeds.

Referring to 2200-1 shown in FIG. 22A, the device 100 may receive a preset input that requests a fingerprint recognition area 2220 (see 2200-2). For example, the device 100 may receive an input indicating that a user double taps a status display window 2210.

Referring to 2200-2 shown in FIG. 22A, the device 100 may display the fingerprint recognition area 2220 in response to the input that double taps the status display window 2210. In this regard, the device 100 may activate a fingerprint sensor corresponding to the fingerprint recognition area 2220.

Referring to 2200-3 shown in FIG. 22B, a user may touch a finger on the fingerprint recognition area 2220 that appears on an upper end of a touch screen for more than a predetermined period of time or may swipe the finger from up to down with respect to the fingerprint recognition area 2220. In this regard, the device 100 may sense a touch of the finger on the fingerprint recognition area 2220.

The device 100 may obtain information on a fingerprint of the finger using a fingerprint sensor of the fingerprint recognition area 2220. The device 100 may compare the obtained information on the fingerprint with information on a previously registered fingerprint, thereby performing authentication. For example, when a similarity between the obtained information on the fingerprint and the information on the previously registered fingerprint exceeds a threshold value (for example, 98%), the device 100 may determine that authentication succeeds.

Referring to 2200-4 shown in FIG. 22B, when authentication succeeds, the device 100 may output a message "authentication is complete" on the fingerprint recognition area 2220.

The device 100 may receive an input indicating that a user touches a chatting application 2230 within a predetermined period of time after outputting the message "authentication is complete". In this case, the device 100 may execute the chatting application 2230 in an authentication mode. For example, the device 100 may display secret conversation content on an execution window of the chatting application 2230.

According to an exemplary embodiment, when authentication succeeds, the device 100 may display a list 2240 of security applications that are frequently selected by the user on a lower end of the touch screen. In this case, the user may easily and quickly select an application that is to be executed in the authentication mode.

Figure 23:
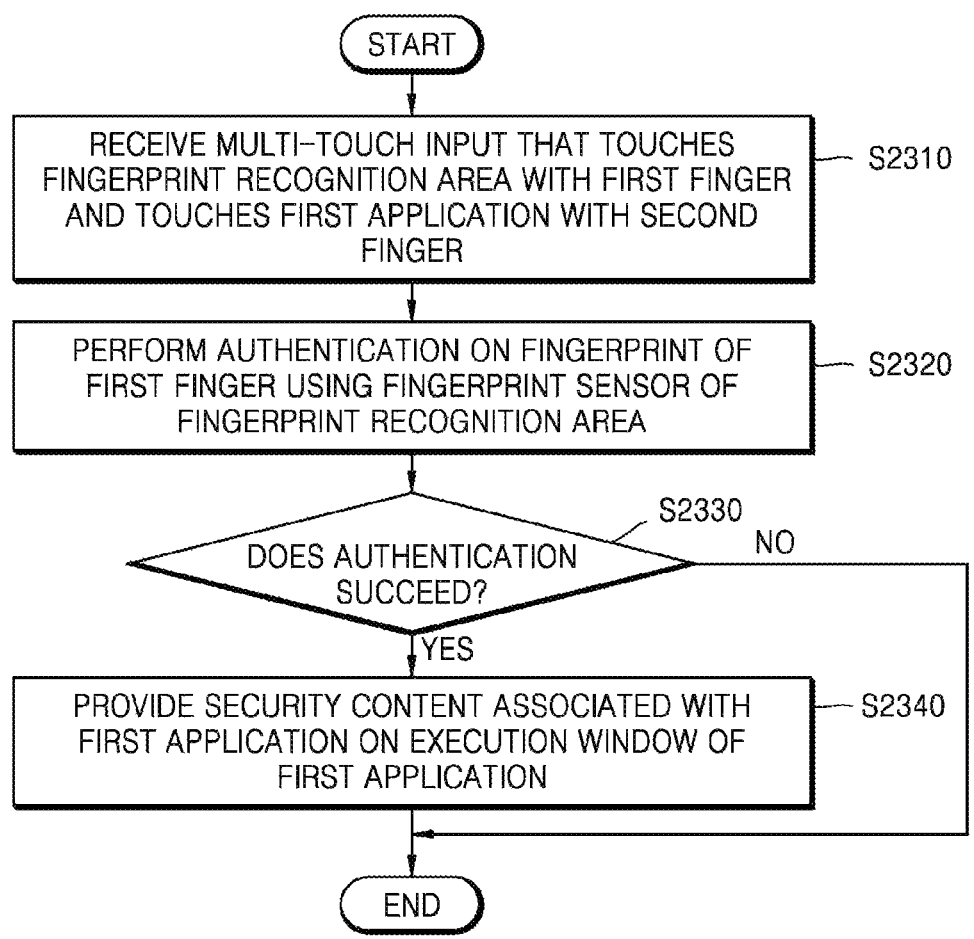
FIG. 23 is a flowchart of a method in which a device provides security content in accordance with a multi-touch input that touches a fingerprint recognition area with a first finger and touches a visual representation of a first application with a second finger according to an exemplary embodiment.

FIG. 23 is a flowchart of a method in which the device 100 provides security content in accordance with a multi-touch input that touches a fingerprint recognition area with a first finger and touches an icon for a first application with a second finger according to an exemplary embodiment.

In operation S2310, the device 100 may receive the multi-touch input that touches the fingerprint recognition area with the first finger and touches the first application icon with the second finger.

For example, the device 100 may receive an input that touches a first icon of the first application displayed on a touch screen with the thumb and simultaneously touches the fingerprint recognition area located on a lateral side of the device 100 with an index finger. Alternatively, the device 100 may receive an input that touches the first icon of the first application displayed on the touch screen with the index finger and simultaneously touches a fingerprint recognition area located on a bezel with the thumb.

In operation S2320, the device 100 may perform authentication on a fingerprint of the first finger using a fingerprint sensor of the fingerprint recognition area.

The device 100 may compare a fingerprint of the index finger that touches the fingerprint recognition area with a previously registered finger. For example, the device 100 may determine whether a similarity between a first fingerprint image obtained by the fingerprint sensor and a previously registered second fingerprint image for fingerprint authentication exceeds a threshold value (for example, 98%). Alternatively, the device 100 may compare first minutiae data of a first fingerprint detected by the fingerprint sensor with second minutiae data of a second fingerprint previously stored in a memory. In this regard, the device 100 may determine whether a similarity between the first minutiae data and the second minutiae data exceeds the threshold value (for example, 98%).

In operation S2330, the device 100 may determine whether authentication on the fingerprint of the first finger succeeds.

For example, when the similarity between the first fingerprint image (or the first minutiae data of the first fingerprint) obtained by the fingerprint sensor and the previously registered second fingerprint image (or the second minutiae data of the second fingerprint) exceeds the threshold value (for example, 98%), the device 100 may determine that authentication on the fingerprint of the first finger succeeds.

To the contrary, when the similarity between the first fingerprint image (or the first minutiae data of the first fingerprint) obtained by the fingerprint sensor and the previously registered second fingerprint image (or the second minutiae data of the second fingerprint) does not exceed the threshold value (for example, 98%), the device 100 may determine that authentication fails.

According to an exemplary embodiment, when there are a plurality of previously registered fingerprints, the device 100 may compare the first fingerprint image obtained by the fingerprint sensor with a plurality of previously registered second fingerprint images. When a similarity between at least one of the plurality of previously registered second fingerprint images and the first fingerprint image exceeds the threshold value (for example, 98%), the device 100 may determine that authentication succeeds.

In operation S2340, when authentication succeeds, the device 100 may provide security content associated with the first application on an execution window of the first application.

For example, when authentication on the fingerprint of the first finger succeeds, the device 100 may execute the first application touched with the second finger in an authentication mode. In this regard, the device 100 may transfer an authentication success message to a server through the first application, receive the security content from the server, and display the security content on the execution window of the first application.

Figure 24:
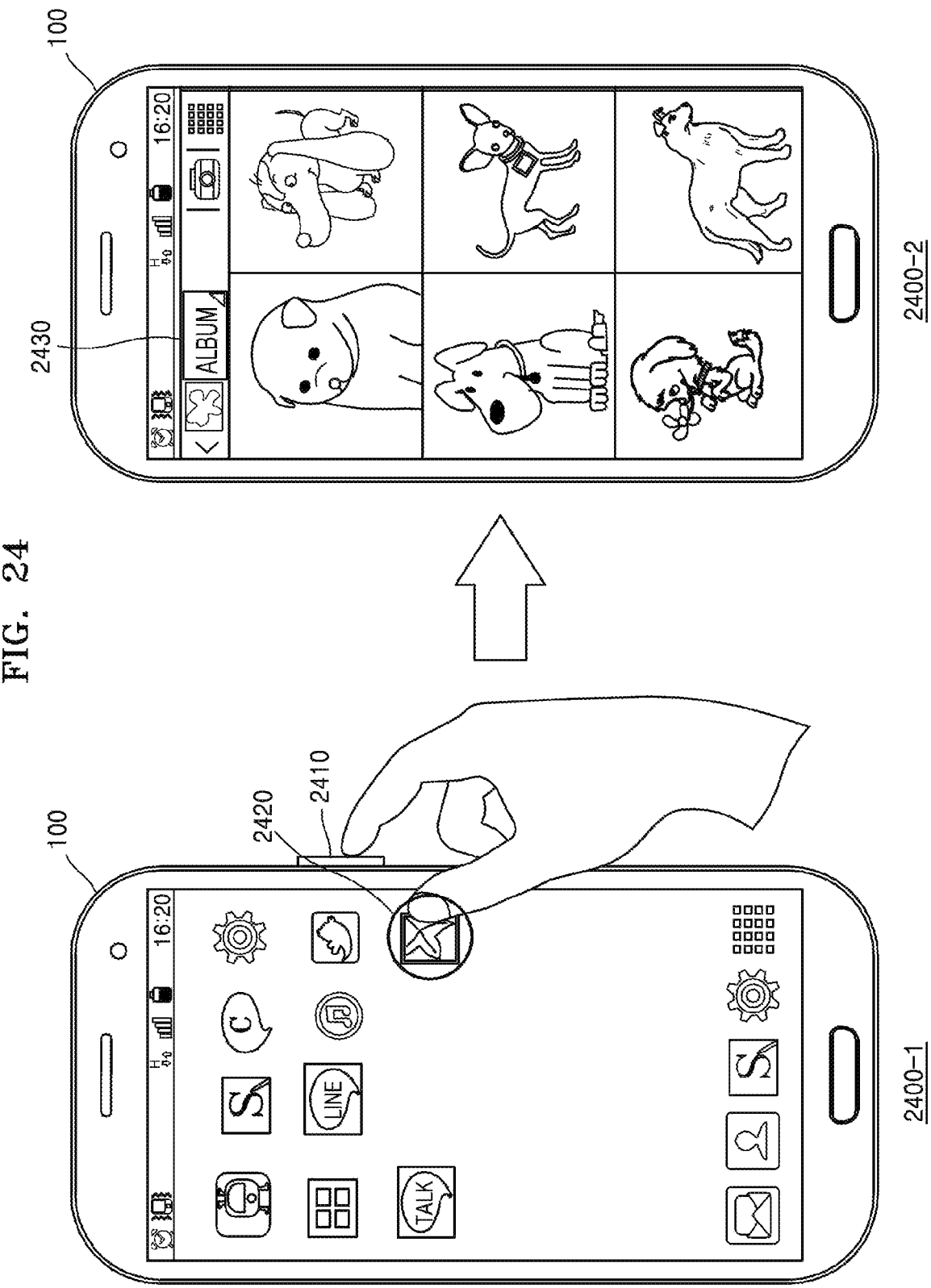
FIG. 24 is a diagram for describing an operation in which a device displays security content on an execution window of a photo management application according to a multi-touch input.

FIG. 24 is a diagram for describing an operation in which the device 100 displays security content on an execution window of a photo management application 2420 according to a multi-touch input.

Referring to 2400-1 shown in FIG. 24, the device 100 may receive the multi-touch input that touches the photo management application 2420 with the thumb while touching a right side button 2410 with an index finger. In this regard, the right side button 2410 may be a fingerprint recognition area including a fingerprint sensor.

The device 100 may perform authentication on the index finger using the fingerprint sensor of the right side button 2410. For example, the device 10 may obtain a fingerprint image of the index finger and compare the obtained fingerprint image with a previously registered fingerprint image. When the obtained fingerprint image and the previously registered fingerprint image are identical to each other, the device 100 may determine that authentication succeeds. That is, the device 100 may determine that a user of the index finger is a user who is authorized to access the photo management application 2420.

Referring to 2400-2 shown in FIG. 24, when authentication succeeds, the device 100 may execute the photo management application 2420 touched with the thumb in an authentication mode. For example, the device 100 may decrypt and display encrypted photo content linked to a photo album 2430. Thus, the user may check the encrypted photo content even without proceeding with a separate authentication procedure on the execution window of the photo management application 2420.

A case where a fingerprint recognition area and a display area of an application do not overlap is described with reference to FIGS. 1 through 24 above but exemplary embodiments are not limited thereto. A case where the fingerprint recognition area and the display area of the application overlap will now be described with reference to FIG. 25 below.

Figure 25:
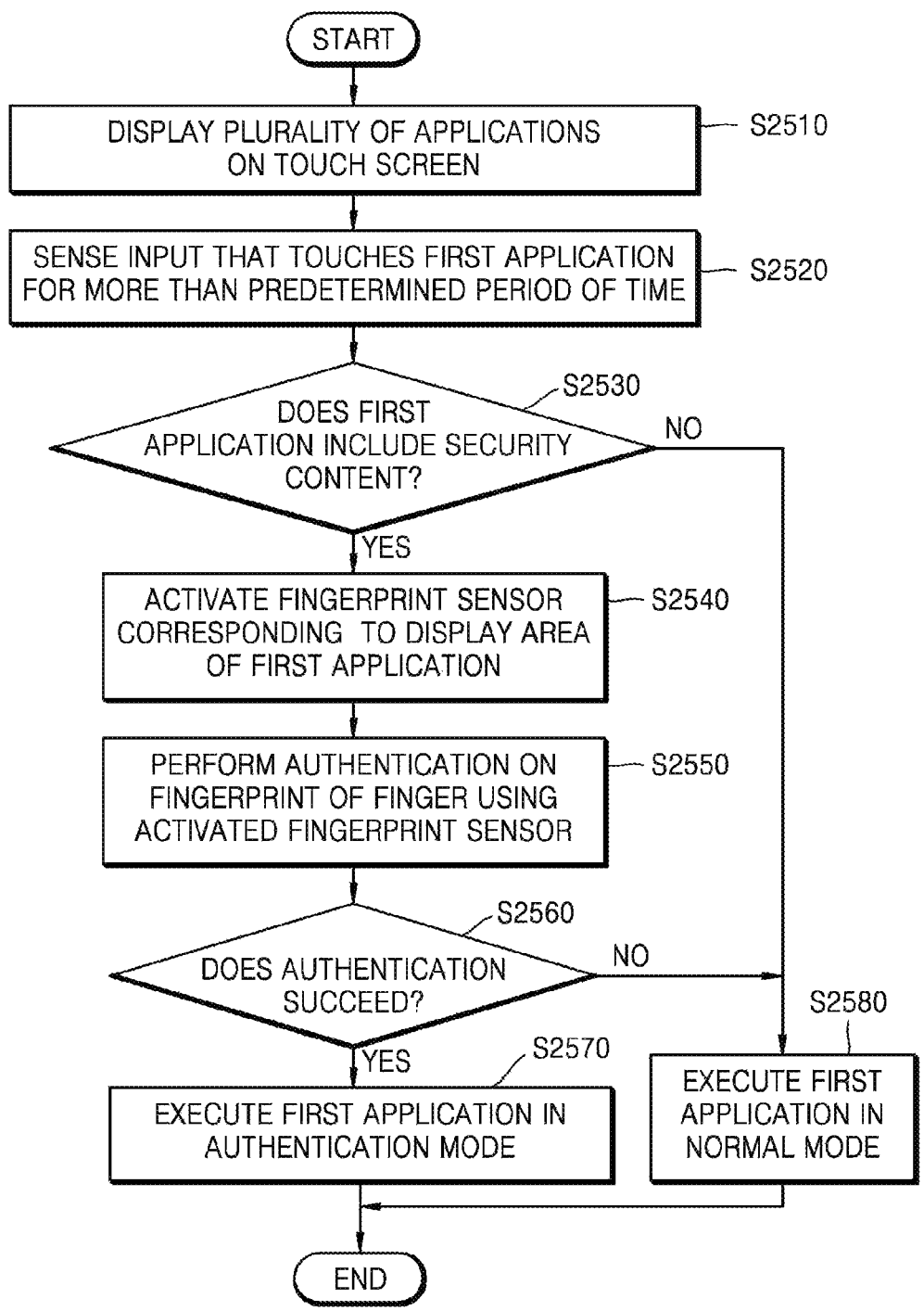
FIG. 25 is a flowchart of a method in which a device activates a fingerprint sensor corresponding to a display area of an application touched by a user.

FIG. 25 is a flowchart of a method in which the device 100 activates a fingerprint sensor corresponding to a display area of an application touched by a user.

In operation S2510, the device 100 may display icons for a plurality of applications on a touch screen. For example, the device 100 may display icons respectively indicating the plurality of applications on the touch screen.

According to an exemplary embodiment, the device 100 may display a plurality of applications on a lock screen and may display the plurality of applications on an unlock screen.

In operation S2520, the device 100 may sense an input indicating that a user touches an icon for a first application for more than a predetermined period of time (for example, 2 seconds). For example, the device 100 may sense an input that touches a first icon corresponding to the first application with a finger more than the predetermined period of time.

In operation S2530, the device 100 may determine whether the first application includes security content.

According to an exemplary embodiment, the device 100 may determine whether authentication is necessary when executing the first application. For example, the device 100 may determine whether personal content that only a specific user is allowed to access is included in an execution window of the first application.

According to an exemplary embodiment, when the first application does not include the security content, the device 100 may execute the first application in a normal mode. Executing the first application in the normal mode may mean that only normal content accessible by anyone is displayed on the execution window of the first application when executing the first application.

In operation S2540, the device 100 may activate a fingerprint sensor of a display area of the first application when the first application includes the security content. For example, when the first application includes the security content, since it is necessary to authenticate whether a user to execute the first application is a previously registered user that is able to access the security content, the device 100 may activate the fingerprint sensor to authenticate the user.

In operation S2550, the device may perform authentication on a finger of the user using the activated fingerprint sensor.

For example, the fingerprint sensor of the device 100 may obtain a fingerprint image of the finger of the user that touches the first application. The fingerprint sensor of the device 100 may extract locations or attributes of minutiae configured as ridge bifurcations, ridge endings, cores (e.g., cores of fingerprint patterns), delta (where ridges meet and form a triangle), etc., and generate minutiae data.

The device 100 may output a request message for inputting the fingerprint again when not detecting information regarding the fingerprint of the finger using the fingerprint sensor. For example, the device 100 may output a message to input the fingerprint again when not generating the minutiae data from the fingerprint image obtained by the fingerprint sensor.

For example, the device 100 may determine whether a similarity between a first fingerprint image obtained by the fingerprint sensor and a previously registered second fingerprint image for fingerprint recognition exceeds a threshold value (for example, 95%). Alternatively, the device 100 may compare first minutiae data of a first fingerprint detected by the fingerprint sensor with second minutiae data of a second fingerprint previously stored in the memory. In this regard, the device 100 may determine whether a similarity between the first minutiae data and the second minutiae data exceeds the threshold value (for example, 95%).

In operation S2560, the device 100 may determine whether authentication on the fingerprint of the finger succeeds.

According to an exemplary embodiment, when the similarity between the first fingerprint image (or the first minutiae data of the first fingerprint) obtained by the fingerprint sensor and the previously registered second fingerprint image (or the second minutiae data of the second fingerprint) for fingerprint recognition exceeds the threshold value (for example, 95%), the device 100 may determine that authentication on the fingerprint of the finger succeeds.

To the contrary, when the similarity between the first fingerprint image (or the first minutiae data of the first fingerprint) obtained by the fingerprint sensor and the previously registered second fingerprint image (or the second minutiae data of the second fingerprint) for fingerprint recognition does not exceed the threshold value (for example, 95%), the device 100 may determine that authentication fails.

In operation S2570, when authentication on the fingerprint of the finger succeeds, the device 100 may execute the first application in an authentication mode.

In operation S2580, when authentication on the fingerprint of the finger fails, the device 100 may execute the first application in a normal mode.

Operations S2570 and S2580 respectively correspond to operations S380 and S390 of FIG. 3, and thus detailed descriptions thereof are omitted. The fingerprint recognition area and a display area of an application overlap in FIG. 25, and thus fingerprint authentication may be performed although the user does not move the finger to another location after selecting the application.

Figure 26:
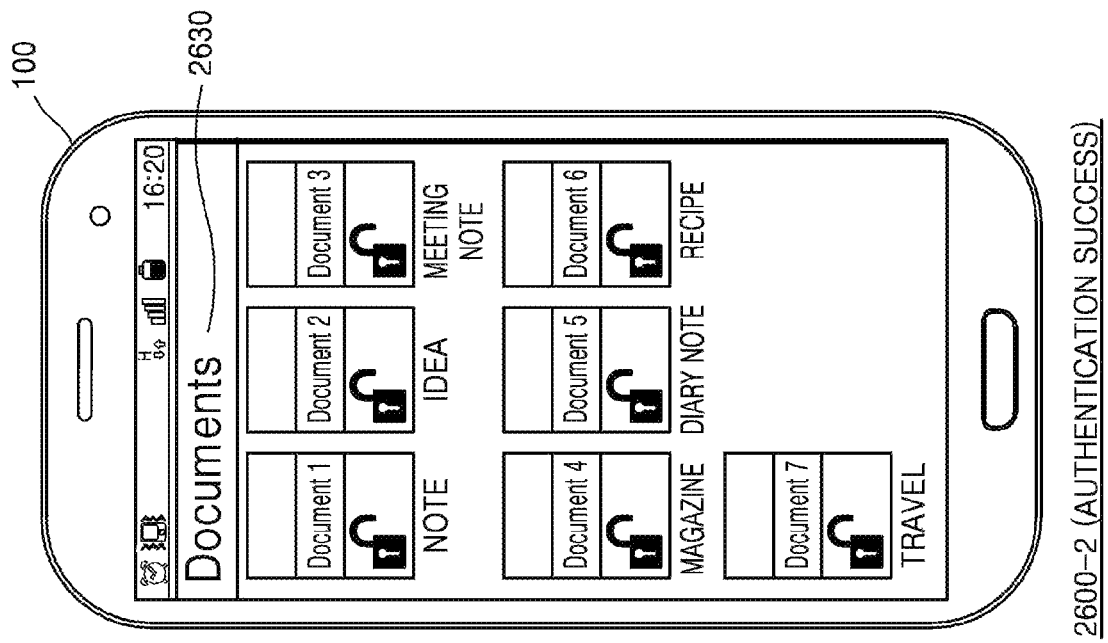
FIG. 26 is a diagram for describing an operation in which a device authenticates a fingerprint using a fingerprint sensor corresponding to a display area of a document management application touched by a user.
Figure 26:
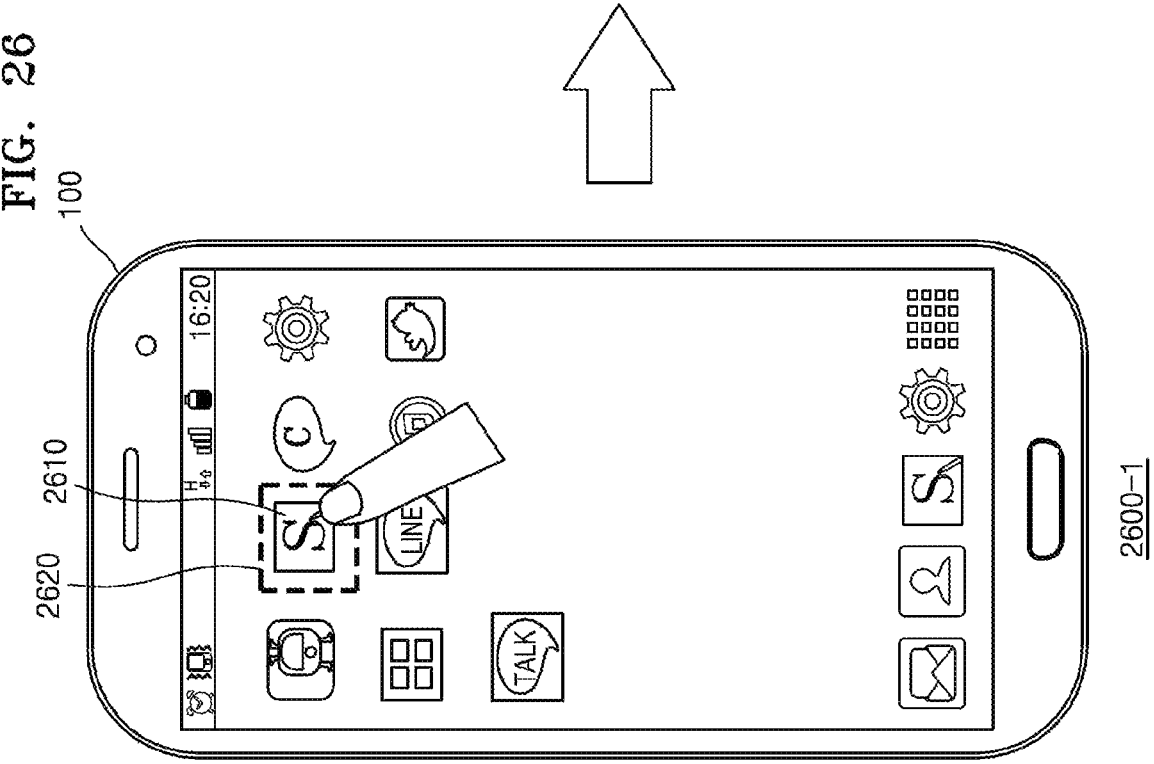

FIG. 26 is a diagram for describing an operation in which the device 100 authenticates a fingerprint using a fingerprint sensor corresponding to a display area 2620 of a document management application 2610 touched by a user.

Referring to 2600-1 shown in FIG. 26, the device 100 may receive an input that touches the document management application 2610 among a plurality of applications displayed on a touch screen. In this regard, the document management application 2610 may include encrypted documents that only a specific user is able to access.

Thus, the device 100 may proceed with a fingerprint authentication procedure before executing the document management application 2610. For example, the device 100 may activate the fingerprint sensor corresponding to the display area 2620 of the document management application 2610 and may authenticate the fingerprint of a finger that touches the document management application 2610 using the fingerprint sensor.

Referring to 2600-2 shown in FIG. 26, when authentication on the fingerprint succeeds, the device 100 may execute the document management application 2610 in an authentication mode. For example, the device 100 may transfer an authentication success message to the document management application 2610. In this regard, the document management application 2610 may decrypt encrypted documents 1 through 7 2630. Thus, the user may open at least one of the documents 1 through 7 2630 on an execution window of the document management application 2610 without additional authentication.

Figure 27:
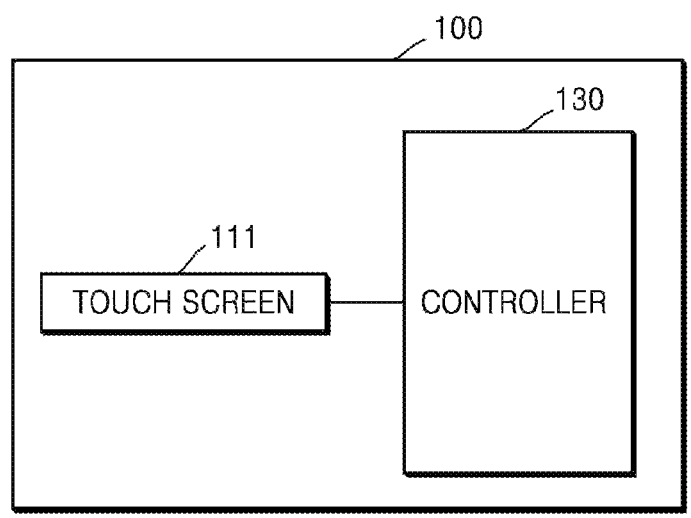

FIGS. 27 and 28 are block diagrams of the device 100 according to an exemplary embodiment.

Referring to FIG. 27, the device 100 according to an exemplary embodiment may include a touch screen 111 and a controller (e.g., a controller or a processor) 130. However, illustrated elements are not all indispensable elements. The device 100 may be implemented with more or less elements than the elements of FIG. 27.

For example, referring to FIG. 28, the device 100 according to an exemplary embodiment may further include a user interface 110, an outputter 120, a sensor 140, a communication interface 150, an audio/video (A/V) input 160, and a memory 170, in addition to the touch screen 111 and the controller 130. According to an exemplary embodiment, the touch screen 111 may operate as the user interface 110 when receiving a user touch input and may operate as the outputter 120 when outputting information.

The above elements will now be described below.

The user interface 110 may be a unit by which the user inputs data so as to control the device 100. For example, the user interface 110 may include a key pad, a dome switch, a touch pad (a touch capacitive type touch pad, a pressure resistive type touch pad, an infrared beam sensing type touch pad, a surface acoustic wave type touch pad, an integral strain gauge type touch pad, a Piezo effect type touch pad, or the like), a jog wheel, and a jog switch, but is not limited thereto.

The user interface 110 may receive a user touch input with respect to a lock screen, and receive a first drag input that is dragging of the touch tool in a direction in which a first menu is displayed from among a plurality of menus while maintaining contact of the touch tool with the screen. The user interface 110 may receive a selection of a user with respect to a first sub menu from among one or more first layer sub menus.

The user interface 110 may receive a second drag input that is dragging of the touch tool in a direction in which the first sub menu is displayed from a point where the first drag input ends while maintaining contact of the touch tool with the screen and a double tap input with respect to the first sub menu.

The user interface 110 may receive a second drag input that is dragging of the touch tool in the direction in which the first sub menu is displayed from among the one or more first layer sub menus from the point where the first drag input ends while maintaining contact of the touch tool with the screen.

The user interface 110 may receive a user touch input with respect to a first region from among a plurality of regions included in the lock screen, and receive a first drag input that is dragging of the touch tool in a second region from among the plurality of regions while maintaining contact of the touch tool with the screen after receiving the user touch input with respect to the first region. The user interface 110 may receive a second drag input that is dragging of the touch tool in a third region on which the first sub menu from among the one or more first layer sub menus from a point where the first drag input ends while maintaining contact of the touch tool with the screen after receiving the first drag input.

The user interface 110 may receive a touch input touching the first region from among the plurality of regions with the touch tool for more than a predetermined time with respect to the first region. According to exemplary embodiments, the touch input that is maintained for more than the predetermined time with respect to the first region may be expressed as a touch input that is maintained for more than a predetermined time with respect to a menu displayed on the first region.

The user interface 110 may receive a touch and drag input that drags a first application to a predefined fingerprint recognition area while touching the first application with a finger. In this regard, the predefined fingerprint recognition area may be an area where a predefined hardware button is located or a partial area of the touch screen 111.

For example, when the predefined fingerprint recognition area is a home button area, the user interface 110 may receive touch and drag input that drags the first application to the home button area while touching the first application.

The user interface 110 may receive an input that touches the first application among a plurality of applications. The user interface 110 may receive a touch and drag input that drags identification information of first content among a security content list to the fingerprint recognition area while touching the identification information. The user interface 100 may receive a touch and drag input that drags a first function among a plurality of functions to the fingerprint recognition area while touching the first function.

The outputter 120 may function to output an audio signal, a video signal, or a vibration signal and may include a display 121, a sound outputter 122, a vibration motor 123, etc.

The display 121 displays and outputs information that is processed in the device 100. For example, the display 121 may display the plurality of menus or a plurality of sub menus on the lock screen.

The display 121 may display the plurality of menus within a predetermined distance from a region in which the touch input is received according to the touch input.

The display 121 may display the one or more first layer sub menus corresponding to the first menu within a predetermined distance from a region on which the first menu is displayed based at least in part on the moving direction information of the first drag input.

The display 121 may display one or more second layer sub menus corresponding to the first sub menu within a predetermined distance from a region on which the first sub menu is displayed based at least in part on the moving direction information of the second drag input. The display 121 may display the one or more first layer sub menus on a region that does not include a moving path of the first drag input from among the plurality of regions.

The display 121 may display the plurality of menus on the plurality of regions and display the one or more first layer sub menus corresponding to the first menu on the plurality regions other than the first region according to a user touch input with respect to the first region. The display 121 may display the one or more second layer sub menus corresponding to the first sub menu on the plurality regions other than the third region where the first sub menu is displayed.

The display 121 may display at least one application. For example, the display 121 may display identification information (for example, an icon, text, an image, etc.) corresponding to the at least one application.

The display 121 may display the fingerprint recognition area in which a fingerprint sensor is activated. For example, the display 121 may highlight a boundary of the fingerprint recognition area or may display the fingerprint recognition area such that the boundary thereof flashes at a predetermined cycle. The display 121 may change a color of the fingerprint recognition area to a color differentiated from a color of a background screen.

The display 121 may display a page indicating that a user is completely logged into the first application or a page requesting the user to log into the first application according to a fingerprint authentication result.

The display 121 may display a list of a plurality of pieces of security content or a list of a plurality of functions. For example, when a touch input that touches the first application is received, the display 121 may display the plurality of functions provided by the first application within a predetermined distance from a location where the touch input is received.

When the display 121 and a touch pad form a layer structure and then are formed as a touch screen, the display 121 may be used as both an output device and input device. The display 121 may include at least one of a liquid crystal display (LCD), a thin film transistor-liquid crystal display (TFT-LCD), an organic light-emitting diode (OLED) display, a flexible display, a 3D display, and an electrophoretic display. Also, according to a type of the device 100, the device 100 may include two or more displays 121. In this regard, the two or more displays 121 may face each other by using a hinge.

The sound outputter 122 may output audio data that is received from the communication interface 150 or is stored in the memory 170. The sound outputter 122 may also output a sound signal (e.g., a call signal receiving sound, a message receiving sound, a notification sound, etc.) related to functions performed by the device 100. The sound outputter 122 may include a speaker, a buzzer, etc.

The vibration motor 123 may output a vibration signal. For example, the vibration motor 123 may output the vibration signal that corresponds to an output of the audio data (e.g., the call signal receiving sound, the message receiving sound, etc.) or video data. Also, when a touch is input to the touch screen, the vibration motor 123 may output a vibration signal.

The controller 130 may generally control all operations of the device 100. That is, the controller 130 may execute programs stored in the memory 170 and accordingly may control the user interface 110, the outputter 120 including the display 121, the controller 130, the sensor 140, the communication interface 150, the A/V inputter 160, and the memory 170, etc.

The controller 130 may extract one or more previously determined first layer sub menus corresponding to the first menu. The controller 130 may perform a function corresponding to the first sub menu selected from the one or more first layer sub menus. For example, the controller 130 may perform the function corresponding to the first sub menu according to the double tap input. In this regard, the controller 130 may unlock the lock screen in response to the double tap input. The controller 130 may execute an application corresponding to the selected first sub menu or perform a function included in the application.

The controller 130 may set the plurality of menus and sub menus corresponding to each of the plurality of menus. The controller 130 may perform functions corresponding to the first layer sub menus displayed on the second region according to the first drag input. For example, the controller 130 may execute an application displayed on the second region or perform a predetermined function of the application at a touch-out time.

The controller 130 may be switched to an editing mode that may be used to edit the plurality of menus displayed on the plurality of regions based on a touch input touching the lock screen with the touch tool for more than a predetermined time. For example, the controller 130 may change a position of the first menu since the first menu displayed on the first region is dragged and dropped. The controller 130 may change alignment positions of the plurality of menus since the position of the first menu is changed.

The controller 130 may authenticate the fingerprint of the finger using the fingerprint sensor of the predefined fingerprint recognition area. For example, the controller 130 may authenticate the fingerprint of the finger based on a result of comparing information regarding the fingerprint of the finger detected by the fingerprint sensor with previously stored fingerprint information of the user.

When authentication on the fingerprint of the finger succeeds, the controller 130 may provide security content associated with the first application on the execution window of the first application. When authentication on the fingerprint of the finger succeeds, the controller 130 may provide the first application with information associated with authentication.

For example, when authentication on the fingerprint of the finger succeeds, the controller 130 may execute the first application in an authentication mode, thereby displaying the security content associated with the first application on the execution window of the first application. In the meantime, when authentication on the fingerprint of the finger fails, the controller 130 may execute the first application in a normal authentication mode, thereby displaying normal content associated with the first application on the execution window of the first application.

The controller 130 may display the plurality of applications on the touch screen 111 and may receive an input that touches the first application among the plurality of applications. When the first application is an application including the security content, the controller 130 may provide the fingerprint recognition area on the touch screen 111. For example, the controller 130 may provide the fingerprint recognition area within a predetermined distance from the first application. The controller 130 may activate the fingerprint sensor of the fingerprint recognition area based on a result of determining whether the first application includes the security content.

The sensor 140 may detect a state of the device 100 or a state of the periphery of the device 100 and transfer detected information to the controller 130.

The sensor 140 may include at least one of a magnetic sensor 141, an acceleration sensor 142, a temperature/humidity sensor 143, an infrared ray sensor 144, a gyro sensor 145, a fingerprint sensor 146, an atmospheric pressure sensor 147, a proximity sensor 148, and an RGB (illumination) sensor 149, but is not limited thereto. One of ordinary skill in the art may intuitively infer a function of each sensor from its title, and thus a detailed description thereof is omitted here.

The communication interface 150 may include one or more elements for allowing communication between the device 100 and an external device or between the device 100 and a server. For example, the communication interface 150 may include a short-range wireless communication interface 151, a mobile communication interface 152, and a broadcasting receiver 153.

The short-range wireless communication interface 151 may include a Bluetooth communication interface, a Bluetooth low energy (BLE) communication interface, a near field communication interface, a wireless LAN (Wi-Fi) communication interface, a ZigBee communication interface, an infrared data association (IrDA) communication interface, a Wi-Fi Direct (WFD) communication interface, a ultra wideband (UWB) communication interface, an Ant+ communication interface, etc., but is not limited thereto.

The mobile communication interface 152 transmits and receives a wireless signal with at least one of a base station, an external terminal, a server, etc. over a mobile communication network. In this regard, the wireless signal may include a voice call signal, a conference call signal, or diverse types of data according to transmission and reception of text/multimedia messages.

The broadcasting receiver 153 receives a broadcasting signal and/or information relating to broadcasting from the outside over a broadcasting channel. The broadcasting channel may include a satellite channel and a terrestrial channel. In certain exemplary embodiments, the device 100 may not include the broadcasting receiver 153.

The A/V input 160 is used to input an audio signal or a video signal and may include a camera 161 and a microphone 162. The camera 161 may obtain an image frame such as a still image or a moving image through an image sensor in a conference call mode or a photographing mode. An image captured by the image sensor may be processed by the controller 130 or an image processor (not shown).

The image frame processed by the camera 161 may be stored in the memory 170 or may be transmitted to the outside through the communication interface 150. Two or more cameras 161 may be included according to a configuration type of the device 100.

The microphone 162 receives an external sound signal and processes the external sound signal as electrical voice data. For example, the microphone 162 may receive the external sound signal from the external device or a speaker. The microphone 162 may use diverse noise removal algorithms for removing noise that occurs when receiving the external sound signal.

The memory 170 may store a program to process and to control the controller 130, or may store a plurality of pieces of data (for example, a plurality of applications, previously registered fingerprint information for authentication, a plurality of menus, a plurality of first layer sub menus corresponding to each of the plurality of menus, a plurality of second layer sub menus corresponding to each of the plurality of first layer sub menus, etc.) that are input/output.

The memory 170 may include at least one storage medium from among a flash memory-type storage medium, a hard disk-type storage medium, a multimedia card micro-type storage medium, card-type memories (e.g., an SD card, an XD memory, etc.), Random Access Memory (RAM), Static Random Access Memory (SRAM), Read-Only Memory (ROM), Electrically Erasable Programmable Read-Only Memory (EEPROM), Programmable Read-Only Memory (PROM) magnetic memory, a magnetic disc, and an optical disc. The device 100 may operate web storage or a cloud server that performs a storing function of the memory 170 via the Internet.

The programs stored in the memory 170 may be classified into a plurality of modules according to their functions, for example, into a UI module 171, a touch screen module 172, a notification module 173, etc.

The UI module 171 may provide a UI or GUI which are synchronized with the device 100 and specialized according to applications. The touch screen module 172 may detect a user touch gesture on the touch screen and may transmit information regarding the touch gesture to the controller 130. The touch screen module 172 according to an exemplary embodiment may recognize and analyze a touch code. The touch screen module 172 may be configured as separate hardware including a controller.

As discussed above, various sensors may be provided in or near the touch screen to detect a user touch input on the touch screen. For example, a tactile sensor may be provided to detect the user touch input. The tactile sensor detects a contact of a specific object at least as sensitively as a person can detect similar contact. The tactile sensor may detect various types of information such as the roughness of a contact surface, the hardness of the contact object, the temperature of a contact point, or the like.

Further, as discussed above, another example of a sensor to detect the touch input on the touch screen is a proximity sensor. The proximity sensor is a sensor for detecting an object which is approaching a predetermined detection surface or a neighboring object by using the strength of an electromagnetic field or an infrared light. Examples of the proximity sensor include a transmission-type photoelectric sensor, a direct reflection-type photoelectric sensor, a mirror reflection-type photoelectric sensor, a high-frequency oscillation proximity sensor, an electrostatic capacity-type proximity sensor, a magnetic-type proximity sensor, and an infrared proximity sensor.

The notification module 173 may generate a signal for notifying an occurrence of an event of the device 100. Examples of the event that occurs in the device 100 may include a call signal reception, a message reception, a key signal input, a schedule notification, etc. The notification module 173 may output a notification signal in a video signal form through the display 121, in an audio signal form through the sound outputter 122, and in a vibration signal form through the vibration motor 123.

The notification module 173 according to an exemplary embodiment may provide a feedback signal regarding boundaries of the plurality of menus. The feedback signal may include at least one of the video signal, the audio signal, and the vibration signal. For example, when the user drags a first menu upward after touching the first menu, the device may provide the vibration signal in a boundary between the first menu and a second menu, in a boundary between the second menu and a third menu, in a boundary between the third menu and a fourth menu, etc. The user may determine that a touched menu is changed based on the feedback signal.

One or more exemplary embodiments can also be implemented through computer-readable code/instructions in/on a medium, e.g., a computer-readable medium, to control at least one processing element to implement any above-described exemplary embodiment. The medium can correspond to any medium/media permitting the storage and/or transmission of the computer-readable code.

The computer-readable code can be recorded/transferred on a non-transitory, computer readable medium in a variety of ways, with examples of the medium including recording media, such as magnetic storage media (e.g., ROM, floppy disks, hard disks, etc.) and optical recording media (e.g., CD-ROMs or DVDs). The media may also be a distributed across non-transitory media in network, so that the computer-readable code is stored/transferred and executed in a distributed fashion. Furthermore, the processing element could include a processor or a computer processor, and processing elements may be distributed and/or included in a single device.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A method, performed by a device, of providing security content, the method comprising:
receiving, on a touch screen, a touch input of a finger touching a visual representation of a first application;
displaying a plurality of functions provided by the first application within a predetermined distance from a location where the touch input is received;
while maintaining the touch input, detecting the touch input is moved from the visual representation of the first application to a visual representation of a first function of the first application;
while still maintaining the touch input, detecting the touch input is moved from the visual representation of the first function among the plurality of functions to a fingerprint recognition area;
performing authentication based on a fingerprint of the finger detected on the fingerprint recognition area; and
executing the first function of the first application based on a result of the authentication.

2. The method of claim 1, wherein the fingerprint recognition area comprises a home button area of the device.

3. The method of claim 1, the method further comprising:
when the first application includes the security content, displaying the fingerprint recognition area on the touch screen.

4. The method of claim 3, wherein the displaying of the fingerprint recognition area comprises displaying the fingerprint recognition area within a predetermined distance from a display position of the visual representation of the first application.

5. The method of claim 1, wherein the fingerprint of the finger is detected by a finger print sensor under the fingerprint recognition area.

6. The method of claim 5, wherein the performing authentication comprises:
determining whether the first application includes the security content; and
activating the fingerprint sensor under the fingerprint recognition area based on a result of the determining.

7. The method of claim 1, further comprising:
when the performing authentication based on the fingerprint is successful, executing the first application in an authentication mode and displaying the security content associated with the first application on an execution window of the first application; and
when the performing authentication based on the fingerprint is not successful, executing the first application in a normal mode and displaying normal content associated with the first application on the execution window of the first application.

8. The method of claim 7,
wherein the displaying of the security content comprises displaying a page showing that a user is completely logged in to the first application, and
wherein the displaying of the normal content comprises displaying a page requesting the user to log in to the first application.

9. The method of claim 1, wherein the performing authentication based on the fingerprint comprises:
performing authentication based on a comparison of fingerprint information of the fingerprint detected by a fingerprint sensor and previously stored fingerprint information of a user.

10. The method of claim 1, further comprising:
displaying a list of security content;
receiving a touch and drag input of dragging identification information of first content displayed in the list of security content to the fingerprint recognition area while the user touches the identification information with the finger;
performing authentication based on the fingerprint of the finger; and
when the authentication on the fingerprint is successful, displaying the first content on the touch screen.

11. A device for providing security content, the device comprising:
a touch screen;
a memory storing one or more instructions: and
a processor configured to executing the one or more instructions at least to:
receive, on the touch screen, a touch input of a finger touching a visual representation of a first application;
display a plurality of functions provided by the first application within a predetermined distance from a location where the touch input is received;
while maintaining the touch input, detect the touch input is moved from the visual representation of the first application to a visual representation of a first function of the first application;
while still maintaining the touch input, detect the touch input is moved from the visual representation of the first function among the plurality of functions to a fingerprint recognition area;
perform authentication based on a fingerprint of the finger detected on the fingerprint recognition area; and
execute the first function of the first application based on a result of the authentication.

12. The device of claim 11, wherein the fingerprint recognition area comprises a home button area of the device.

13. The device of claim 11, wherein the processor further configured to executing the one or more instructions to:
when the first application includes the security content, display the fingerprint recognition area on the touch screen.

14. The device of claim 13, wherein the processor further configured to executing the one or more instructions to:
display the fingerprint recognition area within a predetermined distance from a display position of the visual representation of the first application.

15. The device of claim 11, wherein the fingerprint of the finger is detected by a finger print sensor under the fingerprint recognition area.

16. The device of claim 15, wherein the processor further configured to executing the one or more instructions to:
determine whether the first application includes the security content; and
activate the fingerprint sensor under the fingerprint recognition area based on a result of the determining.

17. The device of claim 11, wherein the processor further configured to executing the one or more instructions to:
when the performing authentication based on the fingerprint is successful, execute the first application in an authentication mode and display the security content associated with the first application on an execution window of the first application; and
when the performing authentication based on the fingerprint is not successful, execute the first application in a normal mode and display normal content associated with the first application on the execution window of the first application.

18. The device of claim 17, wherein the processor further configured to executing the one or more instructions to:
display a page showing that a user is completely logged in to the first application, as the security content, and
display a page requesting the user to log in to the first application, as the normal content.

19. The device of claim 11, wherein the processor further configured to executing the one or more instructions to:
perform the authentication based on a comparison of fingerprint information of the fingerprint detected by a fingerprint sensor and previously stored fingerprint information of a user.

20. A non-transitory computer-readable storage medium storing a computer program for executing the method of claim 1.

* * * * *